United States Patent [19]
Elko et al.

[11] Patent Number: 5,664,155
[45] Date of Patent: Sep. 2, 1997

[54] DYNAMICALLY ASSIGNING A DUMP SPACE IN A SHARED DATA FACILITY TO RECEIVE DUMPING INFORMATION TO BE CAPTURED

[75] Inventors: David Arlen Elko, Poughkeepsie; Jeffrey Alan Frey, New Paltz; Jeffrey Mark Nick, Fishkill; Kenneth Glenn Rothwell, Red Hook; Michael Dustin Swanson, Poughkeepsie, all of N.Y.

[73] Assignee: International Business Machines Corporation, Armonk, N.Y.

[21] Appl. No.: 471,895

[22] Filed: Jun. 7, 1995

Related U.S. Application Data

[63] Continuation of Ser. No. 73,909, Jun. 8, 1993.

[51] Int. Cl.$^6$ .................................................. G06F 12/00
[52] U.S. Cl. .................... 711/170; 395/621; 395/182.04; 711/113; 711/114; 711/147
[58] Field of Search ........................ 395/440, 441, 395/447, 448, 451, 457, 468–473, 474–480, 488–489, 497.01, 415, 417, 420, 182.03, 182.04, 183, 18, 600, 200, 200.1, 200.2, 621

[56] References Cited

U.S. PATENT DOCUMENTS

| | | | |
|---|---|---|---|
| 3,805,247 | 4/1974 | Zucker et al. | 395/566 |
| 4,907,151 | 3/1990 | Bartlett | 395/493 |
| 4,989,132 | 1/1991 | Mellender et al. | 395/705 |
| 5,008,853 | 4/1991 | Bly et al. | 395/331 |
| 5,095,480 | 3/1992 | Fenner | 370/94.1 |
| 5,101,494 | 3/1992 | Bilski et al. | 395/704 |
| 5,111,384 | 5/1992 | Aslanian et al. | 395/183.02 |
| 5,394,555 | 2/1995 | Hunter et al. | 395/800 |
| 5,504,857 | 4/1996 | Baird et al. | 395/182.04 |
| 5,537,574 | 7/1996 | Elko et al. | 395/468 |
| 5,544,345 | 8/1996 | Carpenter et al. | 395/477 |

FOREIGN PATENT DOCUMENTS 4-370849  12/1992  Japan .

*Primary Examiner*—Matthew M. Kim
*Attorney, Agent, or Firm*—Lawrence D. Cutter; Heslin & Rothenberg, P.C.

[57] ABSTRACT

A dumping service facility for data processing systems, including single systems, multisystems and shared facilities. Information, such as control information, is captured and a storage dump is created. During the capturing process, the information is serialized such that mainline commands (i.e., commands other than dump commands) are not allowed to access the information thereby possibly destroying the information. The information is stored within the storage dump in such a manner that programs can understand the information. That is, the storage dump contains a logical representation of the information being captured. Subsequent to capturing the information, serialization is released and mainline commands can once again access the information.

4 Claims, 44 Drawing Sheets

LOCAL-CACHE CONTROL BLOCK (LCCB)

| | | |
|---|---|---|
| LOCAL CACHE IDENTIFIER | (LCID) | |
| ATTACHMENT STATUS | (AS) | |
| LOCAL-CACHE TOKEN | (LCT) | |
| LOCAL-CACHE AUTHORITY | (LCAU) | |
| SYSTEM IDENTIFIER | (SYID) | |
| ATTACHMENT INFORMATION | (AINF) | |

CACHE-STRUCTURE CONTROLS

| | |
|---|---|
| TOTAL-DIRECTORY-ENTRY COUNT | (TDEC) |
| TOTAL-DATA-AREA-ELEMENT COUNT | (TDAEC) |
| ADJUNCT-ASSIGNMENT INDICATOR | (AAI) |
| MAXIMUM STORAGE CLASS | (MSC) |
| MAXIMUM CASTOUT CLASS | (MCC) |
| DATA-AREA-ELEMENT CHARACTERISTIC | (DAEX) |
| MAXIMUM DATA-AREA SIZE | (MDAS) |
| STRUCTURE SIZE | (SS) |
| MAXIMUM STRUCTURE SIZE | (MXSS) |
| MINIMUM STRUCTURE SIZE | (MNSS) |
| STRUCTURE AUTHORITY | (SAU) |
| USER STRUCTURE CONTROL | (USC) |
| LCID VECTOR | (LCIDV) |
| TARGET STRUCTURE SIZE | (TSS) |
| TARGET DATA AREA ELEMENT COUNT | (TGDAEC) |
| TARGET DIRECTORY-ENTRY COUNT | (TGDEC) |

*fig. 4*

DIRECTORY INFORMATION BLOCK

| | |
|---|---|
| NAME | (N) |
| USER-DATA FIELD | (UDF) |
| STORAGE CLASS | (SC) |
| CHANGE INDICATOR | (C) |
| DATA-CACHED INDICATOR | (D) |
| CAST-OUT-PARITY-BITS INDICATOR | (CP) |
| CAST-OUT CLASS | (CC) |
| CAST-OUT-LOCK VALUE | (CLV) |
| DATA-AREA SIZE | (DAS) |
| LCEN-VALIDITY INDICATOR | (LVI) |
| LOCAL-CACHE ENTRY NUMBER | (LCEN) |

*fig. 6*

STORAGE-CLASS CONTROLS

| | |
|---|---|
| READ-HIT COUNTER | (RHC) |
| READ-MISS-DIRECTORY-HIT COUNTER | (RMDHC) |
| READ-MISS-ASSIGN-SUPPRESSED COUNTER | (RMASC) |
| READ-MISS-NAME-ASSIGNED COUNTER | (RMNAC) |
| READ-MISS-TARGET-STORAGE-CLASS-FULL COUNTER | (RMTSFC) |
| WRITE-HIT-CHANGE-BIT-0 COUNTER | (WHCB0C) |
| WRITE-HIT-CHANGE-BIT-1 COUNTER | (WHCB1C) |
| WRITE-MISS-NOT-REGISTERED COUNTER | (WMNRC) |
| WRITE-MISS-INVALID-STATE COUNTER | (WMISC) |
| WRITE-MISS-TARGET-STORAGE-CLASS-FULL COUNTER | (WMTSLFC) |
| DIRECTORY-ENTRY-RECLAIM COUNTER | (DERC) |
| DATA-AREA-RECLAIM COUNTER | (DARC) |
| XI-FOR-DIRECTORY-RECLAIM COUNTER | (XIFDRC) |
| XI-FOR-WRITE COUNTER | (XIFWC) |
| XI-FOR-NAME-INVALIDATION COUNTER | (XINIC) |
| XI-FOR-COMPLEMENT-INVALIDATION COUNTER | (XICIC) |
| CASTOUT COUNTER | (COC) |
| REFERENCE-SIGNAL-MISS COUNTER | (RSMC) |
| TARGET-STORAGE-CLASS-FULL COUNTER | (TSCFC) |
| DIRECTORY-ENTRY-COUNTER | (DEC) |
| DATA-AREA-ELEMENT COUNTER | (DAEC) |
| TOTAL-CHANGED COUNTER | (TCC) |
| DATA-AREA COUNTER | (DAC) |
| COMPLETED-REFERENCE-LIST COUNTER | (CRLC) |
| PARTIALLY-COMPLETED-REFERENCE-LISTS COUNTER | (PCRLC) |
| XI-FOR-LCEN-REPLACEMENT COUNTER | (XILRC) |
| REPEAT FACTOR | (RF) |
| RECLAIM VECTOR (ENTRIES) | (RVE1-RVEn) |

*fig. 7*

LIST-STRUCTURE CONTROLS

| | |
|---|---|
| MAXIMUM DATA-LIST-ENTRY SIZE | (MDLES) |
| LIST-STRUCTURE TYPE | (LST) |
| LOCK-TABLE-ENTRY CHARACTERISTIC | (LTEX) |
| LIST-ELEMENT CHARACTERISTIC | (LELX) |
| MINIMUM STRUCTURE SIZE | (MNSS) |
| LOCK-TABLE-ENTRY COUNT | (LTEC) |
| LIST COUNT | (LC) |
| STRUCTURE SIZE | (SS) |
| MAXIMUM STRUCTURE SIZE | (MXSS) |
| TARGET STRUCTURE SIZE | (TSS) |
| TARGET MAXIMUM-ELEMENT COUNT | (TMELC) |
| TARGET MAXIMUM-ENTRY COUNT | (TMEC) |
| MAXIMUM LIST-SET-ELEMENT COUNT | (MLSELC) |
| LIST-SET-ELEMENT COUNT | (LSELC) |
| NON-ZERO-LOCK-TABLE-ENTRY COUNT | (NLTEC) |
| MAXIMUM LIST-SET-ENTRY COUNT | (MLSELC) |
| LIST-SET-ENTRY COUNT | (LSEC) |
| STRUCTURE AUTHORITY | (SAU) |
| USER STRUCTURE CONTROL | (USC) |
| USER-IDENTIFIER VECTOR | (UIDV) |

LIST-USER CONTROL BLOCK (LUCB)

| | |
|---|---|
| USER IDENTIFIER | (UID) |
| USER STATE | (US) |
| LIST-NOTIFICATION TOKEN | (LNT) |
| USER AUTHORITY | (UAU) |
| SYSTEM IDENTIFIER | (SYID) |
| USER-ATTACHMENT CONTROL | (UAC) |

LIST ENTRY CONTROL BLOCK (LECB)

| | |
|---|---|
| DATA-LIST-ENTRY SIZE | (DLES) |
| LIST NUMBER | (LN) |
| LIST-ENTRY IDENTIFIER | (LEID) |
| VERSION NUMBER | (VN) |
| LIST-ENTRY KEY | (LEK) |
| LIST-ENTRY NAME | (LEN) |

OBJECT HEADER

| | |
|---|---|
| DUMPING-OBJECT TYPE | (DOT) |
| CAPTURE-COMPLETE INDICATOR | (CCI) |
| OBJECT IDENTIFIER | (OID) |
| DIB COUNT | (DIBC) |
| DIB SIZE | (DIBS) |
| DIB LIST SIZE | (DLS) |
| OBJECT CONTROLS | |

LIST CONTROLS

```
┌─────────────────────────────────────────────────────┐
│  LIST-ENTRY-COUNT LIMIT                    (LECL)   │
│                                                     │
│  LIST-ENTRY-COUNT                           (LEC)   │
│                                                     │
│  LIST-STATE-TRANSITION COUNT               (LSTC)   │
│                                                     │
│  LIST AUTHORITY                             (LAU)   │
│                                                     │
│  USER LIST CONTROLS                         (ULC)   │
│                                                     │
│  LIST-MONITOR-TABLE ENTRY 0                         │
│                                                     │
│       LIST-MONITORING-ACTIVE BIT           (LMAB)   │
│                                                     │
│       LIST-NOTIFICATION-REQUEST TYPE       (LNRT)   │
│                                                     │
│       LIST-NOTIFICATION-ENTRY NUMBER       (LNEN)   │
│                                                     │
│  LIST-MONITOR-TABLE ENTRY 1                         │
│                                                     │
│       LIST-MONITORING-ACTIVE                        │
│                                                     │
│       LIST-NOTIFICATION-REQUEST TYPE                │
│                                                     │
│       LIST-NOTIFICATION-ENTRY NUMBER                │
│                                                     │
│       •••                                           │
│                                                     │
│  LIST-MONITOR-TABLE ENTRY n                         │
│                                                     │
│       LIST-MONITORING-ACTIVE                        │
│                                                     │
│       LIST-NOTIFICATION-REQUEST TYPE                │
│                                                     │
│       LIST-NOTIFICATION-ENTRY NUMBER                │
└─────────────────────────────────────────────────────┘
```

REQUEST/RESPONSE OPERANDS

| | |
|---|---|
| AUTHORITY | (AU) |
| CAPTURE COMPLETION CODE | (CAPCC) |
| COMPARATIVE AUTHORITY | (CAU) |
| COMPARATIVE DUMPING AUTHORITY | (CDAU) |
| COMPARATIVE DUMPING SERIALIZATION | (CDS) |
| COMPARATIVE STRUCTURE AUTHORITY | (CSAU) |
| DATA-BLOCK SIZE | (DBS) |
| DUMP-LOCAL-CACHE INDENTIFIER | (DLCID) |
| DUMP-TABLE-ENTRY NUMBER | (DTEN) |
| DUMPING AUTHORITY | (DAU) |
| DUMPING INFORMATION | (DINF) |
| DUMPING-LIST LENGTH | (DLL) |
| DUMPING SERIALIZATION | (DS) |
| DUMP TABLE SIZE | (DTS) |
| ELEMENT NAME | (EN) |
| INITIALIZATION-COMPLETE INDICATOR | (ICI) |
| REPLACEMENT DUMP AUTHORITY | (RDAU) |
| STRUCTURE IDENTIFIER | (SID) |
| STRUCTURE TYPE | (ST) |
| STRUCTURE AUTHORITY | (SAU) |
| TOTAL DUMPING SPACE | (TDS) |
| ADJUNCT AREA | |
| ASSOCIATED REQUEST BLOCK | (ARB) |
| GLOBAL DUMP CONTROLS | (GDC) |

*fig. 16*

ASSOCIATED REQUEST BLOCK

| | |
|---|---|
| DUMPING-OBJECT TYPE 1 | (DOT1) |
| ADJUNCT-INCLUSION INDICATOR 1 | (AII1) |
| DIB-EXCLUSION INDICATOR 1 | (DEI1) |
| RANGE INFORMATION 1 | (RI1) |
| START OF RANGE 1 | (SR1) |
| END OF RANGE 1 | (ER1) |
| DUMPING-OBJECT TYPE 2 | (DOT2) |
| ADJUNCT-INCLUSION INDICATOR 2 | (AII2) |
| DIB-EXCLUSION INDICATOR 2 | (DEI2) |
| RANGE INFORMATION 2 | (RI2) |
| START OF RANGE 2 | (SR2) |
| END OF RANGE 2 | (ER2) |
| ⋮ | |
| DUMPING-OBJECT TYPE n | (DOTn) |
| ADJUNCT-INCLUSION INDICATOR N | (AIIn) |
| DIB-EXCLUSION INDICATOR N | (DEIn) |
| RANGE INFORMATION N | (RIn) |
| START OF RANGE N | (SRn) |
| END OF RANGE N | (ERn) |

*fig. 20*

GLOBAL DUMPING CONTROLS  *204*

| |
|---|
| ASSOCIATED-DUMP-TABLE COUNT (ADTC) |
| FREE DUMPING SPACE (FDS) |
| MAXIMUM REQUESTED DUMPING SPACE (MRDS) |
| TOTAL DUMPING SPACE (TDS) |

*fig. 24*

READ CAPTURED BLOCK

DYNAMICALLY ASSIGNING A DUMP SPACE IN A SHARED DATA FACILITY TO RECEIVE DUMPING INFORMATION TO BE CAPTURED

This application is a continuation of application Ser. No. 08/073,909, filed Jun. 8, 1993.

TECHNICAL FIELD

This invention relates in general to the field of data processing and, in particular, to a dumping facility for capturing a portion or all of the information stored within a shared or coupling facility structure.

CROSS REFERENCE TO RELATED APPLICATIONS

This application contains subject matter which is related to the subject matter of the following applications which are assigned to the same assignee as this application. Each of the below listed applications is hereby incorporated by reference:

"Configurable, Recoverable Parallel Bus," by N. G. Bartow et al., Ser. No. 07/839,657, Filed: Feb. 20, 1992 Issued Oct. 18, 1994;

"High Performance Intersystem Communications For Data Processing Systems," by N. G. Bartow et al., Ser. No. 07/839,652, Filed: Feb. 20, 1992, U.S. Pat. No. 5,412,803, Issued May 02, 1995;

"Frame-Group Transmission And Reception For Parallel/ Serial Buses," by N. G. Bartow et al., Ser. No. 07/839,986, Filed: Feb. 20, 1992, U.S. Pat. No. 5,267,240, Issued Nov. 30, 1993;

"Communicating Messages Between Processors And A Coupling Facility," by D. A. Elko et al., Ser. No. 07/860,380, Filed: Mar. 30, 1992, (Abandoned); File Wrapper Continuation application Ser. No. 08/420,893, Filed: Apr. 11, 1995, U.S. Pat. No. 5,561,809, Issued Oct. 01, 1996;

"Sysplex Shared Data Coherency Method And Means," by D. A. Elko et al., Ser. No. 07/860,805, Filed: Mar. 30, 1992;

"Method And Apparatus For Distributed Locking of Shared Data, Employing A Central Coupling Facility," by D. A. Elko et al., Ser. No. 07/860,808, Filed: Mar. 30, 1992, U.S. Pat. No. 5,339,427, Issued Aug. 16, 1994;

"Command Quiesce Function," by D. A. Elko et al., Ser. No. 07/860,330, Filed: Mar. 30, 1992, U.S. Pat. No. 5,339,405, Issued Aug. 16, 1994;

"Storage Element For A Shared Electronic Storage Cache," by D. A. Elko et al., Ser. No. 07/860,807, Filed: Mar. 30, 1992, U.S. Pat. No. 5,457,793, Issued Oct. 10, 1995;

"Management Of Data Movement From A SES Cache To DASD," by D. A. Elko et al., Ser. No. 07/860,806, Filed: Mar. 30, 1992, U.S. Pat. No. 5,493,668, Issued Feb. 20, 1996;

"Command Retry System," by D. A. Elko et al., Ser. No. 07/860,378, Filed: Mar. 30, 1992, U.S. Pat. No. 5,392,397, Issued Feb. 21, 1995;

"Integrity Of Data Objects Used To Maintain State Information For Shared Data At A Local Complex," by D. A. Elko et al., Ser. No. 07/860,800, Filed: Mar. 30, 1992, U.S. Pat. No. 5,331,673, Issued Jul. 19, 1994;

"Management Of Data Objects Used To Maintain State Information For Shared Data At A Local Complex," by J. A. Frey et al., Ser. No. 07/860,797, Filed: Mar. 30, 1992, U.S. Pat. No. 5,388,266, Issued Feb. 07, 1995;

"Recovery Of Data Objects Used To Maintain State Information For Shared Data At A Local Complex," by J. A. Frey et al., Ser. No. 07/860,647, Filed: Mar. 30, 1992, U.S. Pat. No. 5,394,542, Issued Feb. 28, 1995;

"Message Path Mechanism For Managing Connections Between Processors And A Coupling Facility," by D. A. Elko et al., Ser. No. 07/860,646, Filed: Mar. 30, 1992, (Abandoned); File Wrapper Continuation application Ser. No. 08/324,447, Filed: Oct. 18, 1994, U.S. Pat. No. 5,463,736, Issued Oct. 31, 1995;

"Method And Apparatus For Notification Of State Transitions For Shared Lists Of Data Entries," by J. A. Frey et al., Ser. No. 07/860,809, Filed: Mar. 30, 1992, U.S. Pat. No. 5,390,328, Issued Feb. 14, 1995;

"Method And Apparatus For Performing Conditional Operations On Externally Shared Data," by J. A. Frey et al., Ser. No. 07/860,655, Filed: Mar. 30, 1992, (Abandoned); File Wrapper Continuation application Ser. No. 08/383,532, Filed Feb. 1, 1995;

"Apparatus And Method For List Management In A Coupled Data Processing System," by J. A. Frey et al., Ser. No. 07/860,633, Filed: Mar. 30, 1992, U.S. Pat. No. 5,410,695, Issued Apr. 25, 1995;

"Interdicting I/O And Messaging Operations In A Multi-System Complex," by D. A. Elko et al., Ser. No. 07/860,489, Filed: Mar. 30, 1992, U.S. Pat. No. 5,394,554, Issued Feb. 28, 1995;

"Method And Apparatus For Coupling Data Processing Systems," by Elko et al., Ser. No. 07/860,803, Filed: Mar. 30, 1992, U.S. Pat. No. 5,317,739, Issued May 31, 1994; and "Authorization Method For Conditional Command Execution," by Elko et al., Ser. No. 08/021,285, Filed: Feb. 22, 1993, (Abandoned); File Wrapper Continuation Application Ser. No. 08/408,446, Filed: Mar. 22, 1995, U.S. Pat. No. 5,450,590, Issued Sep. 12, 1995.

BACKGROUND ART

As is well known, system failures cause many problems to the users of the system, especially when data is lost or corrupted. Therefore, when a data processing system fails, it is important to gather information which can aid in isolating and determining the problem associated with the failure. Previously, when failures have occurred, services provided by an operating system of a central processing complex have been used to record the contents of central processing complex storage on external media in order to facilitate problem determination.

Additionally, functions have been made available with existing operating systems to record data resident in attached storage facilities to aid in problem determination activities. This data was accessed during operating system services to capture information for failures or was requested independently from failure situations.

Prior systems require software executing at the central processing complex to direct the capture of information in storage at the central processing complex or in storage at an externally attached storage facility and to provide for the central processing complex or external storage to contain the captured data. Prior systems do not allow the capturing of data at a shared facility.

Therefore, a need exists for a technique for providing diagnostic retrieval of shared facility objects which are architecturally observable by programs accessing the shared facility. A further need exists for a technique for creating a storage dump in a coupling facility. A yet further need exists for a technique for creating a storage dump which is a logical representation of the information dumped. A further need exists for a mechanism for capturing information associated with a failure the first time the failure occurs. Another need exists for a technique for capturing a coherent and atomic snapshot of structure information. A yet further need exists for a mechanism for capturing information which minimizes disruption to programs accessing the shared facility.

SUMMARY OF INVENTION

The shortcomings of the prior art are overcome and additional advantages are provided through the provision of a method for creating a storage dump within a coupling facility coupled to one or more central processing complexes. Information located within the coupling facility, which is to be dumped, is serialized and a logical representation of the information is stored within the coupling facility.

In one embodiment, a predefined amount of dump space is assigned within the coupling facility for storing the logical representation. In one example, the allocating is performed with no disruption to on-going concurrent operations. A dump table is created within the dump space and the logical representation of information is stored within the dump table. Subsequent to storing the information, in one example, the serialization is released.

In another embodiment, the information to be dumped is located in one or more coupling facility structures and a dump table is created for each coupling facility structure.

In yet another embodiment, a method for creating a storage dump within a coupling facility, which includes a coupling facility structure and is attached to one or more central processing complexes is provided. The coupling facility structure is serialized and a dump table is associated with the serialized coupling facility structure. A logical representation of the information located within the serialized coupling facility is written to the associated dump table.

In yet another embodiment, a method for creating a storage dump in a data processing system is provided. Information to be dumped which is located in the data processing system is serialized and a logical representation of the serialized information is stored in the data processing system.

In one embodiment, a dump space is allocated within the data processing system and the logical representation is stored within the dump space. In a further example, a dump table is located within the dump space and the dump table contains the logical representation.

In another aspect of the present invention, a system for creating a storage dump within a coupling facility coupled to one or more central processing complexes is provided. The system includes, in one instance, means for serializing information located in the coupling facility to be dumped and means for storing a logical representation of the information in the coupling facility.

In another aspect of the invention, a system for creating a storage dump in a data processing system is provided. Means are provided for serializing information located in the data processing system to be dumped and for storing a logical representation of the serialized information in the data processing system.

In another embodiment, a dump space is allocated within the data processing system and the dump space contains the logical representation.

The dumping facility of the present invention advantageously serializes the structure controls to be captured, thereby providing a consistent or atomic view of the controls during the capture process. When a structure is serialized, mainline commands cannot access that structure. Serialization is of a single structure and thus, other structures not being dumped are not affected. However, serialization, which is set and reset under explicit program control, is held across multiple command executions driving the capture or dumping function. Providing for serialization to capture data within a shared facility and directing the capture of that data to storage at the central processing complex or at an externally attached storage media in a multisystem environment can have a significant impact to the overall availability and performance of the configuration.

In addition to the above, the technique of the present invention maintains the order of objects located within a structure. Further, a logical representation of the information or structure that is dumped is provided to the program. The logical representation of the information is independent of device geometry. This enables the program to understand the information. Yet further, the information dumped is self-describing.

Since the procedure for creating a storage dump in accordance with the principles of the present invention stores the structure within the coupling facility, the capture process is high speed. Further, the progress of the dump is maintained and visible by command execution.

Further, the technique of the present invention advantageously allows the total amount of dumping space used in storing the captured information to be controlled by the installation. In addition, the total dumping space is dynamically modifiable without disruption to on-going coupling facility functions. Dump tables located within the dump space are dynamically assigned to particular structures and the resources assigned to each dump table are tailored to specific requests. The instance of a dump table is uniquely identified by a dump authority.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings in which:

FIG. 4 depicts one example of the controls associated with a cache structure, in accordance with the principles of the present invention;

FIG. 6 depicts one embodiment of a directory information block in connection with the directory depicted in FIG. 3, in accordance with the principles of the present invention;

FIG. 7 depicts one example of the controls associated with the storage class, in accordance with the principles of the present invention;

FIG. 9 depicts one example of the controls associated with the list structure of FIG. 8, in accordance with the principles of the present invention;

FIG. 10 depicts one example of a list user control block, in accordance with the principles of the present invention;

FIG. 11 depicts one example of the controls associated with a list within the list structure of FIG. 8, in accordance with the principles of the present invention;

FIG. 12 illustrates one example of a list entry control block, in accordance with the principles of the present invention;

FIG. 16 depicts one embodiment of request/response operands, in accordance with the principles of the present invention;

FIG. 20 depicts one example of an associated request block, in accordance with the principles of the present invention;

FIG. 21 depicts one example of the operands associated with an object header of the dump table of FIG. 17, in accordance with the principles of the present invention;

FIG. 24 depicts one example of the operands associated with the global dumping controls contained within the coupling facility of FIG. 23, in accordance with the principles of the present invention;

DESCRIPTION OF THE PREFERRED EMBODIMENTS

In accordance with the principles of the present invention, a dumping facility is provided in which information, such as control information, located in a coupling facility structure is captured and stored in a dump area. As described in detail below, the dumping facility provides for diagnostic retrieval of structure objects of a coupling facility which are architecturally observable by programs accessing the coupling facility structure.

Figure 1:
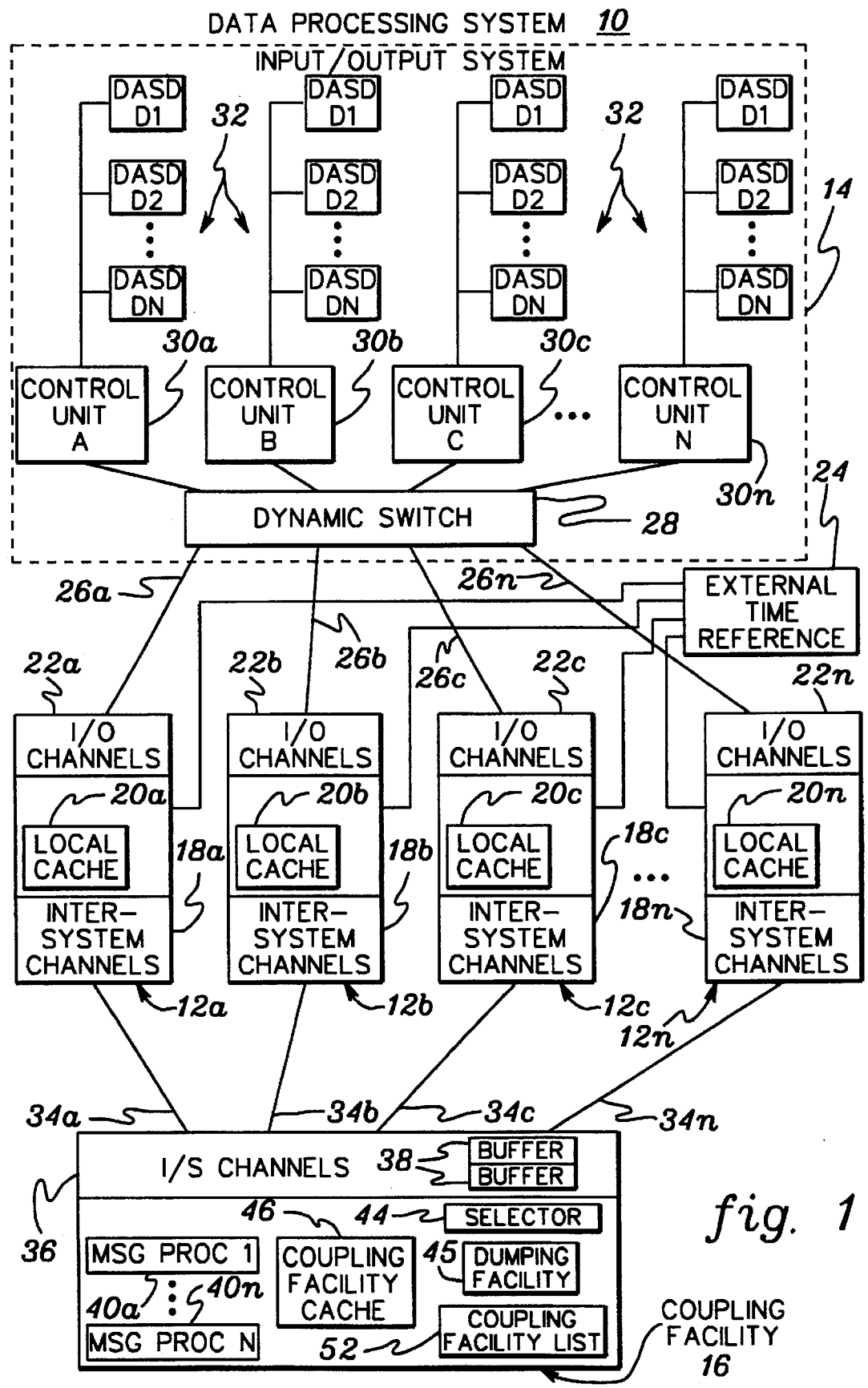
FIG. 1 depicts one example of a block diagram of a data processing system incorporating the dumping facility of the present invention.

FIG. 1 is a block diagram of a data processing system 10 incorporating the dumping facility of the present invention. Data processing system 10 includes multiple central processing complexes (CPCs) 12a through 12n which are coupled to an input/output (I/O) system 14 and a coupling facility 16. (As used herein, central processing complexes 12a–12n are collectively referred to as central processing complex (CPC) 12.) The main components associated with each central processing complex 12, input/output system 14 and coupling facility 16 are described in detail below.

Each of the CPCs 12a–12n may be an International Business Machines' (IBM) system following the Enterprise Systems Architecture/390 Principles of Operation as described in IBM publication SA22-7201-00, which is hereby incorporated by reference. Each of CPCs 12a–12n includes one or more central processing units (CPUs) (not shown) which executes an operating system, such as International Business Machines' Multiple Virtual Storage (MVS) operating system, for controlling execution of programs and the processing of data, as is well known.

In addition, each CPC 12a–12n contains a plurality of intersystem (I/S) channels 18a–18n, a plurality of local caches 20a–20n, and a plurality of input/output (I/O) channels 22a–22n, respectively. (Local caches 20a–20n are referred to herein collectively as local cache 20. Similarly, intersystem channels 18a–18n and input/output channels 22a–22n are collectively referred to as intersystem channels 18 and input/output channels 22, respectively.) It will be understood that input/output channels 22 are part of the well known channel subsystem (CSS), which also includes intersystem channels 18 disclosed herein, even though channels 18 and 22 are shown separately in FIG. 1 for convenience.

Coupled to each CPC 12a–12n is an external time reference (ETR) 24, which provides time stamps of control information to be written into a log to document recovery from failures, backing out of undesired operations and for audit trails. External time reference 24, which uses fiber optic interconnect cables, synchronizes the time clocks (not shown) of CPCs 12a–12n to a precision equal to or less than the duration of the shortest externally visible operation. External time reference 24 provides for cable length propagation time differences, where those differences are important, in order to be able to maintain synchronization to within the length of the mentioned external operation.

As depicted in FIG. 1, each central processing complex 12a–12n is coupled via a link 26a–26n, respectively, to input/output system 14. Input/output system 14 includes, for example, a dynamic switch 28, which controls access to multiple input/output (I/O) control units (CU) 30a through 30n and one or more direct access storage devices (DASD) D1 through DN (collectively referred to as DASD 32), which are controlled by the control units. Dynamic switch 28 may be an ESCON Director Dynamic Switch available from IBM Corporation, Armonk, N.Y. Such a dynamic switch is disclosed in U.S. Pat. No. 5,107,489, issued Apr. 21, 1992, entitled "Switch and Its Protocol for Making Dynamic Connections" and assigned to the owner of the present invention, which application is incorporated herein by reference. As is known, input/output commands and data are sent from a central processing complex 12a–12n to an I/O control unit 30a–30n through dynamic switch 28 by means of I/O channels 22a through 22n of the respective CPCs 12a through 12n. Channel programs for a particular I/O channel are established by channel command words (CCWs), as is well known in the art.

Each central processing complex 12a–12n is also coupled via a bus 34a–34n, respectively, to coupling facility 16. Coupling facility 16 contains storage accessible by the CPCs and performs operations requested by programs in the CPCs. In one embodiment, coupling facility 16 is a structured-external storage (SES) processor and includes, for example, a plurality of intersystem (I/S) channels 36 for communicating with intersystem channels 18a–18n, one or more buffers 38 located within intersystem channels 36 for storing data received from intersystem channels 18a–18n, message processors 40a–40n for handling messages, a selector 44 for directing message requests received over an intersystem channel to a message processor 40a–40n, a dumping facility 45, including the microcode and storage for the present invention, a coupling facility cache 46 and a coupling facility list 52, which are described in further detail below.

Even though only one coupling facility 16 is shown in the embodiment of FIG. 1, it will be understood that multiple coupling facilities may be provided for, each with its own I/S channels and message paths connected to all or some subset of the CPCs 12a–12n.

Figures 2, 5:
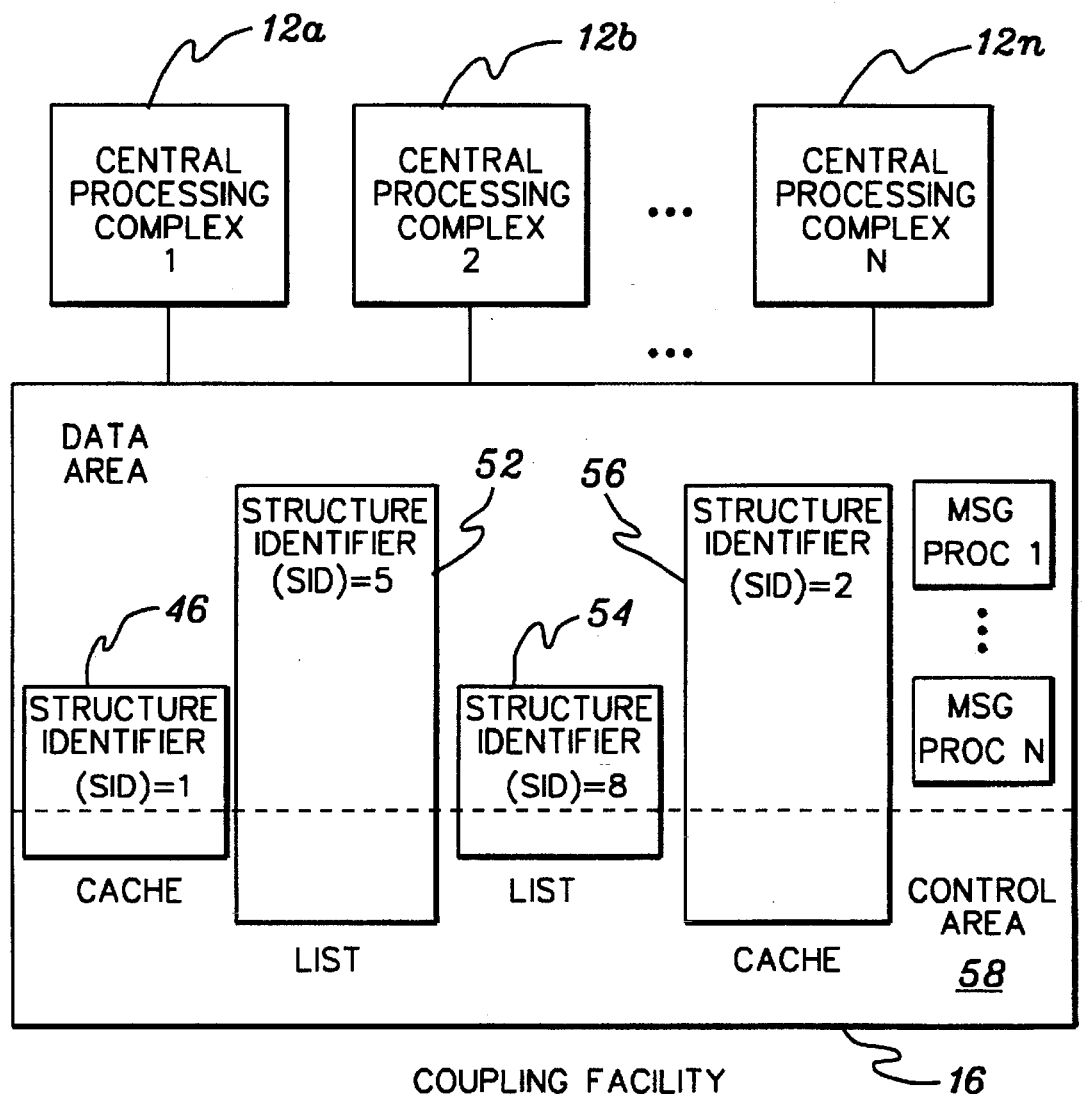
FIG. 2 depicts one example of a coupling facility including multiple storage structures, in accordance with the principles of the present invention.
FIG. 5 depicts one example of a local cache control block associated with each local cache of the data processing system depicted in FIG. 1, in accordance with the principles of the present invention.

Coupling facility cache 46 of coupling facility 16 is one example of a coupling facility storage structure. As shown in FIG. 2, coupling facility 16 includes multiple storage structures, such as storage structures 46, 52, 54 and 56. The storage structures include, for instance, list structures (for example, 52 and 54) and cache structures (for example, 46 and 56). Each coupling facility storage structure contains data objects and control objects. The data objects may reside in any storage location, whereas the control objects are generally restricted to control area 58.

A set of commands is provided for each coupling facility storage structure type, as well as additional commands for referencing global objects. The creation, deletion and attributes of a particular structure are controlled by the operating system program through allocation and de-allocation commands. Allocation commands for list structures are described in "Apparatus and Method For List Management In A Coupled Data Processing System, by J. A. Frey et al., U.S. Pat. No. 5,410,695, issued Apr. 25, 1995, which is hereby incorporated by reference in addition, allocation commands for cache structures are described in "Sysplex Shared Data Coherency Method and Means", by D. A. Elko et al., U.S. Pat. No. 5,537,574, issued Jul. 16, 1996, which is also hereby incorporated by reference.

Allocated structures (such as cache structures 46 and 56 and list structures 52 and 54) reside in separate coupling facility storage locations and are located by a structure identifier (SID). The SID value provides an identification of a target structure by a command. A command of a particular structure type, such as a cache-structure or list-structure command, may only address or alter the contents of a single structure of the given type.

Figure 3:
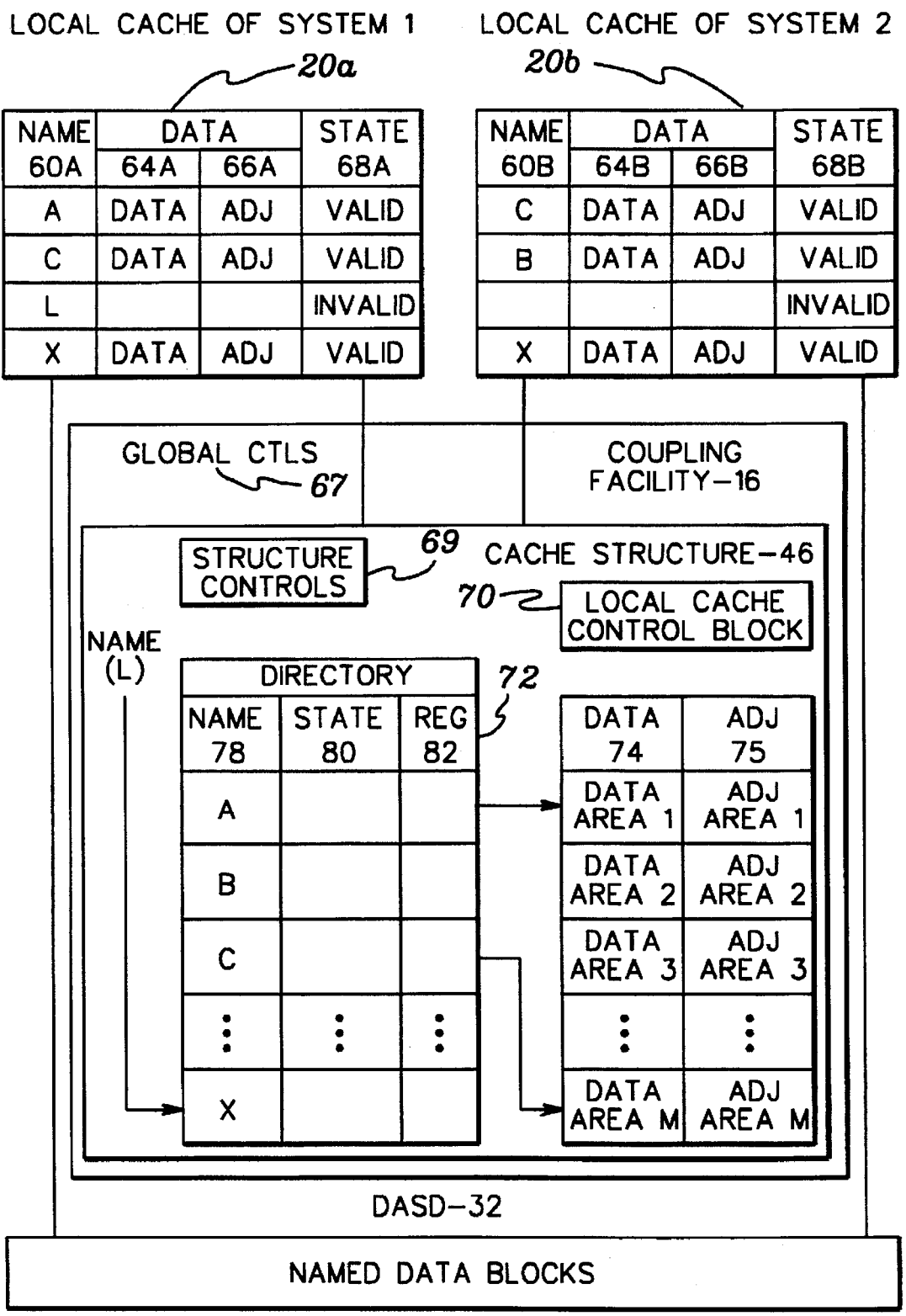
FIG. 3 depicts one embodiment of a three level storage hierarchy in a network of attached processors, in accordance with the principles of the present invention.
Figure 8:
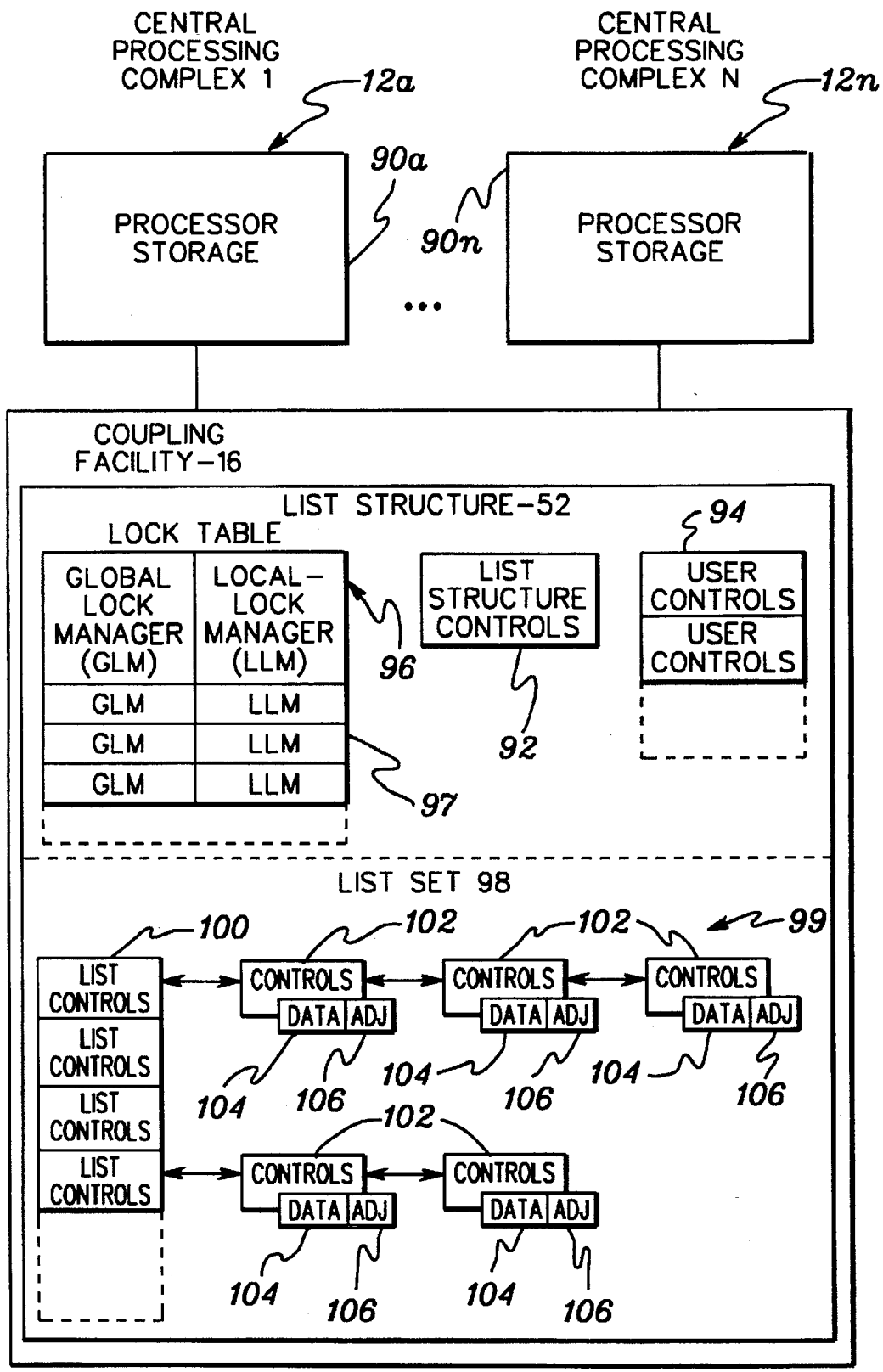
FIG. 8 depicts one example of a list structure, in accordance with the principles of the present invention.

The partitioning of the coupling facility storage and control area 58 into structures, as shown in FIGS. 2, 3 and 8, is managed by the operating system program. The data objects are organized in tables or lists with an optional adjunct data area. The remaining objects are controls. The relative amount of storage assigned to data and control objects is determined by program-specified parameters in the allocation commands.

Referring to FIG. 3, a three-level storage hierarchy in a network of attached processors 12a–12n is described. The lowest level of the hierarchy is DASD 32, the intermediate level is coupling facility cache structure 46, and the highest level is local cache 20 (e.g., local caches 20a and 20b). Each of these levels is described below.

Direct access storage devices 32 include named data blocks which represent data stored in the devices. Local caches 20a and 20b include, for instance, a 16-byte name field 60A, 60B for referencing data; a data field 64A, 64B for storing the data; an optional adjunct data field 66A, 66B for additional data; and a state field 68A, 68B, respectively for indicating whether the data is valid or invalid. When the data is located in local cache 20, the state of the data is either valid or invalid. The data is validated by CPU instructions and invalidated by, for example, SES-write and SES-invalidate operations. The valid state of the data is tested by a CPU instruction. A valid named data object must be registered in a coupling facility cache directory, described below, in order to maintain local cache coherency. Local cache coherency is maintained by the invalidation process. A registered local-cache entry may test as invalid.

Cache structure 46 includes, for instance, a number of cache structure controls 69, a local-cache control block (LCCB) 70, a directory 72, a data area 74, and an adjunct area 75, each of which is explained in further detail below.

As shown in FIG. 4, cache structure controls 69 include, for instance, the following controls:

(a) Total-Directory-Entry Count (TDEC): A value that specifies the number of directory entries allocated for the cache.

(b) Total-Data-Area-Element Count (TDAEC): A value that specifies the number of data-area elements allocated for the cache.

(c) Adjunct-Assignment Indicator (AAI): A value that indicates the presence or absence of adjunct areas. Two possible values are: adjunct areas not assigned; adjunct areas assigned. When adjunct areas are assigned, an adjunct area is associated with each directory entry.

(d) Maximum Storage Class (MSC): A value that specifies the number of storage classes. Valid storage-class values range from one to the maximum-storage-class value.

(e) Maximum Castout Class (MCC): A value that specifies the number of castout-classes. Valid castout-class values range from one to the maximum-castout-class value.

(f) Data-Area-Element Characteristic (DAEX): A value that specifies the number of bytes in each data-area element. The size of the data-area element in bytes is the product of 256 and 2 raised to the power of the value specified in the data-area-element characteristic.

(g) Maximum Data-Area Size (MDAS): A value that specifies the maximum allowable size of a data area as an integral multiple of the data-area-element size. The maximum data-area size is set by the program when the cache is allocated.

(h) Structure Size (SS): A value that specifies the number of units of, for example, SES storage allocated for the cache.

(i) Maximum Structure Size (MXSS): A value that specifies the maximum number of units of SES storage that can be allocated for the cache.

(j) Minimum Structure Size (MNSS): A value that specifies the minimum number of units of SES storage that can be allocated for the cache.

(k) Structure Authority (SAU): A value associated with each bit in the SID vector.

(l) User Structure Control (USC): A value defined by the user.

(m) LCID Vector (LCIDV): A bit string with an initial value of zero. The bit positions start at zero and increase sequentially to the local-cache-identifier limit. The bit at position (i) in the string is set to one when a local cache is attached with an LCID value of (i). When the bit is one, the local-cache-identifier is assigned. The bit at position (i) is reset to zero when the local cache is detached and LCID unassignment is requested, when the cache structure is de-allocated, or when a SES power-on reset occurs. When the bit is zero, the local-cache-identifier is not assigned.

(n) Target Structure Size (TSS): A value that specifies the target number of units of SES storage to be allocated.

(o) Target Data-Area-Element Count (TGDAEC): A value that specifies the target for the maximum number of data-area elements that are available for assignment to directory entries in a cache structure.

(p) Target Directory-Entry Count (TGDEC): A value that specifies the target for the maximum number of possible directory entries in a cache structure.

As mentioned above, in addition to structure controls 69, cache structure 46 includes local-cache control block 70. In one embodiment, local-cache control block 70 includes the following fields (FIG. 5):

(a) Local-Cache Identifier (LCID): A value that identifies a local-cache.

(b) Attachment Status (AS): A control that describes the state of the attachment of a local cache. When the value of the attachment status is one, the local cache is attached. When the value of the attachment status is zero, the local cache is detached.

The attachment status controls the execution of commands that specify the local cache. When the local cache is attached, all commands that specify the local cache are processed normally. When the local cache is detached, all commands that specify the local cache, except attach local-cache, detach local-cache and read local-cache information are suppressed with a request-exception condition.

(c) Local-Cache Token (LCT): A value used to identify the local cache on the CPC.

(d) Local-Cache Authority (LCAU): A value set by the program when the local cache is attached.

(e) System Identifier (SYID): A value specified by the program when a message path is activated. The system identifier is maintained in the message-path status vector and copies into the local cache controls when an attach-local-cache command is communicated over the message path.

(f) Attachment Information (AINF): A value set by the program when the local cache is attached.

Referring back to FIG. 3, cache structure 46 also includes a directory 72. Directory 72 is a collection of directory entries positioned into storage classes and arranged as a fully associative array. The subset of changed directory entries is additionally positioned into castout classes. As described with reference to FIGS. 3 and 6, directory 72 includes a name field 78, a state field 80 for indicating the state of each directory entry and a register field 82, described below. Whenever a named data object is placed in the higher two levels of the storage hierarchy (i.e., coupling facility cache 46 and local cache 20), its name is registered in name column 78 and its state is registered in state column 80 by coupling facility cache directory 72. In general, state information indicates whether the data is changed, unchanged, locked for castout, or resident in coupling facility 16. In particular, state field 80 includes:

(a) User-Data Field (UDF): The user-data field contains a value that is associated with the data when it is initially changed in the SES cache and is maintained until the data-table entry is re-used. The user-data field is valid when the data is cached as changed.

(b) Storage Class (SC): A value which identifies the storage class assigned for the name.

(c) Change Indicator (C): A value which, in conjunction with the castout lock, indicates the changed state of the data. When the change bit is one, the data is cached as changed. When the change bit is zero and the data is not locked for castout, the data is either not cached, or is cached but not changed. When the change bit is zero and the data is locked for castout, the data is cached as changed. Whenever the data is in the changed state, the most recent version of the data resides in the cache. When the change bit is one, the data bit must also be one.

(d) Data-Cached Indicator (D): A value which indicates whether the data is located in the SES cache. When the data bit is one, the data is cached. When the data bit is zero, the data is not cached.

(e) Cast-Out-Parity-Bits Indicator (CP): A field which indicates the current assignment of the castout parity. Three possible values are: castout parity is zero; castout parity is one; the castout parity is unknown.

(f) Cast-Out Class (CC): A value which identifies the cast-out class assigned for the name.

(g) Cast-Out-Lock Value (CLV): A value which indicates the castout state of the data. When the cast-out-lock is zero, the data is not being castout. When the cast-out-lock is not zero, the value of the first byte of the cast-out-lock identifies the local cache that is casting out the data block from the SES cache to DASD. The value of the second byte identifies the castout process on the local system. When the cast-out-lock is not zero, the data bit must be one.

(h) Data-Area Size (DAS): A value that specifies the size of the data area as an integral multiple of the data-area-element size. The initial value is zero when the directory entry is assigned and is zero until the data bit is set to one.

In addition to the above, register 82 is a table containing information on the location of the locally cached copies of the data block. Each row in the table corresponds to an attached local cache. The columns contain the local-cache-entry number (LCEN) and a valid bit (LVI) for the local-cache-entry number. When LVI is zero, the LCEN field is invalid. Location information includes which of the local caches 20a–20n contains a copy. Certain SES-read and SES-write commands register the local-cache copy in coupling facility cache directory. SES-write and SES-invalidate commands remove the registration and invalidate local copies.

Cache structure 46 further includes data areas 74 and optional adjunct data areas 75. The data sizes are variable with the range of variability being, in one embodiment, between 1 and n times the data-area element size. The data-area element sizes are fixed for each coupling facility cache structure 46 and are powers of 2 with a minimum size of 256 bytes.

Coupling facility cache 46 is normally smaller than DASD storage 32. Thus, periodically, the changed data is transferred from cache 46 to the backing DASD 32 (FIG. 3). This process, called castout, is controlled by the operating system program. In one embodiment, a control associated with a castout class includes a castout class count, which indicates the number of elements associated with the castout class. Castout involves for a coupling facility, such as a SES facility, the following operations:

A SES-read for castout operation is issued that sets the castout serialization and copies the data block to main storage which may or may not be put in local cache 20.

An I/O operation is executed that copies the data block to DASD 32.

A SES-unlock castout locks operation is issued that releases the castout serialization.

Multiple castout processes may co-exist for a single one of local caches 20a–20n. Whenever data is locked for castout, an identifier for local cache 20a–20n and an identifier for the castout process are placed in directory 72. This is disclosed in U.S. Pat. No. 5,493,668, issued Feb. 20, 1996, entitled "Management of Data Movement from a SES Cache to DASD" by D. A. Elko, et al., incorporated herein by reference as noted.

The least recently used (LRU) unchanged data and directory resources are reclaimed by coupling facility cache 46 when needed to meet new requests. The data objects are mapped into one of several storage classes by the operating system program. Each storage class has a reclaiming vector including, for instance, reclaiming-vector entry 1 (RVE1) through reclaiming-vector entry 64 (RVE64), that controls the reclaiming process. This allows the allotment of coupling facility storage among the storage classes to be dynamically adjusted to account for changes in workload characteristics. The reclaiming vector is maintained by the operating system program. This is disclosed by U.S. Pat. No. 5,457,793, issued Oct. 10, 1995, entitled "Storage Element for a Shared Electronic Storage Cache" by D. A. Elko, et al., incorporated herein by reference as noted.

In addition to the reclaiming vector, each storage class includes the following controls (described in detail in U.S. Pat. No. 5,457,793, issued Oct. 10, 1995, listed above), which are depicted in FIG. 7:

(a) Read-Hit Counter (RHC): Data was returned for a read-and-register command.

(b) Read-Miss-Directory-Hit Counter (RMDHC): A read-and-register-command specified an assigned name in the directory for which the data was not cached.

(c) Read-Miss-Assignment-Suppressed Counter (RMASC): A read-and-register command specified a name which was not assigned in the directory and name assignment was suppressed for the command.

(d) Read-Miss-Name-Assigned Counter (RMNAC): A read-and-register command specified a name which was not assigned in the directory and a directory entry was successfully assigned to the name.

(e) Read-Miss-Target-Storage-Class-Full Counter (RMTSFC): A read-and-register command specified a name which was not assigned in the directory and a name-assignment could not be completed for the specified storage class due to a lack of storage resources in the target storage class.

(f) Write-Hit-Change-Bit-0 Counter (WHCB0C): A write-and-register or write-when register command completed by storing the data with the change bit set to zero.

(g) Write-Hit-Change-Bit-1 Counter (WHCB1C): A write-and-register or write-when register command completed by storing the data with the change bit set to one.

(h) Write-Miss-Not-Registered Counter (WMNRC): A write-when-registered command could not be completed; the specified local-cache-entry was not listed in the user register.

(i) Write-Miss-Invalid-State Counter (WMISC): A write-and-register or write-when-registered command specified a change-bit value of zero when the data was cached as changed.

(j) Write-Miss-Target-Storage-Class-Full Counter (WMTSLFC): A write-and-register or write-when-registered command could not be completed for the source storage class due to a lack of storage resources in the target storage class.

(k) Directory-Entry-Reclaim Counter (DERC): A name-assignment operation for the storage class required that a directory entry be reclaimed and the reclaim operation was successful.

(l) Data-Area-Reclaim Counter (DARC): A data-area-assignment operation for the storage class required that a data area be reclaimed and the reclaim operation was successful.

(m) XI-For-Directory-Reclaim Counter (XIFDRC): A cross-invalidate (XI) signal was issued to satisfy a directory-entry-reclaim operation.

(n) XI-For-Write Counter (XIFWC): A cross-invalidate (XI) signal was issued to satisfy a write-when-registered or write-and-register command.

(o) XI-For-Name-Invalidation Counter (XINIC): A cross-invalidate (XI) signal was issued to satisfy an invalidate-name command.

(p) XI-For-Complement-Invalidation Counter (XICIC): A cross-invalidate (XI) signal was issued to satisfy an invalidate-complement-copies command.

(q) Castout Counter (COC): A castout operation was performed for the storage class.

(r) Reference-Signal-Miss Counter (RSMC): A name was processed for the process-reference-list command which was not found in the directory.

(s) Target-Storage-Class-Full Counter (TSCFC): A directory-entry assignment or data-table-entry assignment could not be completed when the storage class was selected as the target storage class.

(t) Directory-Entry-Counter (DEC): The number of directory entries assigned to the storage class.

(u) Data-Area-Element Counter (DAEC): The number of data-area elements assigned to the storage class.

(v) Total Changed Count (TCC): The number of directory entries in the storage class that are in the changed state; i.e., either the change bit is set or the castout lock is set to a non-zero value. The count is returned on a write-when-registered or write-and-register command when a change signal is processed, as well as, on a read-storage-class-information command.

(w) Data-Area Counter (DAC): The number of data areas assigned to the storage class.

(x) Completed-Reference-List Counter (CRLC): Processing of a reference list had been completed by initiating a reference signal for each name that is in the name list and is assigned to the directory.

(y) Partially-Completed-Reference-List Counter (PCRLC): Processing of a reference list was abandoned due to the expiration of a model-dependent timeout.

(z) XI-For-LCEN-Replacement Counter (XILRC): A cross-invalidate (XI) signal was issued to satisfy a local-cache-entry-registration process.

(aa) Repeat Factor (RF): Specifies the number of times the reclaim vector counters are to be initialized with the values in the reclaim vector operand specified on a SET RECLAIM VECTOR command.

(ab) Reclaim Vector (RV): An array of counters associated with each storage class. A reclaim vector entry (RVE) exists for each storage class defined in the cache and is indexed by a storage class value.

Referring back to FIG. 3, cache structure 46 is located within coupling facility 16. Also contained within facility 16 is a set of global controls 67. In one embodiment, global controls 67 include a coupling facility authority control (e.g., a SES authority control) as well as facility dependent information, such as total free space for the coupling facility and the largest data block to be stored in the coupling facility, etc.

Described in detail above is one example of a cache storage structure. In addition to cache structures, there are list structures, such as list structure 52, depicted in FIGS. 2 and 8. Referring to FIG. 8, the contents of a list structure, such as list structure 52, is described in detail.

List structure 52 resides within coupling facility 16. As shown in FIG. 8, in one embodiment, coupling facility 16 is coupled to processor storage 90a–90n located within each CPC 12a–12n, respectively. List structure 52 includes list-structure controls 92, user controls 94 and, optionally, a lock table 96, and/or a list set 98. List set 98 includes list controls 100 and list-entry controls 102. Each of the components of list structure 52 is described in detail below.

List structure controls 92 contain attributes of the structure and are initialized when list structure 52 is created. One example of the controls associated with list structure controls 92 is depicted in FIG. 9. Referring to FIG. 9, list structure controls 92 include:

(a) Maximum Data-List-Entry Size (MDLES): An object or field that specifies the maximum size of the data list entry.

(b) List-Structure Type (LST): An object or field that indicates the list objects created on allocation. A field contains a counter indicator (CI), a lock indicator (LI), a data indicator (DI), an adjunct indicator (AI), a name indicator (NI) and a key indicator (KI).

The counter indicator specifies that either: a list-entry count and list-entry-count limit are defined or a list-element count and list-element-count limit are defined.

The lock indicator specifies whether or not a lock table is created.

The data and adjunct indicators specify whether: no list-set is created; list entries have adjunct only; list entries have data only; or list entries have data and adjunct in the list entries.

The name indicator specifies whether or not list entries are names.

The key indicator specifies whether or not the list entries are keyed.

(c) Lock-Table-Entry Characteristic (LTEX): An object or field that specifies the number of bytes in each lock-table entry. The number of bytes is the product of 2 raised to the power of the LTEX value.

(d) List-Element Characteristic (LELX): An object or field that specifies the number of bytes in each list element. The number of bytes is the product of 256 and 2 raised to the power of the LELX value.

(e) Minimum Structure Size (MNSS): A value that specifies the minimum number of units of SES storage that can be allocated for the list.

(f) Lock-Table-Entry Count (LTEC): An object or field that specifies the number of lock-table entries allocated.

(g) List Count (LC): An object or field that specifies the number of lists created.

(h) Structure Size (SS): An object or field that specifies the amount of storage allocated.

(i) Maximum Structure Size (MXSS): A value that specifies the maximum number of units of SES storage that can be allocated for the list.

(j) Target Structure Size (TSS): A value that specifies the target number of units of SES storage to be allocated.

(k) Target Maximum-Element Count (TMELC): A value that specifies the target for the maximum number of list elements that are available for assignment to list entries or retry-data blocks, or both, in the list set.

(l) Target Maximum-Entry Count (TMEC): A value that specifies the target for the maximum number of possible list entries in a list set.

(m) Maximum List-Set-Element Count (MLSELC): An object or field that specifies the maximum number of list elements that are available for assignment to list entries or retry-data blocks, or both, in the list set.

(n) List-Set-Element Count (LSELC): An object or field that specifies the number of list elements that have been assigned to list entries or retry-data blocks, or both, in the list set.

(o) Non-Zero-Lock-Table-Entry-Count (NLTEC): An object or field that specifies the number of non-zero lock-table entries that exist in the structure.

(p) Maximum List-Set-Entry Count (MLSELC): An object or field that specifies the maximum number of possible list entries in a list set.

(q) List-Set-Entry Count (LSEC): An object or field that specifies the number of existing list entries in the list set.

(r) Structure Authority (SAU): A value associated with each bit in the SID vector.

(s) User Structure Control (USC): A field per structure defined by the user.

(t) User-Identifier Vector (UIDV): An object or field that specifies the assigned UIDs, described below.

Referring back to FIG. 8, user controls 94 are created and initialized when the list-structure user is attached. In one embodiment, user controls 94 include the following fields (FIG. 10):

(a) A User Identifier (UID): A value that identifies an attached list user.

(b) A User State (US): A field that specifies the state of the user. The value has the following encoding: the user is detached; the user is attached.

(c) A List-Notification Token (LNT): A value that specifies a list-notification vector to the system.

(d) A User Authority (UAU): A value that is compared and conditionally updated.

(e) A System Identifier (SYID): A value specified by the program when a message path is activated. The system identifier is maintained in the message-path status vector and copied into the user controls when an attach-list-structure-user command is communicated over the message path.

(f) A User-Attachment Control (UAC): A field per attached user defined by the user.

Referring once again to FIG. 8, lock table 96 consists of a sequence of one or more lock table entries 97 identified by a lock-table-entry number (LTEN). In one embodiment, lock table entry 97 includes a lock-table-entry number (LTEN), which starts at zero and runs consecutively and a lock-table-entry value (LTEV), including a global-lock manager (GLM) object and optionally, a local-lock-manager (LLM) object or both. The lock-table entry format is determined by the list-structure type located within list structure control 92.

Commands associated with list structure 52 provide a means for updating lock-table entry 97. That is, a command may compare global-lock managers (GLM) and conditionally replace a global-lock manager (GLM), a local-lock manager (LLM), or both the global-lock and local-lock managers (GLM) and (LLM). The list commands also provide a means for reading an entry in lock-table 96 or the next non-zero lock-table entry, or for clearing lock table 96.

As previously mentioned, also contained within list structure 52 is list set 98. In one example, list set 98 includes one or more lists 99 represented by list controls 100, which are numbered consecutively, starting at zero. In one embodiment, list controls 100 include the following controls, as depicted in FIG. 11:

(a) List-Entry-Count Limit (LECL): An object or field that specifies the maximum number of possible list entries in a list. This object is initialized to the maximum list-set-entry count when a list structure is created.

(b) List-Entry Count (LEC): An object or field that specifies the number of list entries currently in the list.

(c) List-State-Transition Count (LSTC): An object or field that specifies the number of empty to not-empty list state transitions that have occurred.

(d) List Authority (LAU): A value that is compared and conditionally updated. The LAU is initialized to zeros.

(e) User List Control (ULC): A field per list defined by the user.

(f) List-Monitor-Table (LMT): The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit.

Each list-monitor-table entry has a list-monitoring-active-bit object, a list-notification-request-type object and a list-notification-entry-number object, each of which is described below:

(1) List-Monitoring-Active Bit (LMAB): An object or field that specifies whether the user associated with the list-monitor-table entry is monitoring the list-state transitions of the list.

When a user is not monitoring a list, all previously issued list-notification commands on behalf of the associated user for this list are complete.

(2) List-Notification-Request Type (LNRT): An object or field that indicates whether the list-notification-vector summaries are to be updated when an empty to not-empty state transition occurs on a monitored list.

(3) List-Notification-Entry Number (LNEN): An object or field that specifies a list-notification-vector entry.

Each list 99 consists of a sequence of zero or more entries. The list-structure type (described above) determines whether all the list entries in list set 98 have a data list entry 104, an adjunct list entry 106, or both. Associated with each entry of a list 99 is one of list-entry controls 102. Controls 102 contain list-entry-location information and other information for controlling operations against data list entry 104.

In particular, list entry controls 102 include the following controls, as depicted in FIG. 12:

(a) Data-List-Entry Size (DLES) indicating the size of the associated data entry.

(b) A List Number (LN) representing the list that a particular entry is associated with.

(c) A List-Entry Identifier (LEID) identifying a particular list entry. The list-entry identifier is unique to a list set 98 and is assigned by coupling facility 16.

(d) A Version Number (VN) object that is conditionally compared and conditionally updated, reflecting a program specified state for the list entry.

(e) An optional List-Entry Key (LEK) indicating a key, if one exists. When list-entry keys exist, the keyed list entries are ordered by the key with the lowest numerical key at the leftmost position. Elements with the same key value may be located by first or last within the same key value.

When an unkeyed list entry is created or moved, the target list-entry position is always located by an unkeyed position. When a keyed list entry is created or moved, the target list-entry position is always located by a keyed position and first or last within the same key value.

(f) An optional List-Entry Name (LEN). A list-entry name is unique to a list set 98 (FIG. 8) at any particular instant and is provided by the operating system program.

List commands provide a means for conditionally creating, reading, replacing, moving, or deleting one entry in list 99. A number of comparisons may be requested during these processes. They include a list-number comparison, a version-number comparison, a global-lock-manager (GLM) comparison, or any combination of the preceding. Additionally, when global locks are compared, local locks (LLM) may be compared. A list entry may be moved from one list 99 to another within the same structure 52 or from one position to another within the same list 99. This is disclosed in U.S. patent application Ser. No. 08/383,532 for "Method and Apparatus for Performing Conditional Operations on Externally Shared Data" by J. A. Frey, et al. PO9-92-008X, incorporated herein by reference as noted.

The position of a list entry in list 99 is determined when it is created, and may be changed when any entry in the list is created, deleted or moved. A list entry or list-entry position is located within a list set 98 by means of the list-entry identifier or the optional list-entry name (as described above), or by position. Position is specified by means of a list number, a direction, and an optional list-entry key.

The list commands also provide a means for synchronously writing and moving, moving and reading, or reading and deleting one entry of a list 99. More than one list entry may be deleted synchronously, and more than one data list entry 104 or adjunct list entry 106 may also be read synchronously. Data list entry 104 is always returned in the data area designated in main storage by a message-operation block, described below. The adjunct list entry is returned in either a message-response block or the data area, depending on the command. This is disclosed in U.S. Pat. No. 5,410,695, issued Apr. 25, 1995, entitled "Apparatus and Method for List Management in a Coupled Data Processing System" by J. A. Frey, et al., incorporated herein by reference as noted.

Figure 13:
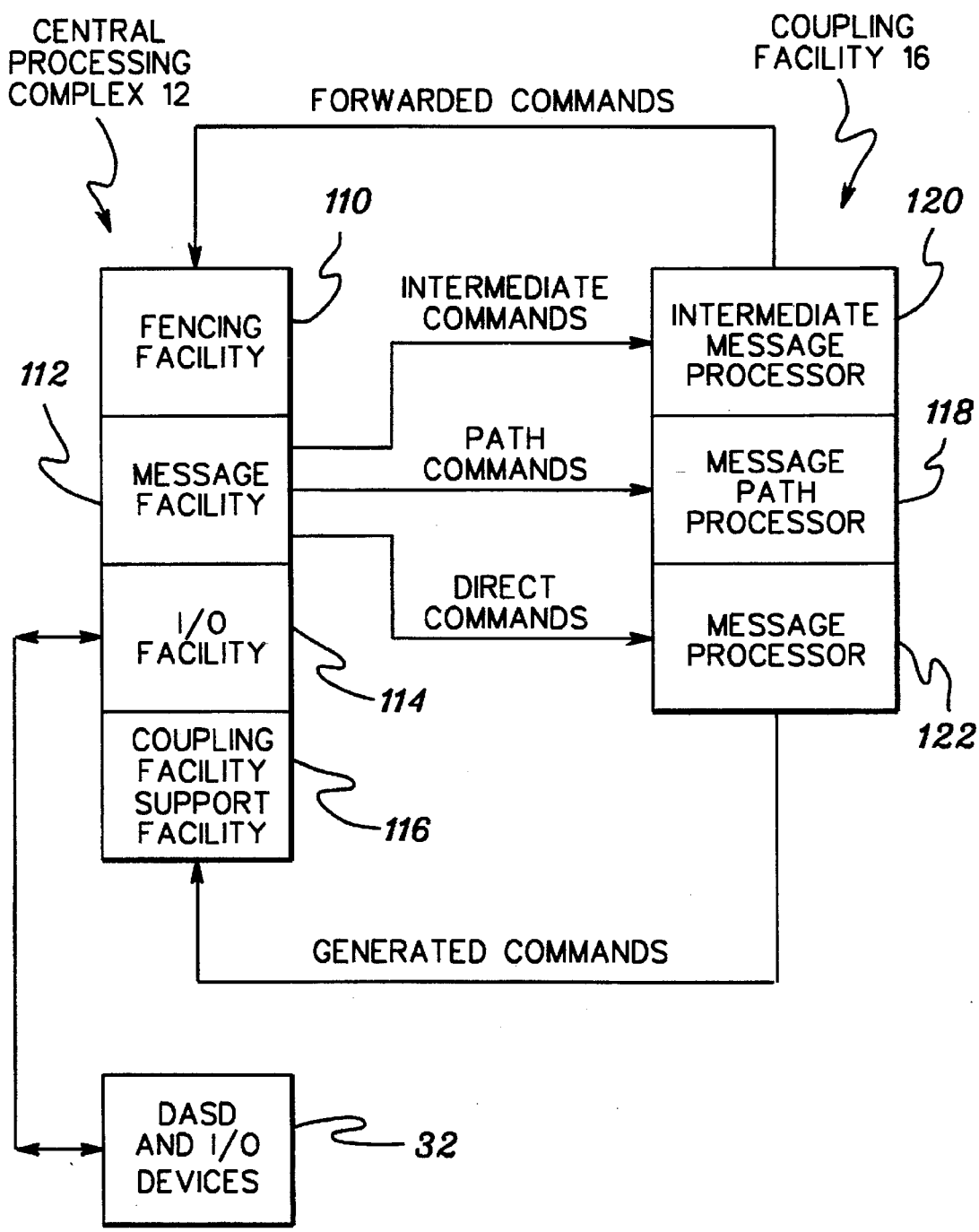
FIG. 13 depicts one embodiment of the components associated with message processing occurring within the data processing system of FIG. 1, in accordance with the principles of the present invention.

In a multisystem environment, the processing between the central processing complexes and the coupling facility is an important aspect. One embodiment of the components associated with message processing are depicted in FIG. 13. As depicted in FIG. 13, a single CPC 12 is connected to coupling facility 16. Central processor complex 12 includes, for instance, a fencing facility 110, a message facility 112, an input/output (I/O) facility 114 and a coupling facility support facility 116. Coupling facility 16 includes, for instance, a message-path processor 118, an intermediate-message processor 120 and a message processor 122. Message-path processor 118 executes message-path commands and performs message-path functions. Intermediate-message processor 120 forwards intermediate message commands to remote message processors, such as fencing facility 110. Message processor 122 supports structured storage of the list and cache type. Each of the facilities of CPC 12 are explained below.

Fencing facility 110 executes commands that are received from other message facilities via intermediate message processor 120. The commands are often issued by programs running on other central processing complexes. The commands operate on an authorization vector and a channel-subsystem-state indication. (Described in U.S. Pat. No. 5,394,554, issued Feb. 28, 1995, entitled "Interdicting I/O and Messaging Operations In A Multi-System Complex," by D. A. Elko et al.

Message facility 112 performs message operations with processors 118, 120 and 122, and with fencing facilities 110. The SEND MESSAGE instruction is used to initiate a message operation with a coupling facility 16 or fencing facility 110. This facility and instruction are disclosed in U.S. Pat. No. 5,561,809, issued Oct. 01, 1996 for "Communicating Messages Between Processors and a Coupling Facility", incorporated herein by reference as noted.

I/O facility 114 performs input/output (I/O) operations and executes channel programs with DASD and I/O devices. The START SUBCHANNEL instruction is used to initiate an I/O operation in a manner well known in the art. The I/O facility is described in the aforementioned ESA/390 Principles of Operation.

Coupling facility support facility 116 performs coupling facility support functions in CPC 12 and executes commands generated by message processor 122 in coupling facility 16.

Five separate types of message commands are defined and communicated between the hardware components of coupling facility 16 and CPC 12. The message commands include path commands, direct commands, generated commands, intermediate commands and forwarded commands. Each type of command is described below.

Path commands are communicated from message facility 112 to message path processor 118 via the SEND MESSAGE instruction over a selected message path associated with the subchannel. Path selection is performed by the control program of CPC 12. Three path commands are defined: identify message path, activate message path and deactivate message path.

The control program uses the SEND MESSAGE (SMSG) instruction to initiate an operation by message processor 122. Execution of the message-processor operation is accomplished by sending command information to coupling facility 16 and returning response information summarizing the result. Additionally, the command may specify the transfer of data from main storage to the coupling facility storage, a coupling facility write operation (e.g., SES-write operation), or the transfer of data from coupling facility storage to main storage, a coupling facility read operation (e.g., SES-read operation).

Direct commands are communicated from message facility 112 to message processor 122 via the SEND MESSAGE instruction over a selected message path associated with the subchannel. Path selection is performed by the channel subsystem or CPU and the direct command must be communicated on an active message path. The direct command may also include a data transfer operation. Direct commands are not forwarded, but may generate one or more commands. The classes of direct commands include: global commands, retry-buffer commands, cache-structure commands, and list-structure commands.

Generated commands are communicated from message processor 122 to support facility 116 in a designated CPC over a message path selected by message processor 122 from the path group for the system. The coupling support facility comprises a processor for execution of the generated commands communicated over a message path. Path selection is performed by message-path processor 118. No data transfer occurs. Generated commands must be communicated on an active message path. The generated commands include the cross-invalidate commands explained in U.S. Pat. No. 5,537,574, issued Jul. 16, 1996, entitled "Sysplex Shared Data Coherency Method and Means," and the list-notification commands, explained in "Method and Apparatus For Notification of State Transitions For Shared Lists of Data Entries," U.S. Pat. No. 5,390,328, Feb. 14, 1995, each of which is hereby incorporated by reference. Depending on the command, processing of the generated commands may or may not complete prior to completion of the associated direct command. However, a direct command does not complete before the action intended by the generated command is assured.

Intermediate commands are communicated from message facility 112 to intermediate message processor 120 via the SEND message instruction over a selected message path associated with the subchannel. Path selection is performed by the channel subsystem or CPU. Intermediate fencing commands are forwarded to fencing facility 110 in a designated CPC.

Forwarded commands are communicated from intermediate message processor 120 to a fencing facility 110. Path selection is performed by message-path processor 118. Forwarded commands must be communicated on an active message path. Exactly one forwarded command is processed for each intermediate command that is received at intermediate message processor 120. Processing of the forwarded command must complete prior to completion of the associated intermediate command.

All communication to a coupling facility 16 from CPC 12 may use the same message path, depending on the configuration, regardless of whether the destination is message processor 122, message path processor 118, or intermediate message processor 120. All communications from coupling facility 16 to a CPC 12 may also use the same set of message paths, depending on the configuration, regardless of whether the destination is fencing facility 110 or coupling support facility 116. (One example of coupling support facility 116 is SES support facility 116.)

Fencing facility 110 is a component of the ESA/390 channel subsystem. Fencing commands are issued by CPU programs, but they are executed by fencing facilities. Command execution involves fetching request operands from main storage, operating on storage objects at the fencing facility and storing response operands in main storage.

Eight mechanisms exist for message paths: identification, activation, testing, deactivation, delivery of cross-invalidate or list notification commands, direct commands, responses and delivery of fencing commands.

Message-path identification and activation is performed by the CPU program to allow for selective configuration of links for communicating commands. Testing is performed for subsequent commands that are delivered on the message paths with execution permitted only for active paths. When an interface control check is presented for a command and it is discovered that a path is no longer operational, the path is inactive at coupling facility 16.

Cache cross invalidation is performed by coupling facility 16 when, for instance, a SES write operation is executed for data in coupling facility cache structure 46 that is registered in one or more local caches 20a–20n. Before completing the SES write operation, coupling facility 16 sends a cross-invalidate command to each system that contains a valid copy of the data in a local cache 20a–20n in order to maintain coherency of local caches 20a–20n via a selected message path. This is disclosed in U.S. Pat. No. 5,537,574, issued Jul. 16, 1996, entitled "Sysplex Shared Data Coherency Method and Means" by D. A. Elko et al., incorporated herein by reference as noted.

Notification of list-state transition is performed by coupling facility 16 when a list operation is executed that causes a list, which was empty, to become not empty, or that causes a list, which was not empty, to become empty. In either case, a list-notification command is sent to each system that is monitoring the list, informing the system of the state transition. This is disclosed in U.S. Pat. No. 5,390,328, issued Feb. 14, 1995, entitled "Method and Apparatus for Notification of State Transitions for Shared Lists of Data Entries" by J. A. Frey, et al., incorporated herein by reference as noted.

A system fencing command, isolate or isolate using index, is issued by a program running on one CPC and is targeted to a system image located on a target CPC. Execution of the fencing command on the target CPC results in the isolation of the target system, or of a subsystem running on the target system, from resources shared by systems in a sysplex, that is, a system having multiple CPCs. This is disclosed in U.S. Pat. No. 5,394,554, issued Feb. 28, 1995, entitled "Interdicting I/O and Messaging Operations in a Multi-System Complex" by D. A. Elko, et al., incorporated herein by reference as noted. System fencing commands are routed to the target by sending the command to coupling facility 16, which forwards the command to the target system image.

Figure 14:
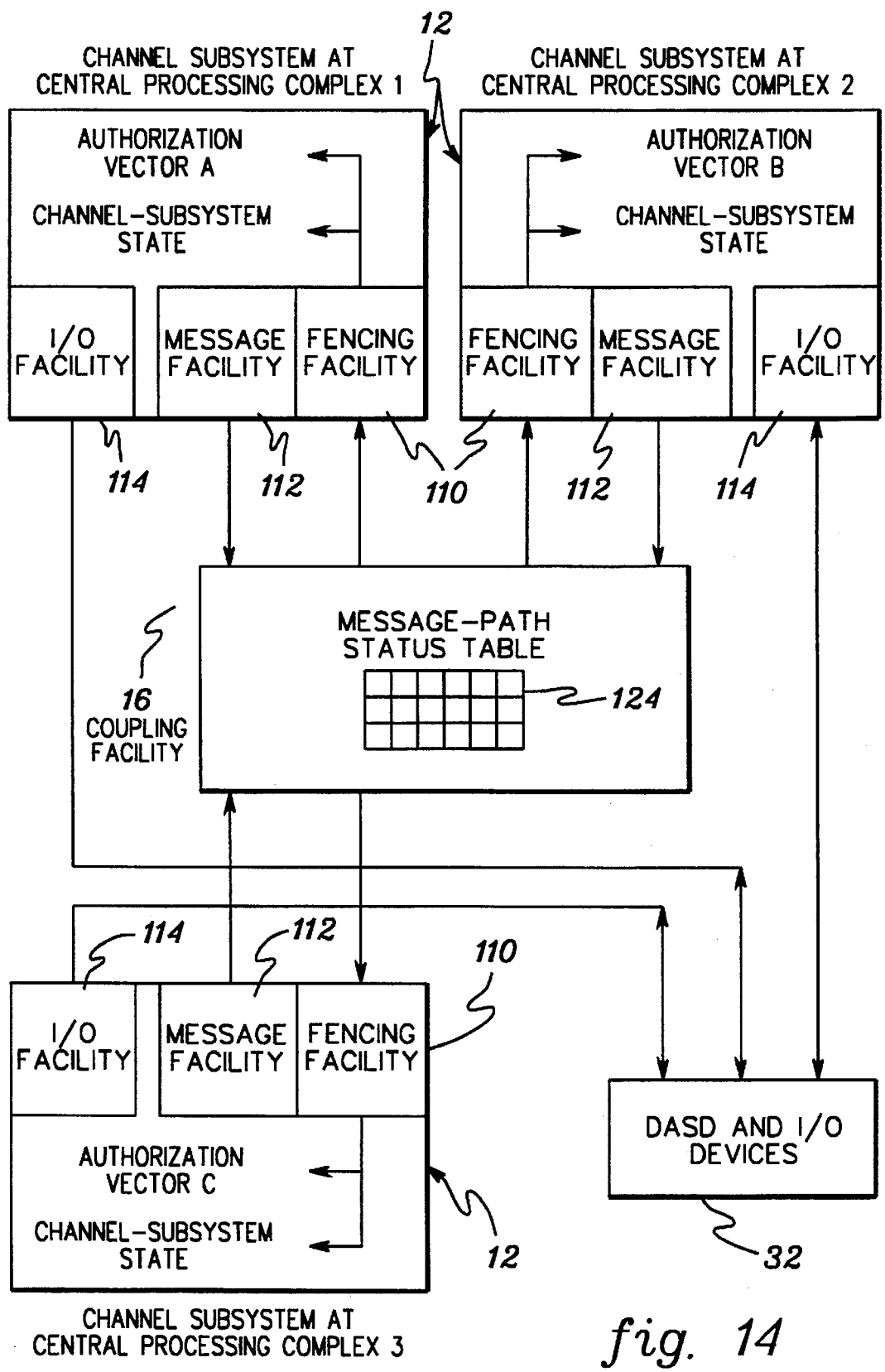
FIG. 14 illustrates three central processing complexes connected to a coupling facility containing a message path status table, in accordance with the principles of the present invention.

Coupling facility 16 continuously monitors the state of the physical links used to communicate commands by a message-path status table 124 depicted in FIG. 14. As shown in FIG. 14, which illustrates three CPCs connected to coupling facility 16, message-path status table 124 is located within coupling facility 16. Any failure, temporary or permanent, that may result in the loss of or change in the physical connection causes all the message paths associated with the physical link as recorded in message-path status table 124, to be placed in the inactive state. Commands are not sent on these links until the program has renegotiated the connections and reactivated the message paths. This prevents improper connections, such as from movement of cables causing commands to be incorrectly routed.

In addition to the monitoring function, the program may intentionally deactivate paths or change the associated system identifier. Coupling facility 16 serializes these routing configuration changes against delivering new cross-invalidate, list notification or system fencing commands while the renegotiation is in progress.

The path-selection mechanism provided by message path processor 118 is common to all forwarded and generated commands. The program negotiates the configuration and maintains the routing information independent of the specific command architectures. The command architectures interface with the path-selection mechanism by various means, including attach processing by the cache-structure and list-structure commands and command forwarding by fencing.

Fencing commands are sent from a message facility to the fencing facility by using an intermediate message processor in coupling facility 16 which forwards the command. The use of intermediate message processor 120 (FIG. 13) avoids the need for direct connections among the CPCs in a sysplex.

When a fencing command is received at the intermediate message processor, it is forwarded to fencing facility 110. The path-selection function in message-path processor 118 is invoked by intermediate message processor 120 to deliver the fencing command to the specified system.

Figure 15:
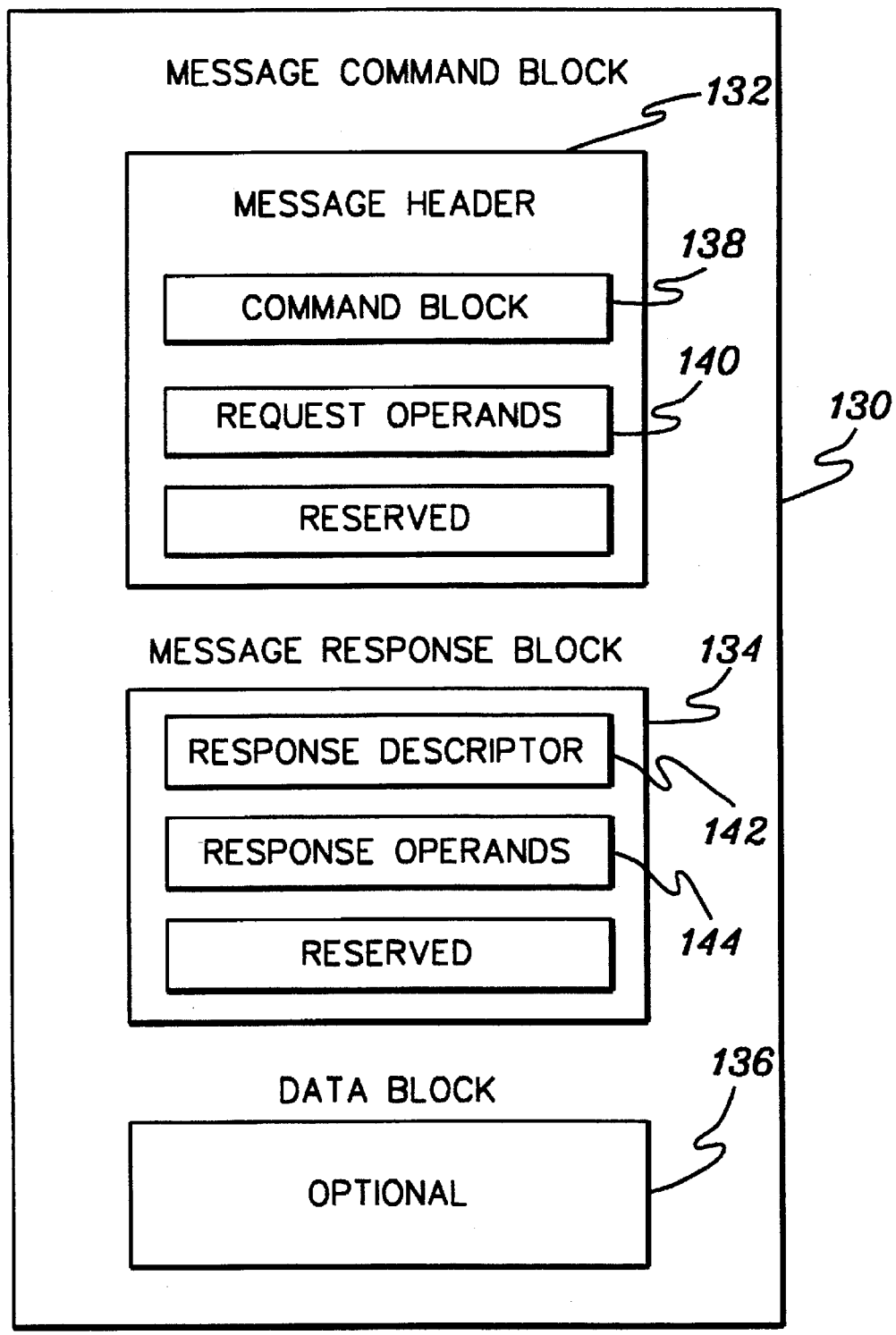
FIG. 15 depicts one example of a message command/ response block, in accordance with the principles of the present invention.

In one embodiment and in accordance with the principles of the present invention, message commands are sent to the appropriate message processor and responses are received via a message command/response block 130 (FIG. 15). In one example, message command/response block 130 includes a message command block 132, a message response block 134 and an optional data block 136. Message command block 132 includes a command block 138 and a plurality of request operands 140 and message response block 134 includes a response descriptor 142 and a plurality of response operands 144. In one embodiment of the present invention, request operands 140 and response operands 144 include the operands listed below, which are depicted in FIG. 16. (An operand may be a request operand, a response operand or both, depending upon the command. It is also possible that other request and/or response operands exist, which are not shown in FIG. 16.). In one embodiment, the response/request operands include the following:

(a) Authority (AU): A value that contains the contents of the global-authority control.

(b) Capture Completion Code (CAPCC): A value that indicates whether the capture is completed.

(c) Comparative Authority (CAU): A value that is compared with the value of the global-authority control.

(d) Comparative Dumping Authority (CDAU): A value that is compared with the value of a dumping-authority control, described below.

(e) Comparative Dumping Serialization (CDS): A value that is compared with the value of a dumping-serialization control, described below.

(f) Comparative Structure Authority (CSAU): A comparison authority value operand used to compare to the structure authority control value in structure controls.

(g) Data-Block Size (DBS): A value that specifies the size of the data block as an integral multiple of 4096-byte units. The value must be non-zero.

(h) Dump-Local-Cache Identifier (DLCID): The identifier of an attached local cache associated with a dump table, described below. The dump-local-cache-identifier operand is only meaningful when the structure type is a cache structure. When the dump-local-cache identifier is zero, no local cache is associated with the dump table.

(i) Dump-Table-Entry Number (DTEN): An object or field that identifies a dump-table entry.

(j) Dumping Authority (DAU): A value that contains the contents of the dumping-authority control.

(k) Dumping Information (DINF): A value that contains program-specified information associated with the dump.

(l) Dumping-List Length (DLL): An object or field that specifies the number of ranges in the range list of an associate-dump-table command, which is described in detail below.

(m) Dumping Serialization (DS): A value that contains the value of the dumping-serialization control.

(n) Dump Table Size (DTS): A value that contains the value of the dump table size operand, described below.

(o) Element Name (EN): A value that identifies an element in an object list. The element name depends on the structure type as follows:

| SES List | List Entry Identifier (LEID) |
| SES Cache | Name (N) |

(p) Initialization Complete Indicator (ICI): A value that contains the initialization complete indicator.

(q) Replacement Dump Authority (RDAU): A value that designates the value of a replacement dump authority control.

(r) Structure Identifier (SID): An index value into a SID vector (a bit string wherein the bit at position (i) in the string is set to one when a structure is allocated with a SID value of (i)) used to identify the structure associated with the specified index value to be accessed.

(s) Structure Type (ST): A value that contains the structure type operand.

(t) Structure Authority (SAU): A value that designates the value of a structure authority control.

(u) Total Dumping Space (TDS): A value that designates the value of a total dumping space control.

(v) Adjunct Area: A 64-byte storage object optionally associated with each directory entry in a cache structure or each list entry in a list structure, as described above.

(w) Associated Request Block (ARB): Described in detail below.

(x) Global Dump Controls: The global dump controls include an associated-dump-table-count, a free dumping space control, a maximum requested dumping space control, and a total dumping space control, each of which is described in detail below with reference to FIG. 24.

Operand validity is checked by the message processor. Detection of invalid values results in a request-exception condition being recognized for the command.

Described above is one embodiment of a data processing system which includes the dumping facility of the present invention. While the invention is described in relation to a multisystem environment, such as the one depicted in FIG. 1, it can also be used with a single system environment, which includes one central processing complex 12.

In accordance with the principles of the present invention, mechanisms are provided within coupling facility 16 to capture and present a consistent view of both controls and data components of an allocated structure for the purposes of problem determination, system recovery, system monitoring, etc. Programs and operators can include information, such as control information and data, located in a coupling facility structure (such as those depicted in FIGS. 2, 3 and 8) in a storage dump. Although every piece of data and control information in a coupling facility structure can be dumped, it is anticipated that the diagnosis of most problems will only require an atomic view of the control information of the coupling facility structure. Therefore, as described below, tailoring options may be specified to minimize the amount of information that is dumped.

In accordance with the principles of the present invention, the controls of an allocated structure of the coupling facility are staged to a dump table internal to the coupling facility. This approach provides an efficient rapid data capture mechanism which limits the amount of time the structure is serialized against mainline (non-dump) command execution. In the preferred embodiment, data entries are not staged to a dump table, but in another embodiment, it is possible to stage the data to a dump table.

Figure 17:
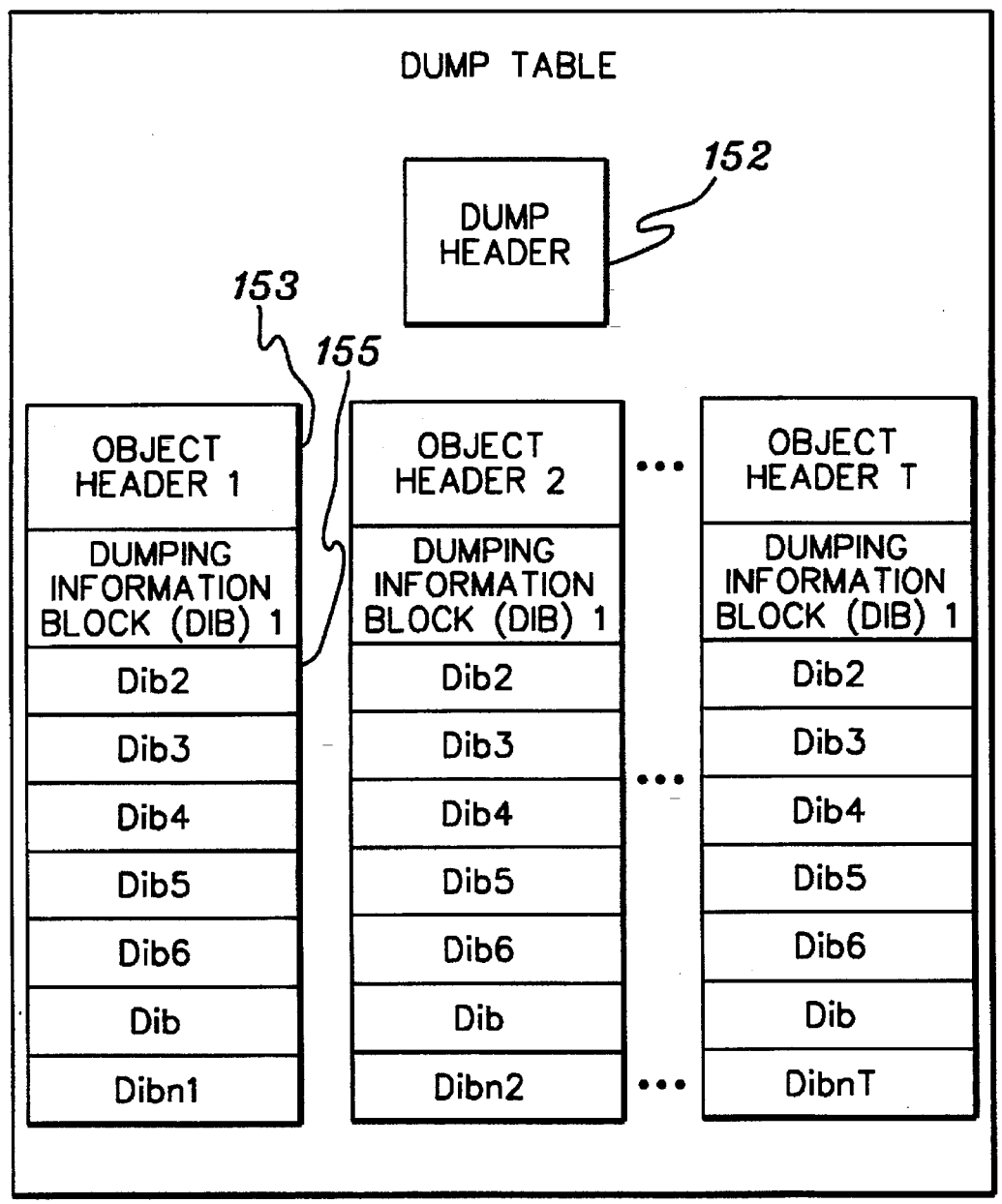
FIG. 17 depicts one example of a dump table, in accordance with the principles of the present invention.

In accordance with the present invention, when a dump is initiated for a coupling facility structure, a portion of the dumping storage is assigned to the structure for the duration of the dumping operation. The dumping storage is organized into a dump table 150, one example of which is depicted in FIG. 17. In one example, dump table 150 includes a dump header 152, one or more object headers 153, each of which corresponds to an object located in the coupling facility structure to be dumped and one or more dumping information blocks (DIBs) 155, each of which corresponds to a particular object. Dump table 150 is a sequence of 4 k-byte wide objects called dump-table entries. Within each dump table entry is an architecturally mapped set of data objects that are self-describing. That is, programming can understand at the time it retrieves the information what has been captured and placed in the block. In the dump table, a logical representation of the information is stored by the coupling facility such that when an object is requested, a contiguous area of storage containing the requested information is automatically built at the coupling facility. In the contiguous area, there may be pieces of information or storage gathered from disjoint locations or a summary created by the coupling facility to represent a state that does not physically exist within a single storage location. In accordance with the principles of the present invention, it is not necessary to piece together from a dump the desired object. This is automatically done by the coupling facility. The number of dump-table entries is determined by the coupling facility at the time the dump table is associated with the structure and stored in a dump-table size object. In particular, the dump-table size is determined at the time a dump is initiated from the tailoring options provided by the program, as described below, and may be limited by the amount of available dumping space. The dump-table entries are numbered from zero to the dump-table size less one. Each component of dump table 150 is described in greater detail below.

Figure 18:
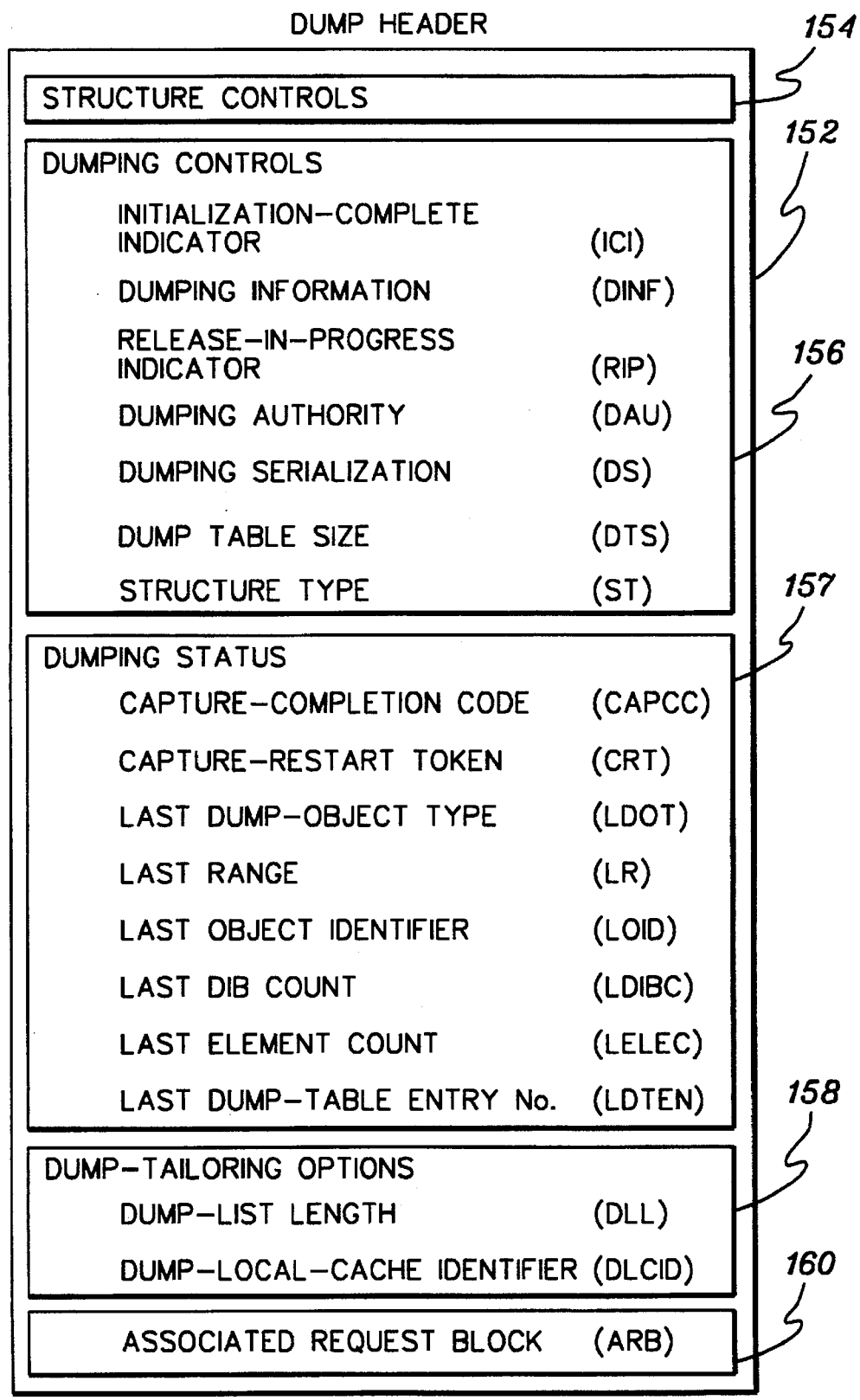
FIG. 18 depicts one example of a dump header of the dump table depicted in FIG. 17, in accordance with the principles of the present invention.

Referring to FIG. 18, dump header 152 includes structure controls 154, dumping controls 156, dumping status 157, dump-tailoring options 158 and an associated request block 160. Each of the above are described in further detail herein.

Structure controls 154 include a number of operands depending on the type of structure, i.e., a list structure or cache structure. As described in detail above, if the structure is a list structure, then structure controls 154 include the following operands depicted in FIG. 9: Maximum Data-List-Entry Size, List-Structure Type, Lock-Table-Entry Characteristic, List-Element Characteristic, Minimum Structure Size, Lock-Table-Entry Count, List Count, Structure Size, Maximum Structure Size, Target Structure Size, Target Maximum-Element Count, Target Maximum-Entry Count, Maximum List-Set-Element Count, List-Set-Element Count, Non-Zero-Lock-Table-Entry-Count, Maximum List-Set-Entry Count, List-Set-Entry Count, Structure Authority, User Structure Control, and User-Identifier Vector.

On the other hand, if the structure is a cache structure, then as described above with reference to FIG. 4, the operands include the following: Total-Directory-Entry Count, Total-Data-Area-Element Count, Adjunct-Assignment Indicator, Maximum Storage Class, Maximum Castout Class, Data-Area-Element Characteristic, Maximum Data-Area Size, Structure Size, Maximum Structure Size, Minimum Structure Size, Structure Authority, User Structure Control, LCID Vector, Target Structure Size, Target Data Area Element Count and Target Directory-Entry Count.

Dumping controls 156 contain program-specified values that describe the dump and control access to the dump table and the structure while the dump is in progress. Dumping controls are associated with each dump table and include the following operands:

(a) Initialization-Complete Indicator (ICI): A value that indicates whether the dumping initialization process has completed. The value is zero, if initialization is in progress and the value is one, if initialization is complete. The initialization-complete indicator is set by the dumping initialization procedure and remains fixed after initialization is complete.

(b) Dumping Information (DINF): A program-designated value that is assigned to the dump table. Dumping information control is a program-modifiable dumping control set by an associate-dump-table command, and may be updated by a replace-dumping controls command, described below.

(c) Release-In-Progress Indicator (RIP): A value that indicates whether a release-dump-table process is in progress. The value is zero, if a release of the dump table is not in progress, and the value is one, if a release of the dump table is in progress. The release-in-progress indicator is set by the release-dump-table command, described below, and is reset when the release process is completed.

(d) Dumping Authority (DAU): A program-designated value set by the associate dump-table command, updated by the replace-dumping-controls command and reset by the release dump table command. When the value is zero, the dumping controls are available. When the value is non-zero, the dumping controls are in use.

(e) Dumping Serialization (DS): A program-designated value set by the associate-dump-table command and updated by the replace-dumping-controls command. When the value is non-zero, dumping serialization is held on the structure. Otherwise, the structure is not serialized.

(f) Dump-Table Size (DTS): An unsigned binary integer that specifies the number of 4K-byte units of coupling facility (SES) storage assigned to the dump table. The dump-table size control is set by the dumping initialization procedure and remains fixed after initialization is complete.

(g) Structure Type (ST): A value that identifies the structure type. The structure type is set by the dumping initialization procedure and remains fixed after initialization is complete.

Associated with dumping controls 156 are the following dumping control states, which are managed by the coupling facility:

(a) Dumping Controls Available (DCA): When a structure is allocated or following the successful execution of a release-dump-table command (described below), dumping controls 156 are available. When in the dumping-controls-available state, normal structure commands that specify the structure are executed. Only one dumping command, the associate dump table command, is executed, as described below.

(b) Capture-In-Progress State (CIP): An associate-dump-table command places the dumping controls in the capture-in-progress state. When in the capture-in-progress state, the dumping authority is non-zero, the dumping serialization is non-zero, and the capture completion code contains X'00'. The following commands, each of which are described below, are executed: release dump table, capture dump data, read captured block, replace dumping controls, read dumping controls and read dumping-object data. No other commands that specify the structure are executed.

(c) Capture-Complete Serialization-Held State (CCSH): When the capture process reaches normal completion or encounters a dump-table-full condition, the capture process is completed and the dumping controls enter the capture-complete serialization-held state. The dumping authority is non-zero, the dumping serialization is non-zero, and the capture-completion code is either normal completion or dump table full, depending on the reason for completion. The following commands are executed: release dump table, replace dumping controls, read captured block, read dumping controls and read dumping-object data. No other commands that specify the structure are executed.

(d) Capture-Complete Serialization-Released State (CCSR): When the replace-dumping-serialization command is executed with a replace value of zero for the dumping serialization, the dumping controls enter the capture-complete serialization-released state. No further capture operations are processed for the dump table. The dumping authority is non-zero, the dumping serialization is zero and the capture-completion code depends on the reason for completion. When the initial state is capture in progress, the capture-completion code is serialization released. Otherwise, it is unchanged. The following commands are executed: release dump table, read captured block, read dumping controls, replace dumping controls, read dumping-object data and non-dumping commands. No other dumping commands that specify the structure are executed.

Figure 19:
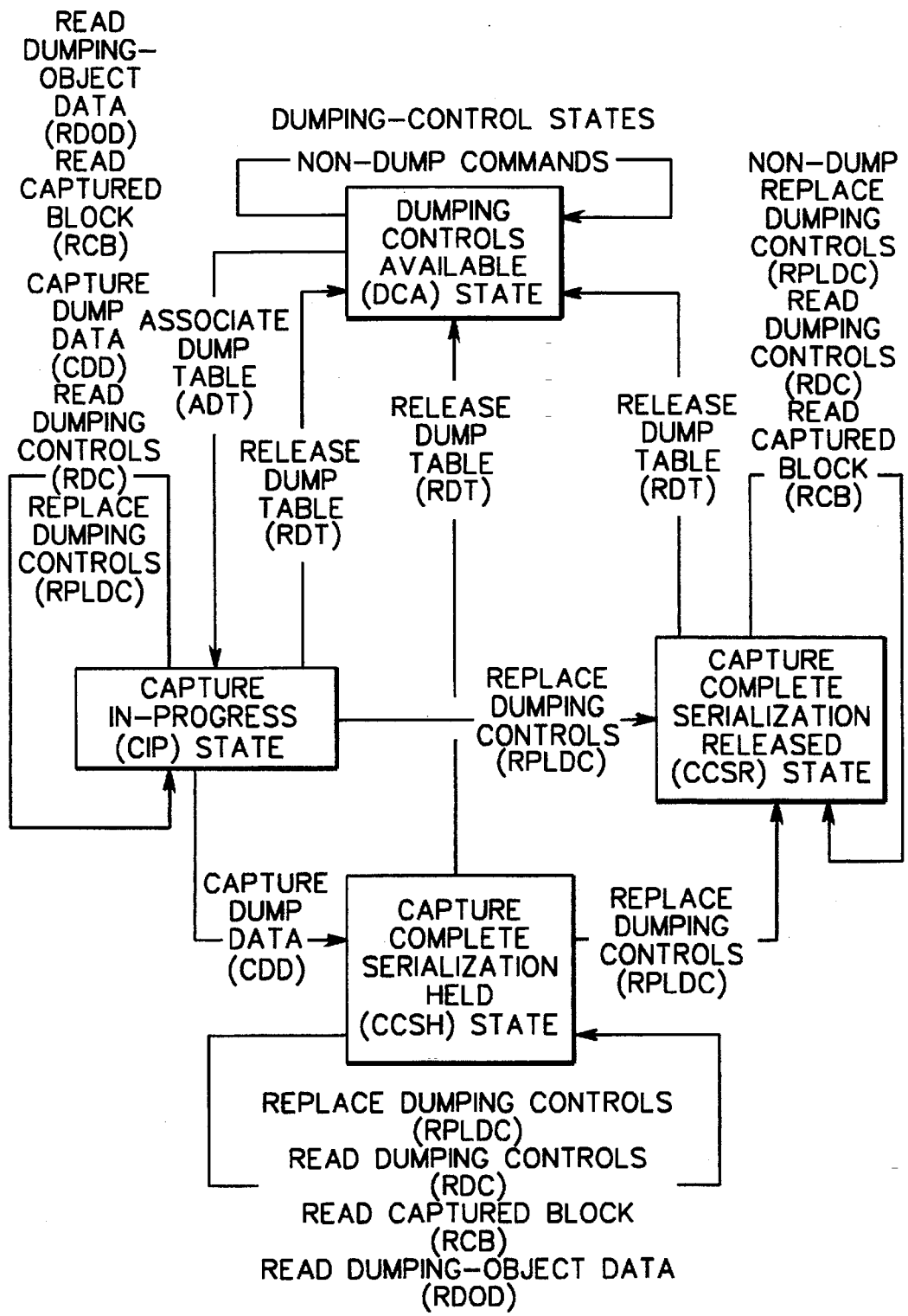
FIG. 19 illustrates a state diagram for the states associated with the dumping controls, in accordance with the principles of the present invention.

FIG. 19 shows the effects of dumping commands on the dumping-control state. As shown, when the dumping controls are in the dumping controls available (DCA) state, then non-dumping commands can execute and the controls remain in the dumping controls available state. If, while in the dumping controls available state, an associate dump table (ADT) command is issued, as described below, then the state becomes capture-in-progress (CIP). Dumping serialization is held so non-dump commands are rejected. Dump commands, such as read dumping-object data (RDOD), read captured block (RCB), capture dump data (CDD), read dumping controls (RDC) and replace dumping controls (RPLDC), described below, are allowed to execute and the capture-in-progress state is maintained. A release dump table (RDT) command will change the dump controls state from CIP back to the DCA state and a replace dumping controls (RPLDC) command changes the state from CIP to capture complete serialization released (CCSR), described below. The last capture dump data command causes the state to change to capture complete serialization held (CCSH). During the capture complete serialization held state, the replace dumping controls command (RPLDC), read dumping control (RDC), read captured block (RCB), and read dumping-object data (RDOD) commands can execute, keeping dumping controls in the capture complete serialization held state. The RPLDC command changes the state to capture complete serialization released (CCSR). During the CCSR state, non-dump commands, replace dumping controls (RPLDC), read dumping controls (RDC) and read captured block (RCB) commands may execute. A release dump table command will change the dump controls state from either CCSH or CCSR back to the dumping controls available state.

Returning back to FIG. 18, dumping status 157 provides a visible checkpoint of the dump as the capture operation progresses. Dumping status is maintained for each dump table and is updated at the conclusion of each capture operation. The dumping-status objects include:

(a) Capture-Completion Code (CAPCC): A value that indicates the capture operation is still in progress or the reason the capture operation was completed. The following capture-completion codes are defined:

Capture in Progress
Normal Completion
Dump Table Full
Serialization Released

The capture-completion code is set to Capture in Progress when the dump table is associated with the structure and remains Capture in Progress until the capture operation is completed. When the capture-complete indicator is set to one for every valid object specified in the associated request block, the capture-completion code is set to Normal Completion, indicating normal completion. When the dump table is full and not all capture-complete indicators are set to one, the capture-completion code is set to Dump Table Full, indicating an out-of-storage condition. When the dumping serialization is set to zero while capture is in progress, the capture-completion code is set to Serialization Released, indicating that the dumping serialization has been released.

(b) Capturing-Restart Token (CRT): An internal SES object associated with each dump table that controls the capture process.

(c) Last Dump-Object Type (LDOT): A value that identifies the object type of the object specified by the last object identifier (LOID) operand, described below. The value of the last-dumping-object-type object is valid when the last-range object contains a non-zero value.

(d) Last Range (LR): A value that contains the last range value processed by a capture-dump-data command. The last-range value is initialized to zero by an associate-dump-table command, described below.

(e) Last Object Identifier (LOID): A value that contains the last object identifier processed by a capture-dump-data command. The value of the last-object-identifier object is valid when the last-range object contains a non-zero value and the last-dump-object-type object contains one of the values: SES List Designated by List Number, SES-Cache Storage Class and SES-Cache Castout Class.

(f) Last DIB Count (LDIBC): A value that contains the count of the number of DIBs stored in the dump table for the object specified by the last object identifier. The value of the last-DIB-count object is valid when the last-range object contains a non-zero value.

(g) Last Element Count (LELEC): A value that contains the count of the number of elements contained in the object specified by the last object identifier. The value of the last-element-count object is valid when the last-range object contains a non-zero value.

(h) Last Dump-Table-Entry Number (LDTEN): A value that identifies the highest valued dump-table entry that contains a captured block.

Dump-tailoring options 158 define the subset of control elements that are specified for inclusion in the dump. The dump tailoring options include the following operands:

(a) Dump-List Length (DLL): An object or field that specifies the number of ranges in the ARB range list of an associate-dump-table command.

(b) Dump Local-Cache Identifier (DLCID): The identifier of an attached local-cache associated with the dump table. The dump-local-cache-identifier object is only maintained when the structure is a cache and it is used to select the specified local cache user fields from registry 82 (FIG. 3). When the dump local-cache identifier is zero, no local cache is associated with the dump table.

Associated Request Block 160 is provided in the data block of the associate dump-table command when the dump-table is created and is copied into the dump-header by the capture process, described below. Referring to FIG. 20, associated request block 160 contains the dumping information and the list of object-identifier ranges to be included in the dump. In particular, each range in the associated request block includes the following operands:

(a) Dumping Object Type for Nth Object (DOTn) (shown in FIG. 20 are 1 through n): A value that identifies the object-type assigned to the nth range in the range list defined for the dump table. One embodiment of the values of the dumping-object type operand include: SES-list lock table, SES-list list number, SES-list user controls, SES-cache storage class, SES-cache castout class and SES-cache local-cache controls.

(b) Adjunct-Inclusion Indicator (AIIn) for the Nth object: A value associated with each range in the range list that designates whether adjunct data is included in the dump table. When the value is one, adjunct-data inclusion is requested for each object in the range. When the value is zero, adjunct-data inclusion is not requested. When the adjunct-inclusion indicator is one, adjunct data is present in the structure and the dumping-object type, described below, is SES-list list number, SES-cache storage class or SES-cache castout class, then adjunct data is included in each dumping information block (DIB) stored for the object. When the dumping-object type is SES-list lock table, SES-list user controls or SES-cache local-cache controls, the adjunct-inclusion indicator must be zero.

(c) DIB-Exclusion Indicator (DEIn) for Nth object: A value associated with each range in the range list that designates whether dumping-information blocks are excluded for each object in the range from the dump table. When the value is one, dumping-information blocks are excluded for each object in the range from the dump table. When the value is zero, a dumping-information block is included for each element in each object specified by the object-identifier range.

When the adjunct-inclusion indicator and the DIB-exclusion indicator for an object-identifier range are both ones, the DIB-exclusion indicator takes precedence. In this case, no dumping-information blocks or adjunct-data fields are included in the dump table for the objects specified by the object range. Only object headers are included in the dump table.

(d) Range Information (RIn) for the Nth object: A value associated with each range in the range list that contains program-specified information.

(e) Start of Nth Range (SRn): A value that specifies the lowest-valued object identifier in the Nth range in the associated request block. When the Nth object type is SES-list lock table, SES-list user controls or SES-cache local-cache controls, the Nth start-of-range value is ignored. When the Nth object type is SES-list list number, SES-cache storage class or SES-cache castout class, the Nth start-of-range value must be less than or equal to the Nth end-of-range value.

The entire range of objects for a given dumping-object type may be included in the dump by specifying a value of X'0000 0000' for the Nth start of range and a value of X'FFFF FFFF' for the Nth end of range.

(f) End of Nth Range (ERn): A value that specifies the highest-valued object identifier in the Nth range in the associated request block. When the Nth object type is SES-list lock table, SES-list list user controls or SES-cache local-cache controls, the Nth end-of-range value is ignored. When the Nth object type is SES-list list number, SES-cache storage class, or SES-cache castout class, the Nth end-of-range value must be greater than or equal to the nth start-of-range value.

The range list may be in any order and may include overlapping ranges, although this should be avoided to minimize the size of the dump table.

This list of objects created in the dumping controls will be in the order specified by the range list. Thus, when storage is constrained, the range-list order represents a priority order for including objects in the dump. If storage classes and castout classes are both specified for the dump of a cache structure, the same directory entry may appear twice in the dump table.

Copies of the structure controls, dumping controls, dumping status and, the dump-tailoring options are copied into the dump-header record, which is contained in the first two dump-table entries, during the dumping process.

Referring back to FIG. 17, dump table 150 also includes object header 153. When a particular object is captured, information describing that object is moved into object header 153. This information includes the operands depicted in FIG. 21 and described in detail below:

(a) Dumping-Object Type (DOT): A value that identifies the object type. The dumping object type depends on the structure type and the class of object requested when the dump is initiated. For a list structure, three classes of objects exist: List Lock Table; List Designated by List Number; and List User Control. For a cache structure, three classes also exist, which include: Cache Storage Class; Cache Castout Class; and Cache Local-Cache Controls.

(b) Capture-Complete Indicator (CCI): A value associated with each object designated to be captured that indicates whether all the elements in an object have been captured. When set to one, the capture operation for the object is complete. When zero, additional elements exist on the element list that have not been captured in the dump table.

(c) Object Identifier (OID): A value that identifies the captured object designated by the object header. The definition depends on the dumping-object type. The following lists the DOT type followed by the OID definition:
List User Controls/Not Applicable;
Lock Table/Not Applicable;
Lock Cache Controls/Not Applicable;
List Number/List-Number Value;
SES-Cache Storage Class/Storage-Class Value;
SES-Cache Castout Class/Castout-Class Value.

(d) DIB Count (DIBC): The number of dumping-information blocks stored in the dump table for the object.

(e) DIB Size (DIBS): An object or field that specifies the size, in bytes, of the dumping-information block. The DIB size depends on the dumping-object type, the setting of the adjunct-inclusion indicator, and whether adjunct data is present in the structure. When the dumping-object type supports adjunct data, the adjunct-inclusion indicator is one and, if adjunct data is present in the structure, then adjunct data is included in the DIB. Otherwise, adjunct data is not included.

(f) DIB-List Size (DLS): The number of dump-table entries that contain the DIB list for the object.

(g) Object Controls: The format of object controls is dependent on the object type. The object control for list user controls and local cache controls is the number of attached users (NAU) (not shown). Castout Class Count (not shown) is the object control for castout class. The object controls for storage class are depicted in FIG. 7, the object controls for a list are shown in FIG. 11, and there are no object controls for a locked table.

Referring back to FIG. 17, dump table 150 also includes dumping information blocks 155. The structure control elements are grouped into ordered lists. For the purposes of dumping, the individual element lists are referred to as dumping objects and represent the granularity of inclusion in dump table 150. The dumping objects are typed and identified by an object identifier (located in object header 153). A subset of the control elements for a structure is specified for inclusion in the dump table by specifying a list of ranges of object identifiers. A dumping information block is constructed for each separate element of the element list. The order of the dumping information blocks correspond to the element order in the element list.

As previously mentioned, three classes of objects for a cache structure exist: storage classes, castout classes and local-cache controls. Each may contain a variable number of elements. The dumping information block (DIB) for an element associated with a storage class or castout class object contains information stored in the named cache directory entry, the state entry, local-cache register and, optionally, the adjunct data (see FIGS. 3 and 6). The dumping information block for a cache user control object contains local cache information (see FIG. 5).

The dumping information block list for a castout class, local-cache controls, or storage class is ordered by the corresponding element order at the time the dump is initiated.

As previously mentioned, for a list structure, three classes of dumping objects exist: lock tables, list numbers, and list-user controls. The DIB for a lock-table entry consists of the lock-table-entry contents and the entry number. Only non-zero entries are captured, thereby compressing sparse lock tables. The DIB for an element corresponding to a list number contains the list entry controls and, optionally, adjunct data (see FIGS. 8 and 12). The DIB for the list-user controls contains information stored in the user controls (see FIG. 10).

The order of the DIB list matches the element order at the time of dump initiation for all three list-structure classes. The lock-table entries are ordered by the lock-table-entry number. The elements in a list are ordered by the list order. The list-user controls are ordered by user identifier.

Data capture occurs under the serialization of the structure in order to preserve the logical ordering of the elements. However, as described further below, once staged to the dump table, the captured data in the dump table may be retrieved after serialization is released, thereby making the structure available for normal operations.

Described in detail above are the structures and controls associated with the dumping facility of the present invention. In operation, before a dumping request may be issued, a number of preliminary steps need to be completed, in accordance with the principles of the present invention. These initial steps, which are described in detail with reference to the logic diagram of FIG. 22, are typically accomplished at system initialization.

Figure 22:
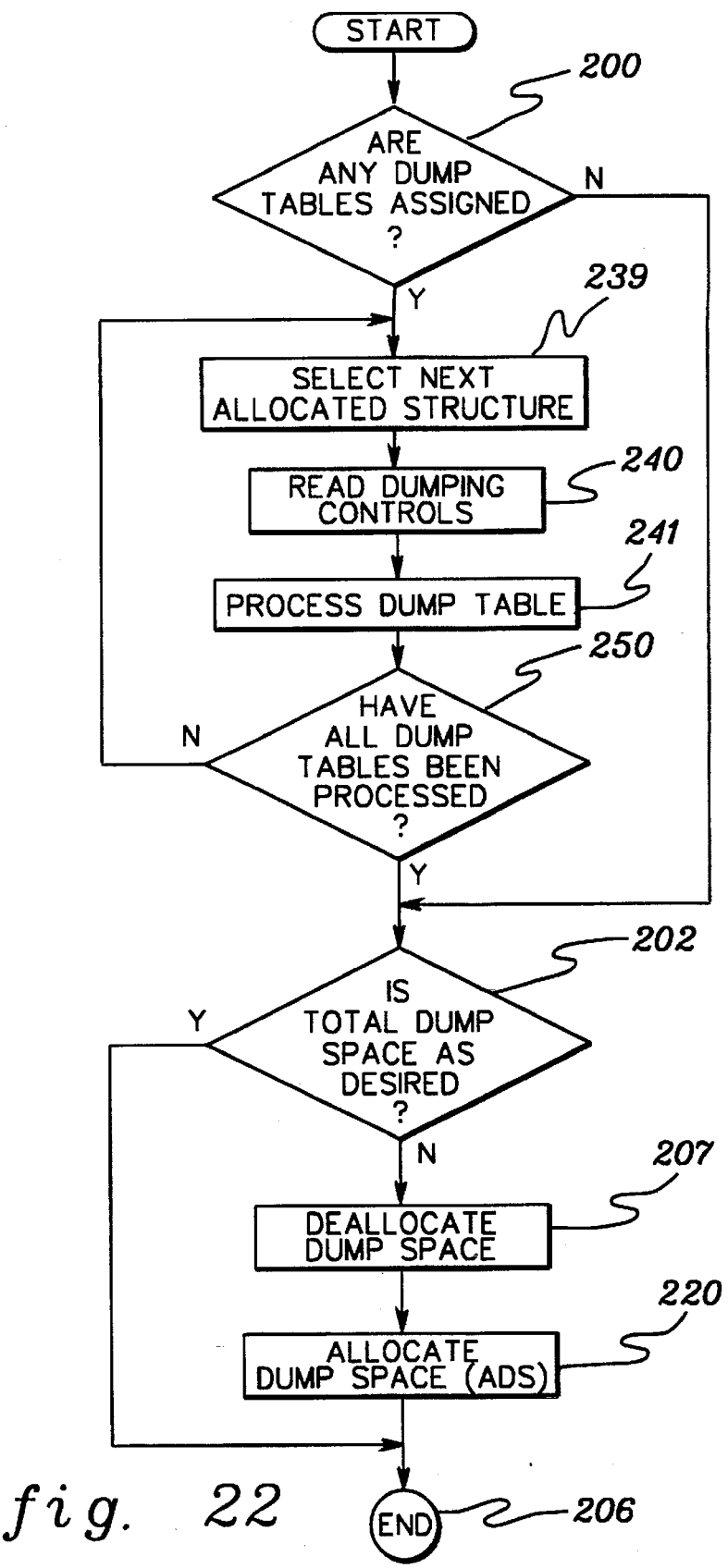
FIG. 22 depicts one embodiment of the logic associated with preparing the system in order to provide a dump, in accordance with the principles of the present invention.
Figure 23:
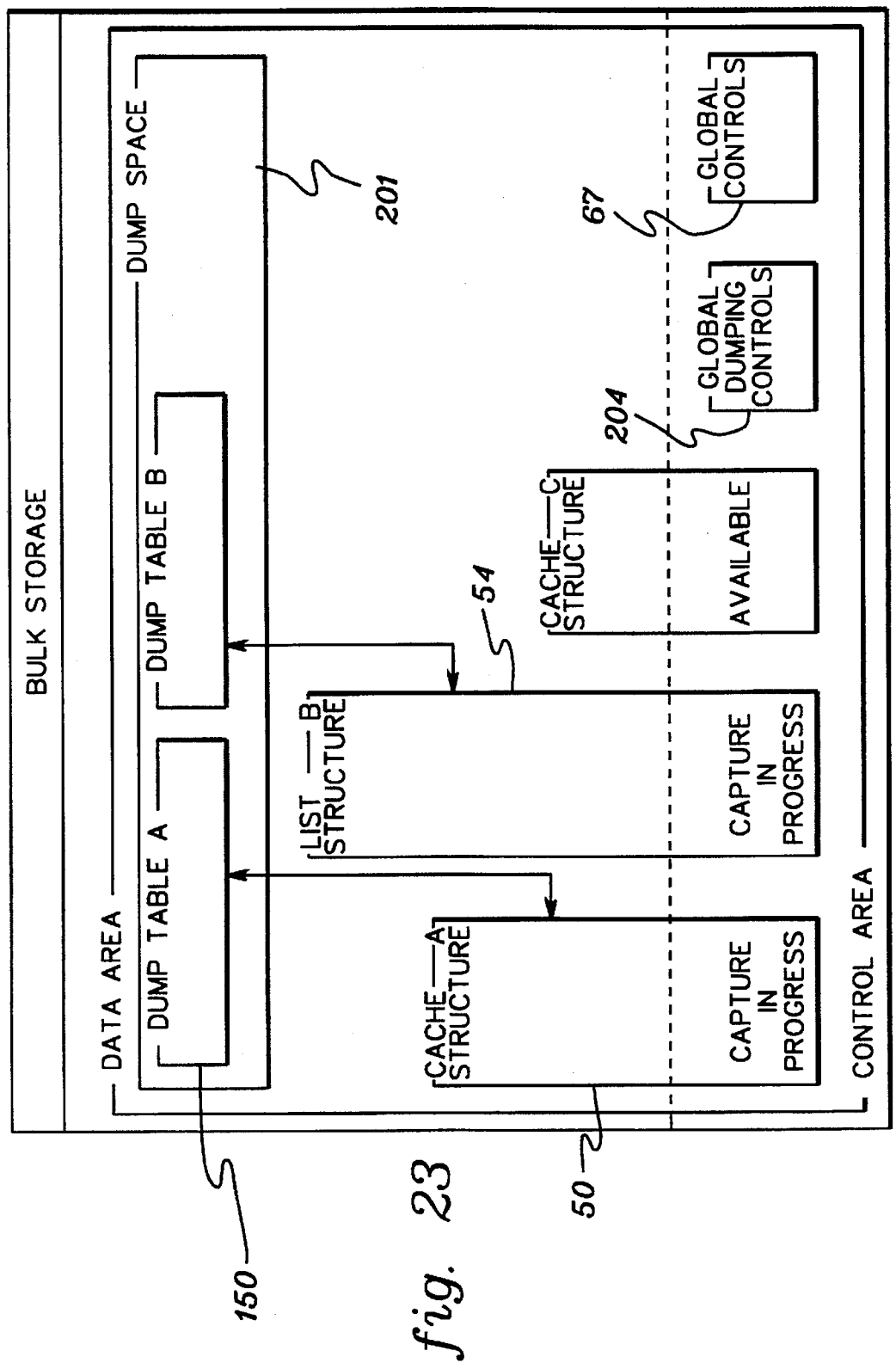
FIG. 23 depicts one example of a coupling facility in which dump tables are present in a dump space, in accordance with the principles of the present invention.

Referring to FIG. 22, initially, a determination is made as to whether any dump tables have been previously assigned, INQUIRY 200 "ARE ANY DUMP TABLES ASSIGNED?" As described previously, a dump table is built for each structure that is being dumped. As shown in FIG. 23, the structure dump tables are located in an area within the coupling facility, referred to as a facility dump space 201, which is reserved by the installation for dumping purposes. The size of dump space 201 is specified in the coupling facility policy supported by the operating system which enables the customer to define the portion of coupling facility storage which should be reserved for data capture purposes. In one embodiment, only one facility dump space 201 may be defined in each coupling facility. However, it may contain several structure dump tables 150. If an associated dump-table count, described below, is equal to zero, then no dump tables are assigned.

Referring back to FIG. 22, if it is determined that no dump tables have been assigned, then flow passes to INQUIRY 202 and another determination is made as to whether the amount of dump space previously allocated is sufficient or at a desired level, INQUIRY 202, "IS TOTAL DUMP SPACE AS DESIRED?" This determination is made by checking the value of a total dumping space control (TDS) contained within global dumping controls 204 of coupling facility 16. Global dumping controls 204 govern the use of the allocated dump space in the coupling facility and may be retrieved by the program through use of a read-SES-parameters command. The dumping controls are returned in response block 134 and include the following operands (FIG. 24):

(a) An associated dump-table count (ADTC), which represents the number of dump tables, if any, located within dump space 201.

(b) A free dumping space (FDS) control, which indicates whether any of the dumping space is available for use.

(c) A maximum requested dumping space control (MRDS), which represents the maximum amount of dump space that has been requested.

(d) A total dumping space (TDS) control, described above, for indicating the current amount of dump space 201 allocated.

Figure 25:
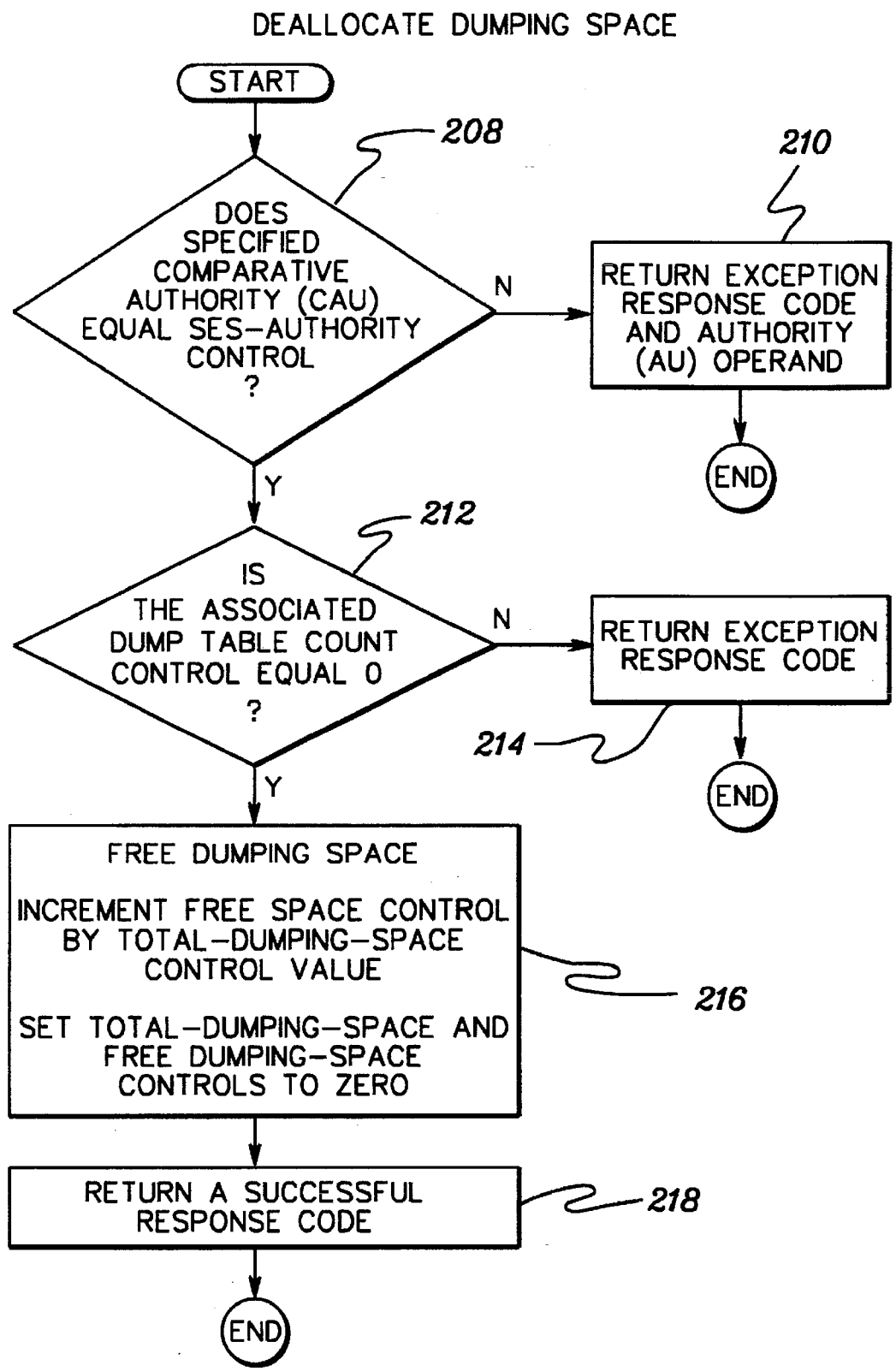
FIG. 25 depicts one embodiment of the logic associated with de-allocating dumping space, in accordance with the principles of the present invention.

Returning to FIG. 22, should the desired amount of dump space 201 be allocated, then the initial procedures to take place prior to a dump request are completed, STEP 206 "END." On the other hand, if the total amount of dump space is insufficient, then the dump space is de-allocated in the manner described below with reference to FIG. 25, STEP 207 "DE-ALLOCATE DUMP SPACE."

Dump space is de-allocated by a de-allocate-dump-space command. The storage manager at the coupling facility is used to make the dump space available as part of the bulk storage data area. Dump space cannot be de-allocated if any part of the dump space is in use by an allocated structure for the purpose of dumping. Referring to FIG. 25, under the de-allocate-dump-space command, initially a test is performed to see whether the specified comparative authority (CAU) control located in the request/response operands is equal to the SES authority control located in global controls 67, INQUIRY 208 "DOES SPECIFIED CAU EQUAL SES AUTHORITY CONTROL?" When the SES-authority control does not match the value of the CAU operand, no de-allocation is performed, and the value of the SES authority is placed in the authority (AU) response operand. Thereafter, the AU operand and an exception response are returned, STEP 210 "RETURN EXCEPTION RESPONSE CODE AND AU OPERAND." When the SES-authority control matches the value of the CAU operand, the associated dump table count (ADTC) of global dumping controls 204 is checked to see if it is equal to zero, INQUIRY 212 "IS THE ASSOCIATED DUMP TABLE COUNT CONTROL EQUAL 0?" Should the associated dump table count be greater than zero, indicating that a dump table is associated to one or more structures, no de-allocation is performed, and an exception response is returned, STEP 214 "RETURN EXCEPTION RESPONSE CODE."

On the other hand, if the associated dump table count is equal to zero, then the dumping space is freed and returned to the free space in the coupling facility. The free-space control in global facility controls 67 is increased by the value of the total-dumping-space (TDS) control, and the total-dumping-space and free-dumping-space (FDS) controls are set to zero, STEP 216. Thereafter, a successful response is returned, STEP 218 "RETURN A SUCCESSFUL RESPONSE CODE."

Figure 26:
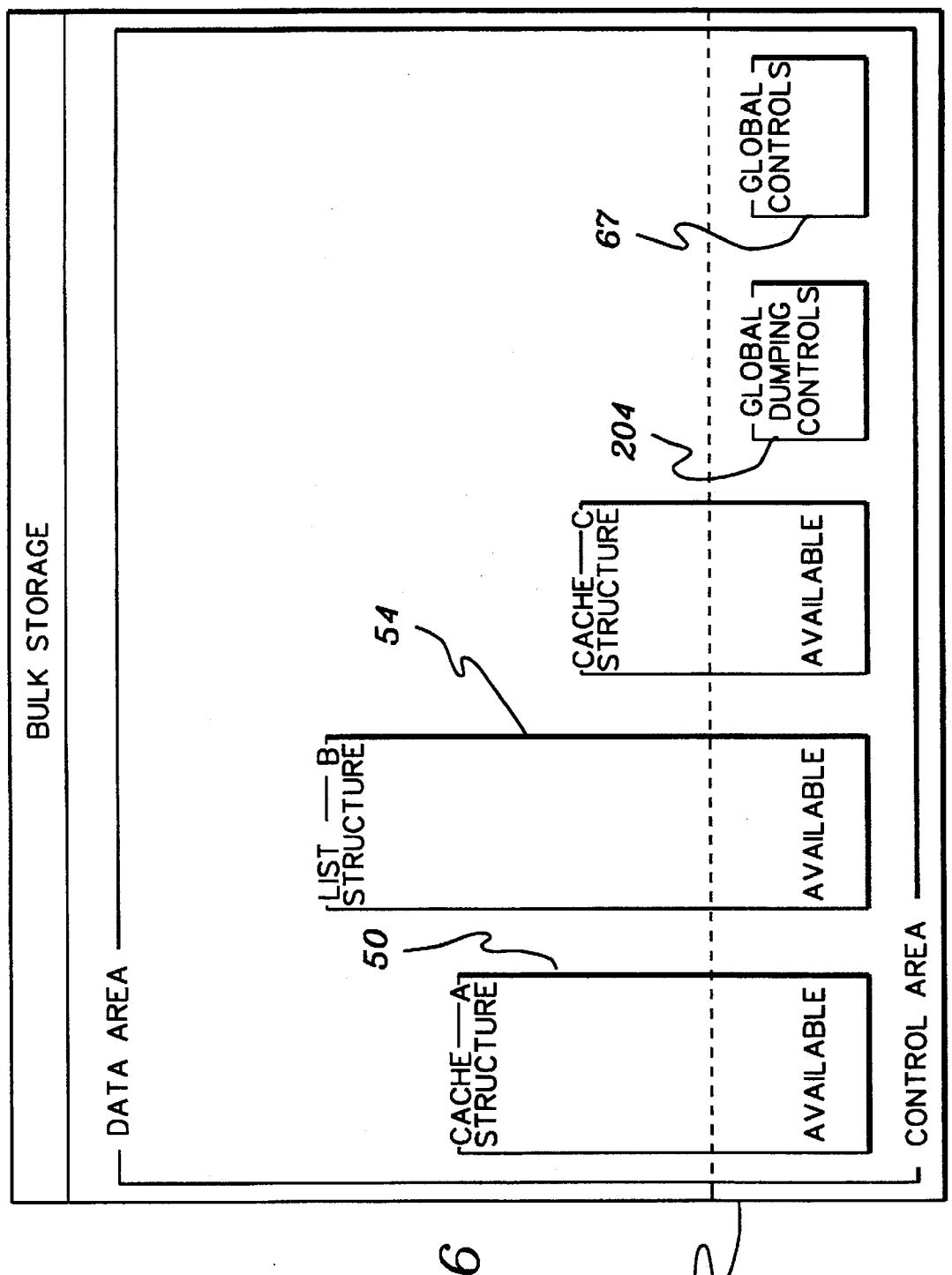
FIG. 26 depicts one example of a coupling facility 16 in which the dumping space has been de-allocated, in accordance with the principles of the present invention.

FIG. 26 illustrates the potential state of coupling facility 16 prior to any dumping storage being reserved or after a de-allocation of the dumping area. As is shown, no dumping space is reserved in the data area. Each of the allocated structures maintains a set of controls, as described above, specifically used to govern dumping operations against the structure. In this case, the dumping controls of each structure are said to be available (AVAILABLE), since no dumping operation is in progress. The available state is indicated by a zero dumping authority control. In this state, because no dumping serialization is held, mainline commands are free to execute against the structure.

Figure 27:
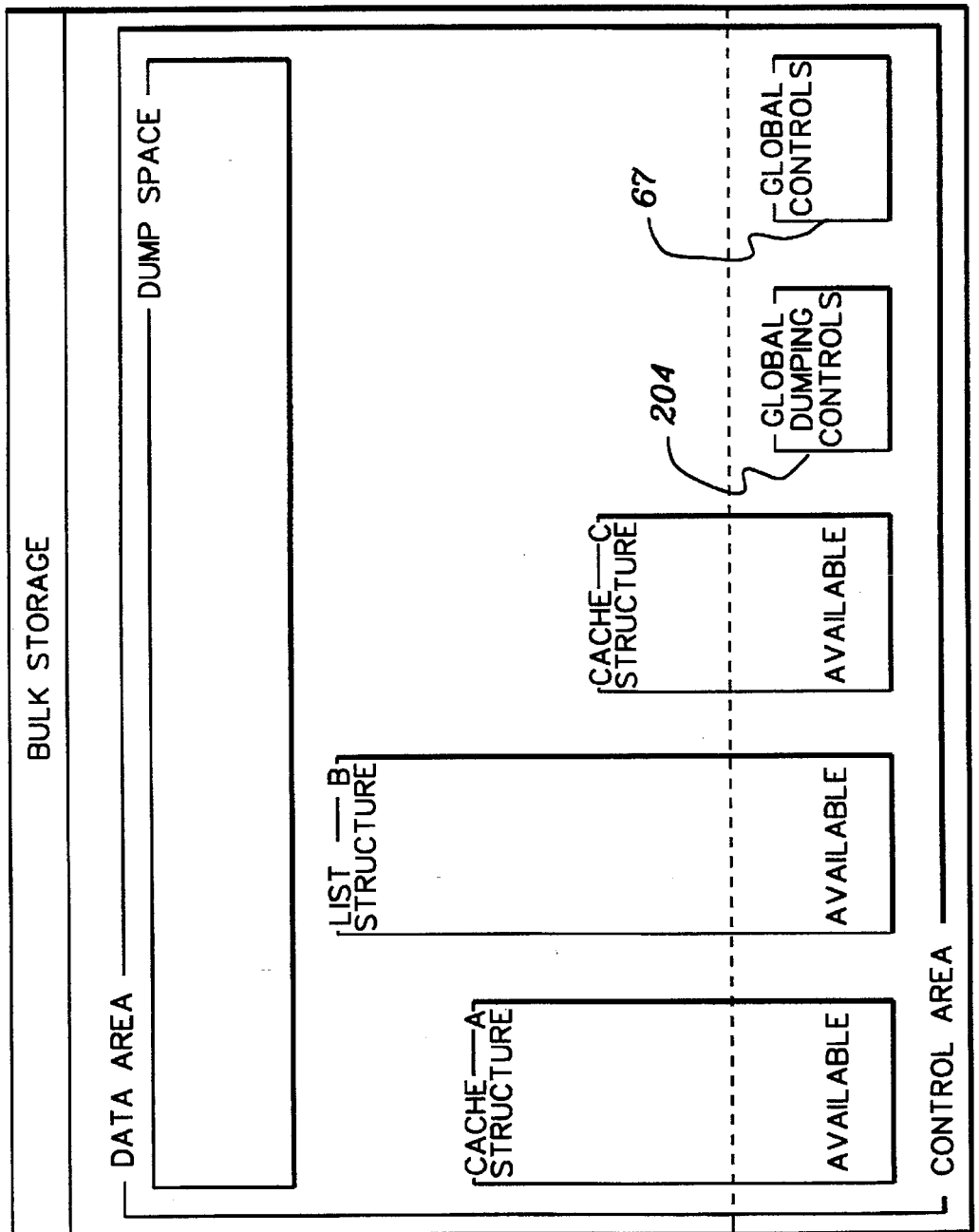
FIG. 27 depicts one example of a coupling facility in which dumping space has been allocated, in accordance with the principles of the present invention.

Referring back to FIG. 22, after completing the de-allocate dump space procedure, an allocate dump space (ADS) command is executed, STEP 220 "ALLOCATE DUMP SPACE (ADS)." Before a dumping operation against a structure can be initiated, dump space must be reserved to contain the captured structure control information. As shown in FIG. 27, this storage is allocated exclusively from the data area of bulk storage by an allocate-dump-space command. Information regarding the state of dumping resources not yet associated with a particular structure are maintained in a set of global dumping controls 204. Specific serialization exists to govern concurrent access to the global dumping controls.

The data space reserved for dump space from available bulk storage is accomplished through use of a storage manager at the coupling facility. The amount of dump space reserved is determined by a program and reduces the amount of bulk storage data area available for other uses. Whenever available bulk storage is insufficient to perform the allocate function, the dump space size is adjusted to obtain as much of the requested dump space as possible. At this point all structure related dumping controls are available and mainline command requests against the structures are processed normally.

Figure 28:
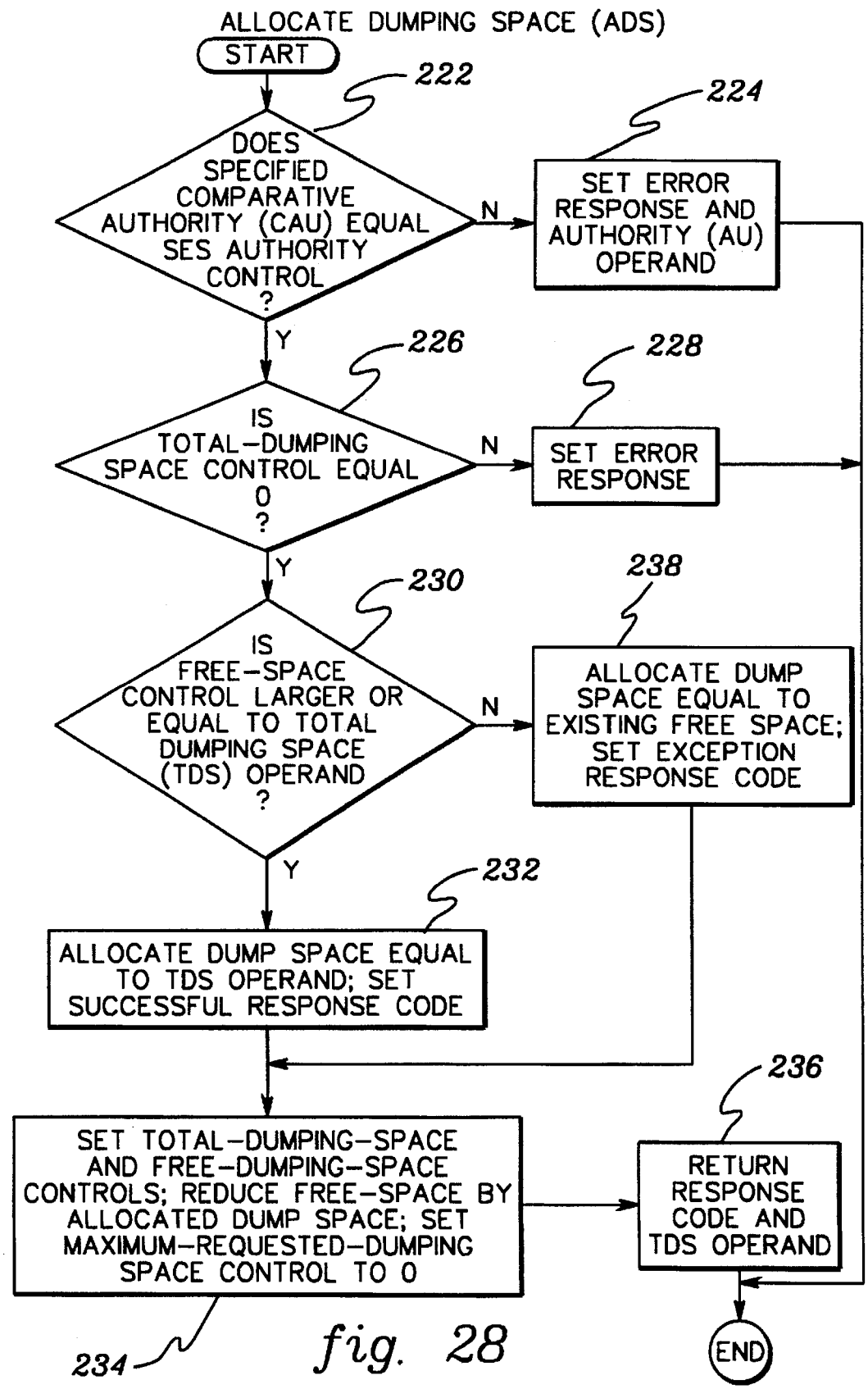
FIG. 28 illustrates one example of the logic associated with the allocate dumping space command, in accordance with the principles of the present invention.

The allocate dump space (ADS) command is described in detail with reference to FIG. 28. Initially, the value of the comparative authority (CAU) control is compared with the value of the SES-authority control to determine if they are equal, INQUIRY 222 "DOES SPECIFIED CAU EQUAL SES AUTHORITY CONTROL?" If CAU is not equal to the SES authority control, then no allocation is performed, an error response is set and the value of SES authority is placed in the authority control (AU) of the request/response operands, STEP 224 "SET ERROR RESPONSE AND AU OPERAND."

When the SES-authority control matches the CAU operand, the total-dumping-space control (TDS) should be zero, INQUIRY 226 "IS TOTAL DUMPING SPACE CONTROL EQUAL TO 0?" If this is not so, then no allocation is performed and an exception response is returned, STEP 228 "SET ERROR RESPONSE." However, when the SES-authority control matches the value of the CAU operand and the total-dumping-space control is zero, a determination is made as to whether there is sufficient free space. In particular, a comparison is made to determine whether the free space control located in the global controls is larger than or equal to the total dumping space control request operand within the global dumping controls, INQUIRY 230 "IS FREE SPACE CONTROL LARGER OR EQUAL TO TDS OPERAND?" If the free-space control is larger than or equal to the TDS operand, then dumping space is allocated from the available free space of the size specified by the TDS operand, the total-dumping-space and free-dumping-space controls are initialized, the free space control is reduced by an amount equal to the total dumping space, the maximum-requested-dumping-space control (MRDS) is set to zero, and the amount of the total dumping space, in 4K-byte units, is placed in the TDS response operand. The TDS operand and a successful response are returned, STEPS 232, 234, and 236.

On the other hand, if insufficient free space exists to create the requested amount of dumping space, all the existing free space is allocated as dumping space, STEP 238 "ALLOCATE DUMP SPACE EQUAL TO EXISTING FREE SPACE; SET EXCEPTION RESPONSE CODE." The total-dumping-space and free-dumping-space controls are set to the value of the free-space control, the free space control is set to zero, the maximum-requested-dumping-space control is set to zero, and the value of the total-dumping-space control is placed in the TDS response operand, STEP 234. The TDS operand and an exception response are returned, STEP 236 "RETURN RESPONSE CODE AND TDS OPERAND."

The total dumping space is specified in 4 k-byte units. In some models, the storage may be allocated in segments where the segment size is a multiple of 4 k bytes. When the requested total dumping space is not an integral multiple of the SES-segment size, the total dumping space is rounded up to the nearest integral multiple of the SES-segment size. Thus, the value of the total-dumping-space operand in the response may be larger than the value of the request operand.

Returning to FIG. 22, subsequent to allocating the desired dump space, the initial procedures are complete and dumps may be taken in order to gather information, such as control information, located in the coupling facility, STEP 206 "END."

Returning back to INQUIRY 200, if dump tables have been previously assigned, then the next allocated structure is selected, STEP 239 "SELECT NEXT ALLOCATED STRUCTURE". The structure to be selected is the next SID value in consecutive order. Then dumping controls 156, which describe and govern the use of the associated dump table 150 relating to the selected structure are read, STEP 240 "READ DUMPING CONTROLS." These controls are retrieved by the program through use of a read-dumping-controls command (RDC), described in detail below with reference to FIG. 29.

Figure 29:
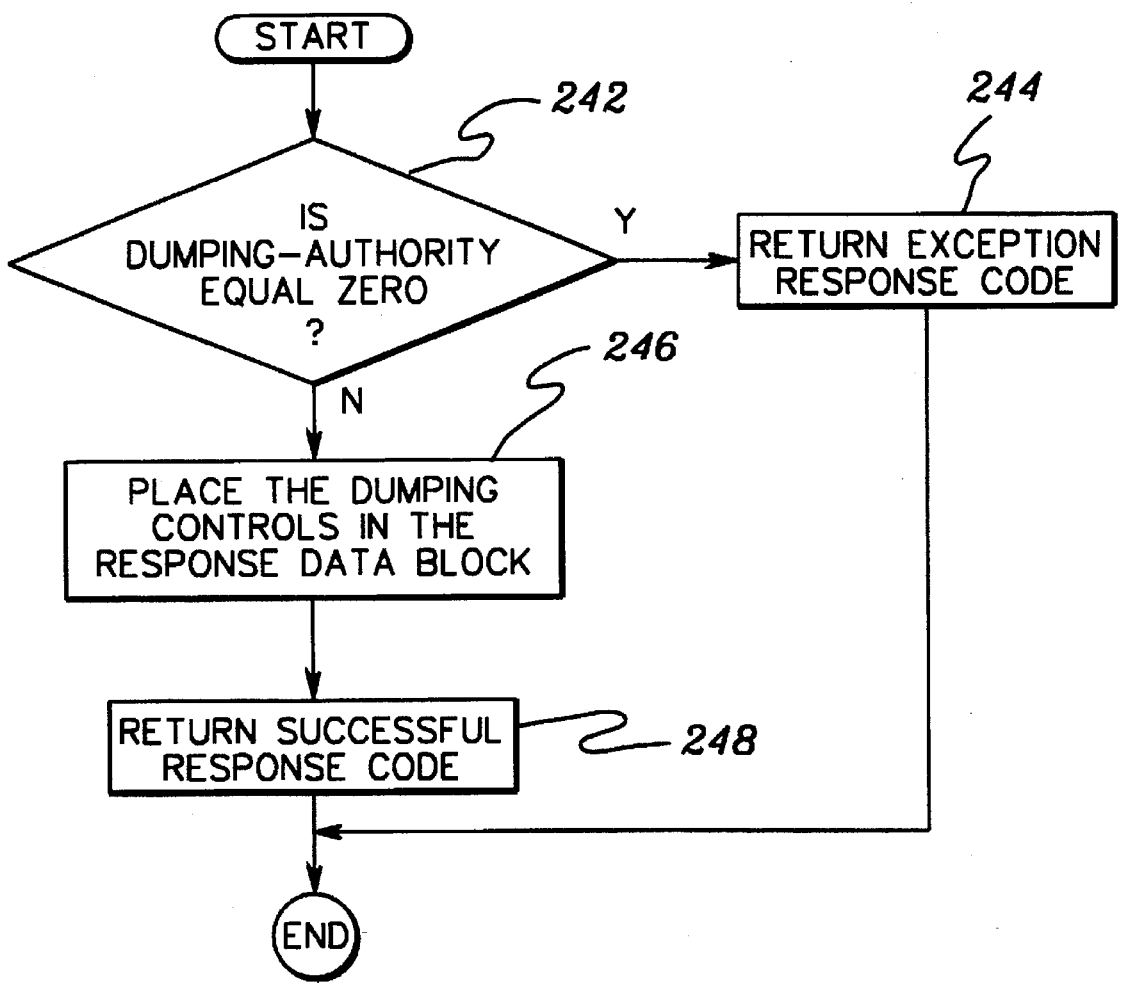
FIG. 29 illustrates one embodiment of the logic associated with the read dumping controls command, in accordance with the principles of the present invention.

Referring to FIG. 29, an inquiry is made to determine whether the dumping authority (DAU) located in dumping controls 156 is equal to zero, INQUIRY 242 "IS DUMPING-AUTHORITY EQUAL ZERO?" When the dumping authority is zero, no dump table is assigned to the specified structure. In this case, the data block is not returned, and an exception response is placed in the response operand, STEP 244 "RETURN EXCEPTION RESPONSE CODE."

When the dumping authority is non-zero, the dumping controls are placed in response data block 134, STEP 246 "PLACE THE DUMPING CONTROLS IN THE RESPONSE DATA BLOCK." In particular, the dumping information is placed in the DINF operand, the dumping authority is placed in the DAU operand, the dump serialization value is placed in the DS operand, the dump-table size is placed in the DTS operand, the structure type is placed in the ST operand, and the initialization-complete indicator is placed in the ICI operand. A successful response and the data block are returned, STEP 248 "RETURN SUCCESSFUL RESPONSE CODE."

Figure 30:
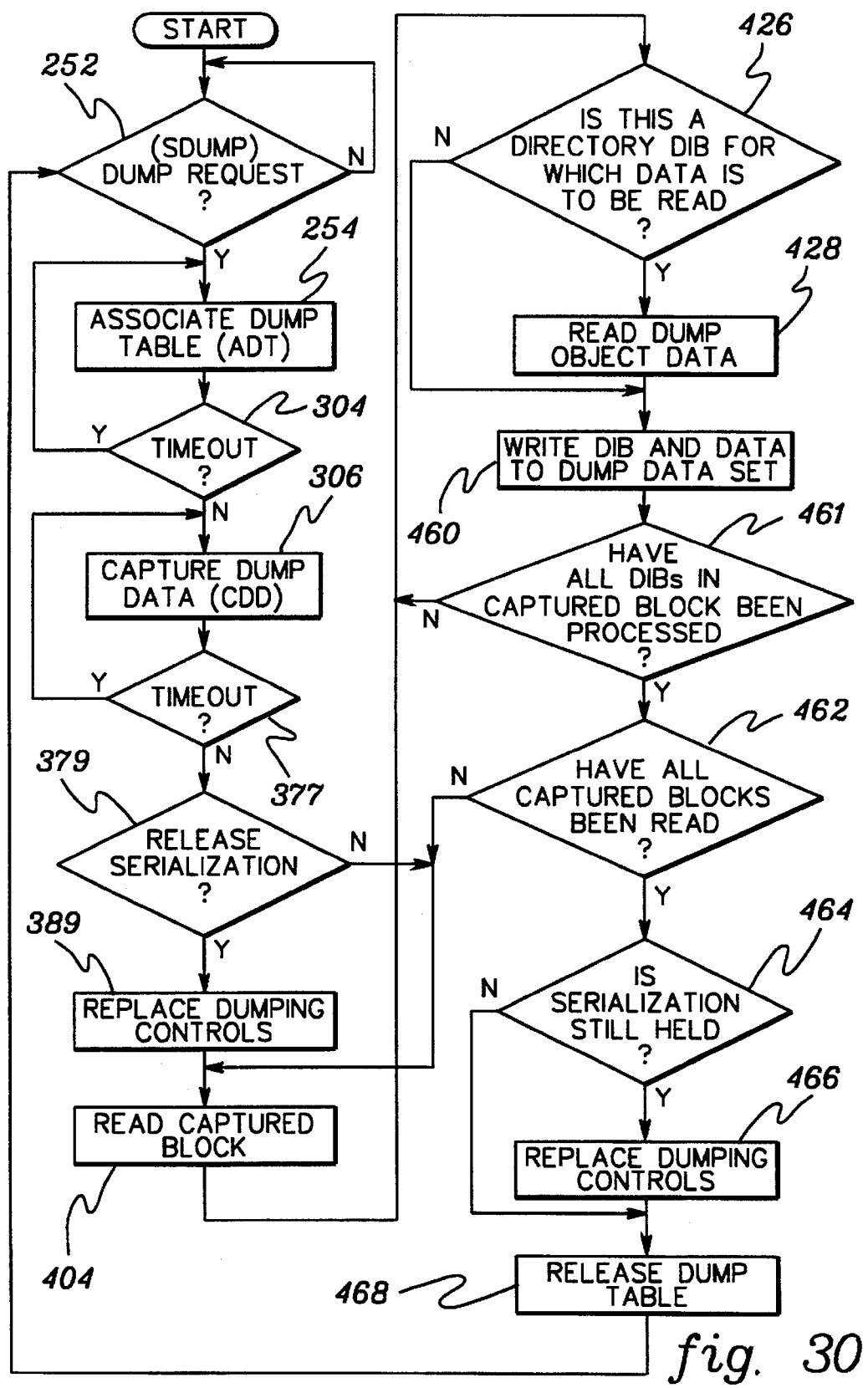
FIG. 30 illustrates one example of the logic associated with requesting a dump, in accordance with the principles of the present invention.

Returning to FIG. 22, if a dump table is indicated by the read dumping controls, then the dump table is processed, STEP 241 "PROCESS DUMP TABLE". In order to process the dump table, the contents of the dump table and the data are read and stored on a storage device. Then, the dump table is released, as described further below (FIG. 30). Subsequent to processing any dump tables, a determination is made as to whether all of the dump tables have been processed, INQUIRY 250 "HAVE ALL DUMP TABLES BEEN PROCESSED?" This is determined by checking whether the associated dump table count is equal to zero. If the associated dump table count is equal to zero, indicating that all of the dump tables have been processed, then flow passes to INQUIRY 202 "IS TOTAL DUMP SPACE AS DESIRED?" and processing continues, as described above. However, if all of the dump tables have not been processed, then flow returns to STEP 239 and the next allocated structure is selected. Thereafter, processing continues as described above.

After the initial procedures are completed and dump space has been allocated, dump requests may be made. Referring to FIG. 30, if a dump request has been made, INQUIRY 252 "(SDUMP) DUMP REQUEST?", then an associate dump table command is executed, STEP 254 "ASSOCIATE DUMP TABLE (ADT)." In particular, dump tables within the dump space can be defined and associated with allocated structures where a logical representation of desired control information may be collected. The associate-dump-table command uses storage management functions internal to dumping support to sub-allocate a dump table from the available allocated dump space. Dump tables are allocated in fixed size segments within the dump storage. The number and location of dump table segments needed to accommodate the request is determined and the dump table is associated with the structure being dumped. The dumping support function determines the size of the dump table based on tailoring options provided by the program. These options describe the objects within the structure to be dumped. Whenever available dump space is insufficient to perform the associate function, the dump table size will be adjusted to hold as much of the desired controls as possible.

The associate dump table (ADT) command is described in detail with reference to FIGS. 31a–31e. Initially, the structure-authority control (SAU) of cache-structure controls 69 (FIG. 4) or of the list structure controls 92 (FIG. 9) is tested to determine if it is equal to the CSAU operand located in request operands 140 of message command block 132 (FIGS. 15 and 16), INQUIRY 256 "DOES STRUCTURE-AUTHORITY CONTROL EQUAL CSAU OPERAND?" When the structure-authority control does not match the value of the CSAU operand, the command is completed, and the value of the structure authority is placed in the SAU response operand. The SAU operand and an exception response are returned, STEP 258 "RETURN EXCEPTION RESPONSE CODE AND SAU OPERAND." However, when the value of the structure-authority control matches the value of the CSAU operand, the command is executed. Processing of the command depends on the value of the dumping-authority control and the availability of dumping space.

When the dumping-authority control is zero, INQUIRY 260 "IS DUMPING-AUTHORITY CONTROL EQUAL 0?", the total-dumping-space control is checked to see if it is equal to zero and a determination is made as to whether sufficient free dumping space exists to contain a dump header, INQUIRY 262 "IS TOTAL-DUMPING SPACE NON-ZERO AND DOES SUFFICIENT FREE DUMPING SPACE EXIST?"

When a dump is initiated and the total-dumping-space control is zero, the dumping controls are not updated and an exception response is returned, STEP 264 "RETURN EXCEPTION RESPONSE CODE." Further, when a dump is initiated and the total-dumping-space control is non-zero, but insufficient free dumping space exists to contain the dump header, the dumping controls are not updated, and an exception response is returned, STEP 264 "RETURN EXCEPTION RESPONSE CODE."

When the total dumping space control (TDS) is non-zero and sufficient free dumping space exists, then a dump is initiated for the specified structure. Initiation of a dump for a structure involves the following operations: The dumping objects, including dumping controls 156, dumping status 157, dump tailoring options 158 are initialized; the dump table size is computed; the global dumping controls are updated; and the dumping controls are placed in the capture-in-progress state, STEP 266 "INITIALIZE DUMP OBJECTS."

In particular, the dumping serialization (DS), dumping information (DINF), and dumping authority (DAU) operands are set to the values in the DS, DINF, and RDAU request operands, respectively. The dumping controls for the structure being dumped are placed in the capture-in-progress state (see FIG. 32), and the count of associated dump tables (ADTC) is incremented. The dump-table size is determined from the valid set of objects specified in the associated request block. The structure type is set equal to the structure type. The initialization-complete indicator is initially set to zero. The dumping-status fields are initialized to zero. The dump-tailoring options are initialized to the values provided in the request operands and in the associated request block and the dump-local-cache-identifier object is initialized, if the structure type is a coupling facility (SES) cache. Commands that are executing when the dumping serialization is set are allowed to complete normally. However, commands that specify the structure are prevented from executing.

The set of input ranges is processed in the order they appear in the data block, STEP 267 "PROCESS THE INPUT RANGES IN ORDER, STARTING WITH DOT1, AIl1, DEI1, RI1, SR1 AND ER1." The object identified by SR1 and the dump object type is placed first on the list of objects to be processed by the capture command. Processing of the list ranges in the associated request block should complete within the model-dependent time period, INQUIRY 268 "HAS A TIME OUT CONDITION OCCURRED?" If, during processing of the first object, a time out has not occurred, processing continues, as described below.

A determination is made as to whether the specified dump-objects are valid, INQUIRY 269 "ARE THE DUMP-OBJECTS IN THE SPECIFIED RANGE VALID?" Should the objects be valid, then they are added to the list of objects to be processed by the capture command, STEP 270 "ADD THE DUMP-OBJECTS TO THE LIST OF OBJECTS TO BE PROCESSED BY THE CAPTURE COMMAND." Subsequent to adding the objects to the list or if the dump-objects are invalid, the next input range to be processed is prepared, STEP 272 "PREPARE TO PROCESS THE NEXT INPUT RANGE." The object identified by SR1+1 and the dump object type is the next object to be processed. List processing continues until all valid objects are identified, INQUIRY 274 "HAVE ALL INPUT RANGES BEEN PROCESSED?" If all of the input ranges have not been processed, then flow returns to INQUIRY 268. Otherwise, processing continues, as described below.

Any objects identified outside of the range of allocated objects for the structure are ignored. Also ignored are any objects with a valid dumping-object type that is not present in the structure. In this way the specified list of objects to be captured is systematically created to conform to the structure attributes.

When the dumping-object type specifies a lock table or user controls for a SES list or local-cache controls for a SES cache, the start-of-range and end-of-range operands are ignored. A subset of the lock table, user controls, or local-cache controls cannot be specified in the dump. Each object to be dumped requires an amount of storage that contains the dump header for the object and, optionally, a dumping information block (DIB) for each element that exists in the structure object. A DIB is provided for each element in the object when the DIB exclusion indicator (DEI) request operand is set to zero. Otherwise, dumping information blocks are excluded. When the adjunct-inclusion indicator (AII) is set to one, the DIB-exclusion indicator (DEI) is set to zero and the object contains adjunct data, then adjunct data is included in the DIB.

The request size of the dump table is the total of the storage required for the dump header, the sum of the storage required for each object header, and the sum of the storage amounts required for each DIB, provided dumping-information blocks are included. When insufficient free dumping storage exists to contain the dump table, INQUIRY 276 "DOES SUFFICIENT FREE DUMPING STORAGE EXIST TO PROCESS THE LAST OF OBJECTS?", the list of objects is reduced by removing objects from the bottom of the list until a maximal list is determined that can be contained in the dumping storage, STEP 278 "REMOVE THE LAST DUMP-OBJECT FROM THE LIST." The last object may be partially dumped. The reduced list determines the actual size of the dump table.

When processing is complete within the time period allowed by the model and sufficient free dumping storage exists, as defined above, the dump-initialization process is complete, STEP 280 "INDICATE DUMP INITIALIZATION IS COMPLETE." In particular, the initialization-complete indicator is set to one, the free-dumping-space control is reduced by the size of the dump table, the maximum-requested-dumping-space (MRDS) control is updated to the value of the maximum of the current value of the MRDS control and the dump-table size, STEP 282 and a successful response is returned, STEP 284 "RETURN A SUCCESSFUL RESPONSE CODE."

Otherwise, if a time-out has occurred, INQUIRY 268, an internal checkpoint is established for the dump-initialization process, the free-dumping-space control is reduced by the current size of the dump table during this command execution, the maximum-requested-dumping space (MRDS) control is updated with the maximum of the current value of the MRDS control and the dump-table size, STEP 286, and an exception response is returned, STEP 288 "RETURN AN EXCEPTION RESPONSE CODE."

Figure 31A:
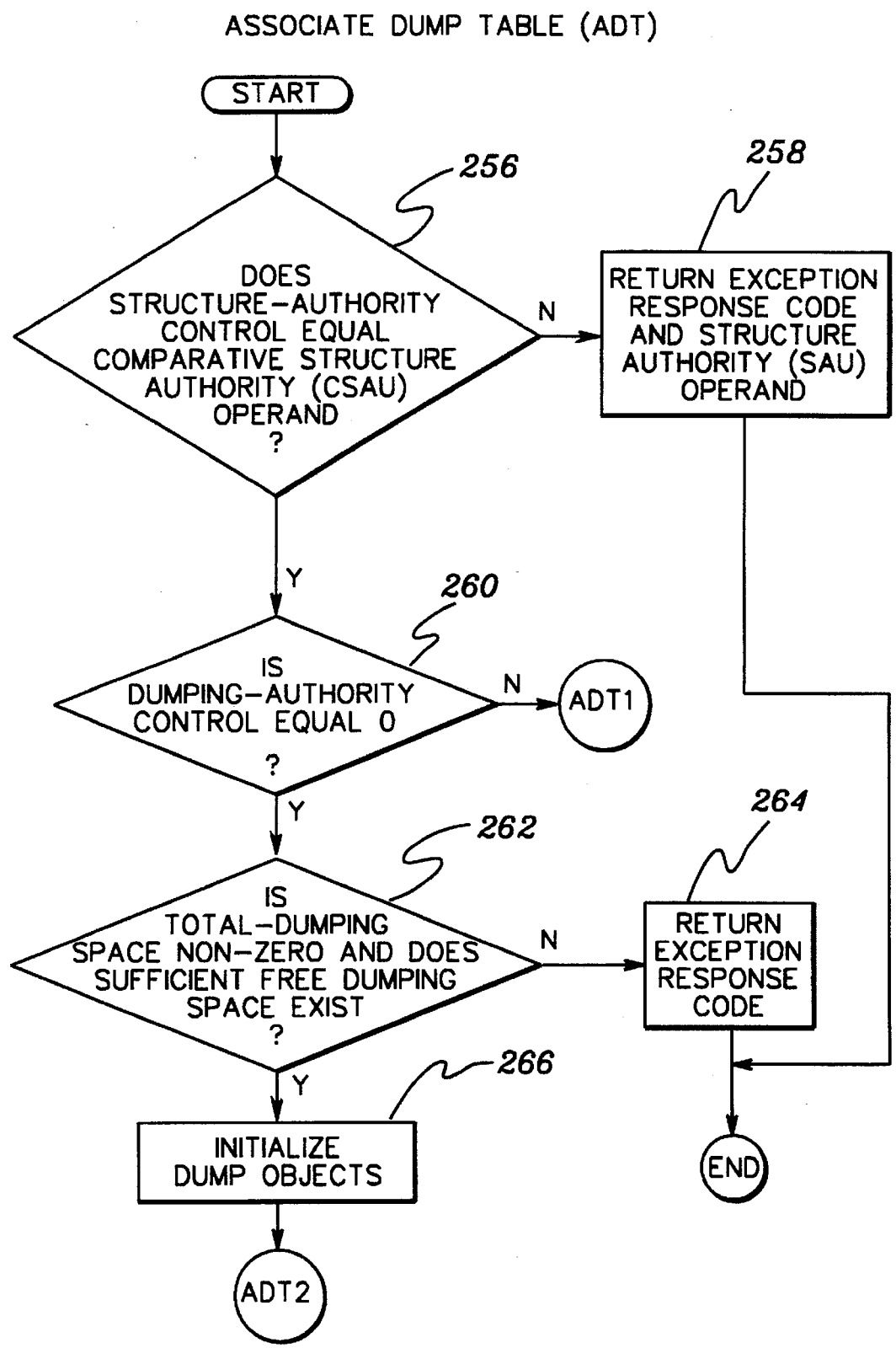
FIGS. 31a–31e illustrate one embodiment of the logic associated with an associate dump table command, in accordance with the principles of the present invention.
Figure 31B:
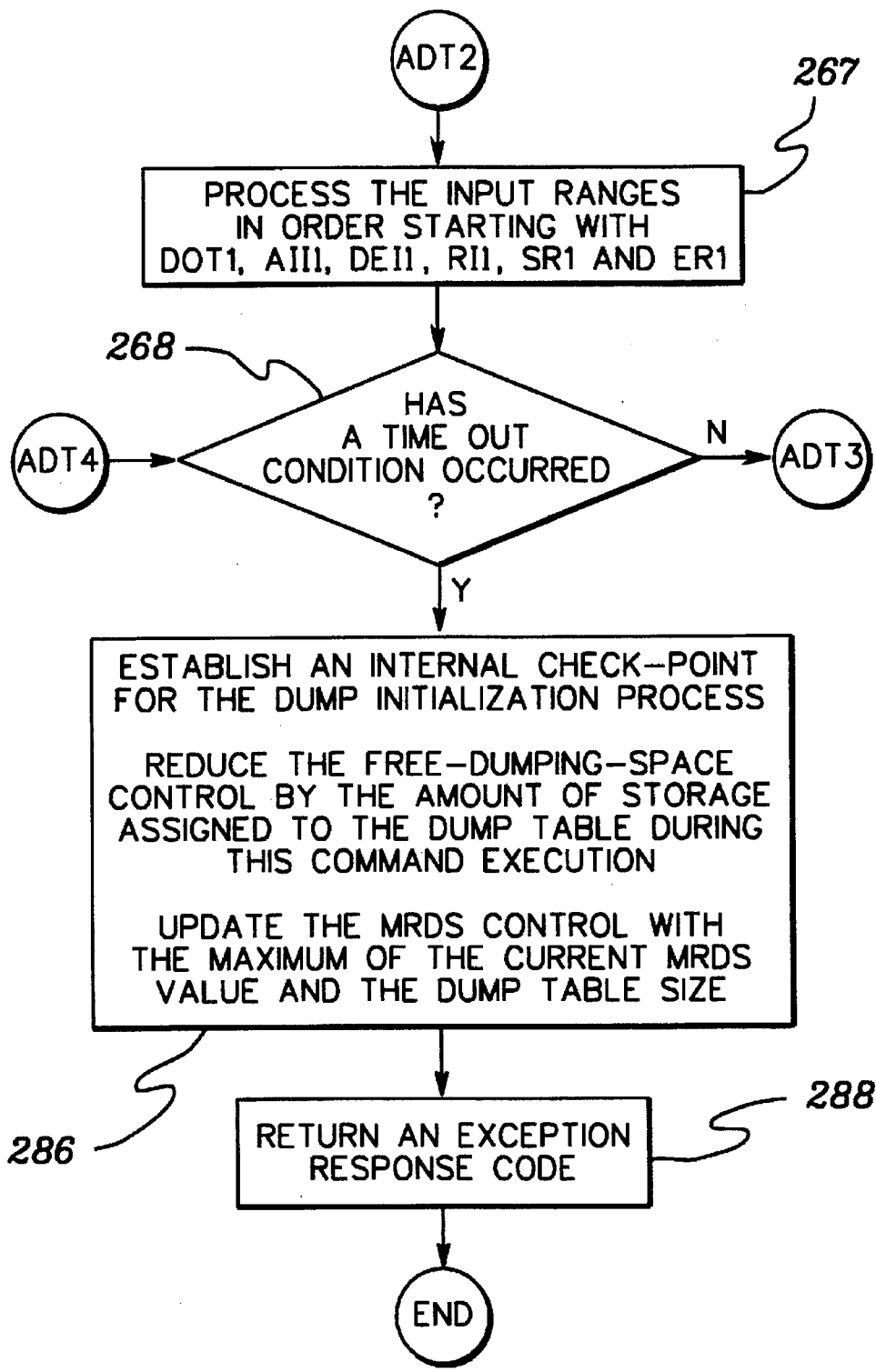
Figure 31C:
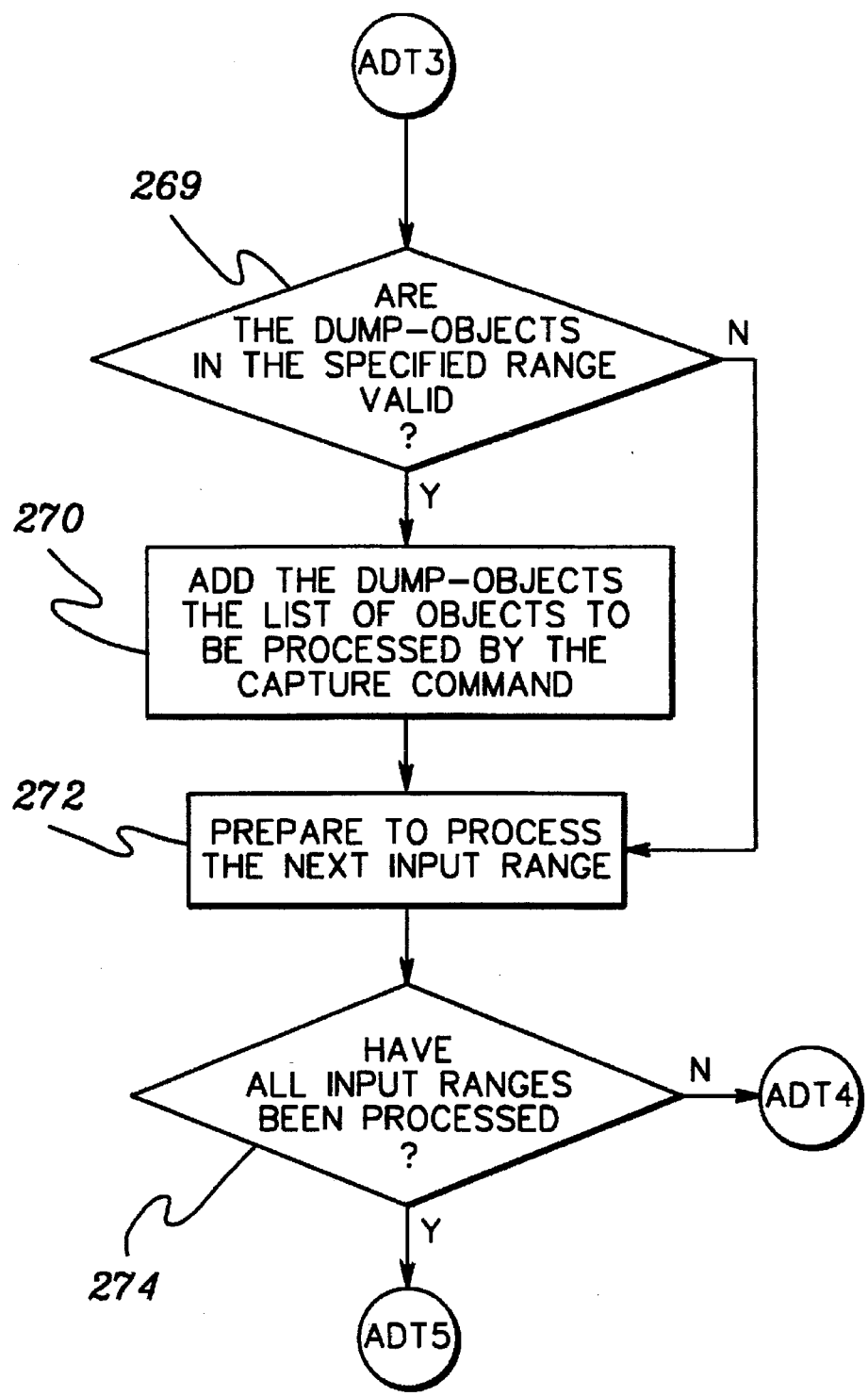
Figure 31D:
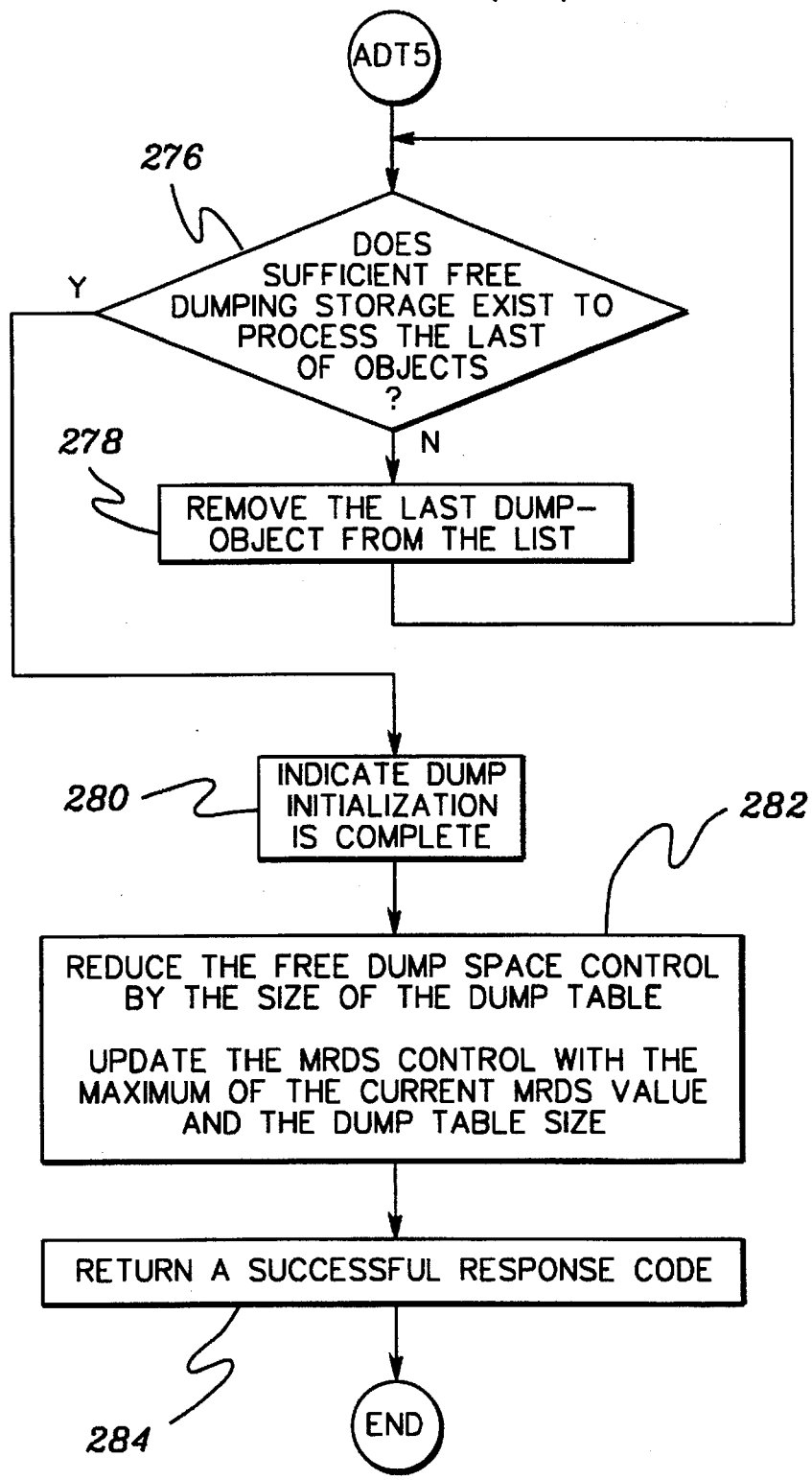
Figure 31E:
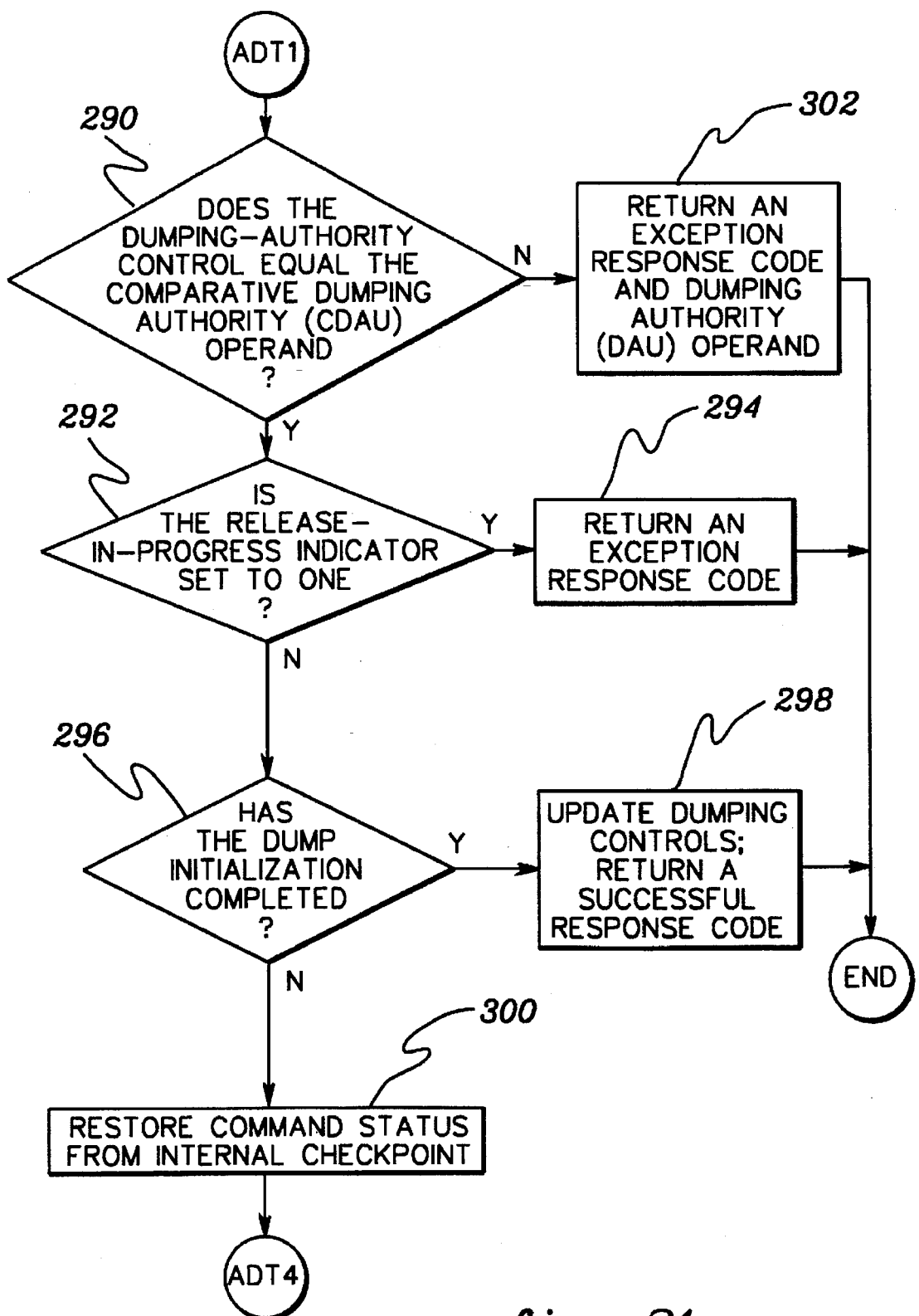

Referring back to FIG. 31a and, in particular INQUIRY 260, when dumping authority control is not equal to zero, a comparison is made between the dumping authority control and the comparative dumping authority control, INQUIRY 290 "DOES THE DUMPING-AUTHORITY CONTROL EQUAL THE CDAU OPERAND?" (FIG. 31e). When the comparative-dumping authority matches the value of the dumping authority control and the release-in-progress indicator is one, INQUIRY 292 "IS THE RELEASE-IN-PROGRESS INDICATOR SET TO ONE?", the command is completed and an exception response is returned, STEP 294 "RETURN AN EXCEPTION RESPONSE CODE."

When the comparative-dumping authority matches the value of the dumping-authority control and the release-in-progress indicator is not set to one, a determination is made as to whether dump initialization is complete, INQUIRY 296 "HAS THE DUMP INITIALIZATION COMPLETED?"

When the dump initialization process is complete, the initialization-complete indicator is set to one, the free-dumping-space control is reduced by the amount of additional storage assigned to the dump table, the maximum-requested-dumping-space (MRDS) control is updated to the value of the maximum of the current value of the MRDS control and the dump-table size, and a successful response is returned, STEP 298 "UPDATE DUMPING CONTROLS; RETURN A SUCCESSFUL RESPONSE CODE."

When the dump-initialization process has not yet been completed, processing is resumed from the internal checkpoint, STEP 300 "RESTORE COMMAND STATUS FROM INTERNAL CHECKPOINT," and continued for a model-dependent time period or until dump initialization is completed, INQUIRY 268.

Returning to INQUIRY 290 (FIG. 31e), when the dumping-authority comparison fails, the dumping authority is placed in the DAU response operand and an exception response is returned, STEP 302 "RETURN AN EXCEPTION RESPONSE CODE AND DAU OPERAND."

Referring back to FIG. 30, a determination is made as to whether a timeout has occurred, thus disrupting processing of the associate dump table command, INQUIRY 304 "TIMEOUT?" If a timeout has occurred, then flow returns to STEP 254 "ASSOCIATE DUMP TABLE" and the associate dump table command is executed once again. Otherwise, the associate dump table command has completed.

Figure 32:
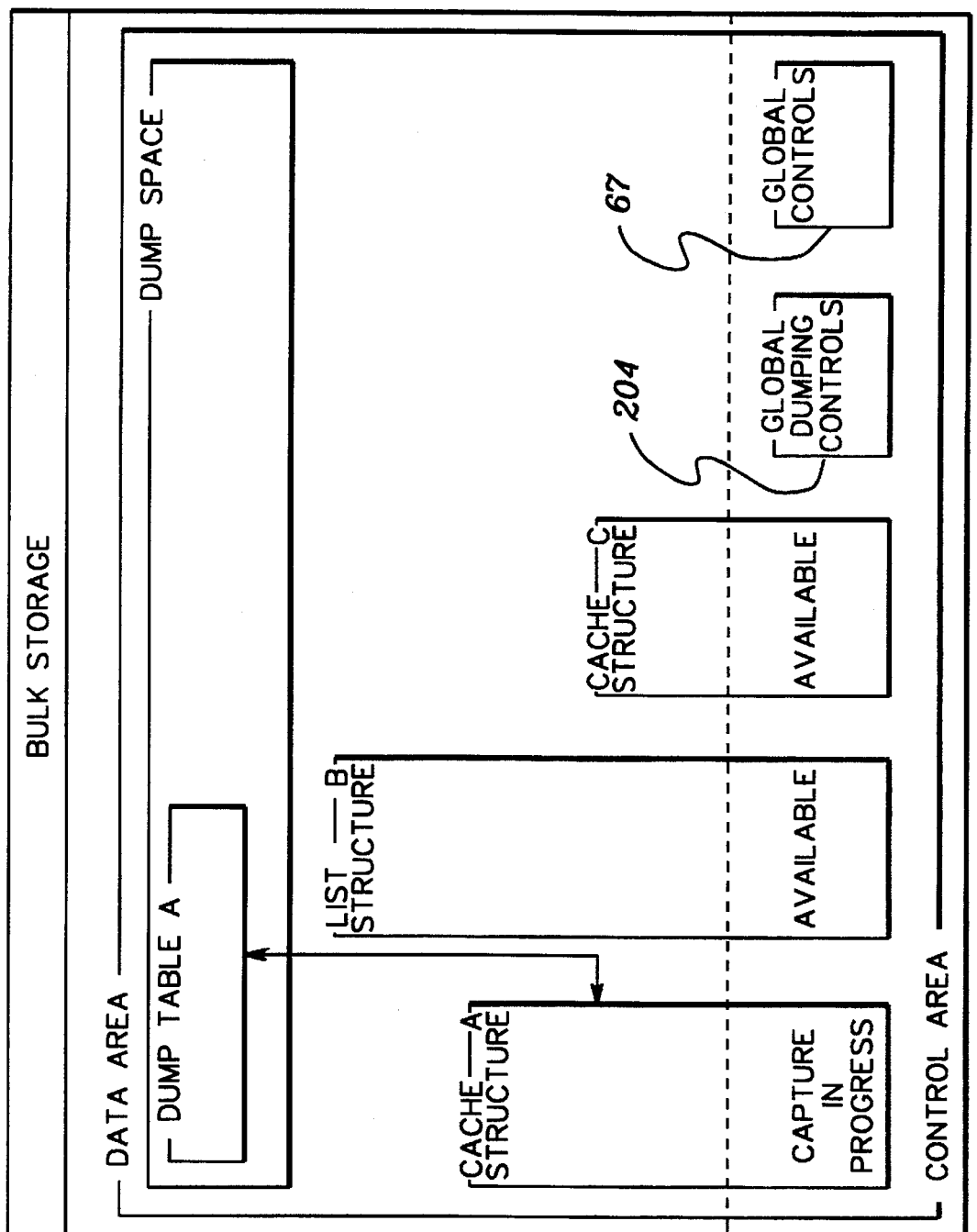
FIG. 32 depicts one example of a coupling facility in which a dump table has been associated to a cache structure, in accordance with the principles of the present invention.

As a result of the associate-dump-table command, the state of the structure related dumping controls is changed from available to capture-in-progress (FIG. 32). Serialization for the update of structure related dumping controls is provided by holding the structure control block latch in the exclusive state. The structure dumping controls are marked in-use which prevents the structure from being de-allocated. In addition, dumping serialization is obtained for the structure to prevent the execution of mainline commands against the structure. This dumping serialization is held until it is released by the program and persists even though the structure control block latch is released at the end of each dumping command. Mainline command requests against a structure serialized for dumping are rejected with a response code indicating dumping serialization is held.

Figure 33:
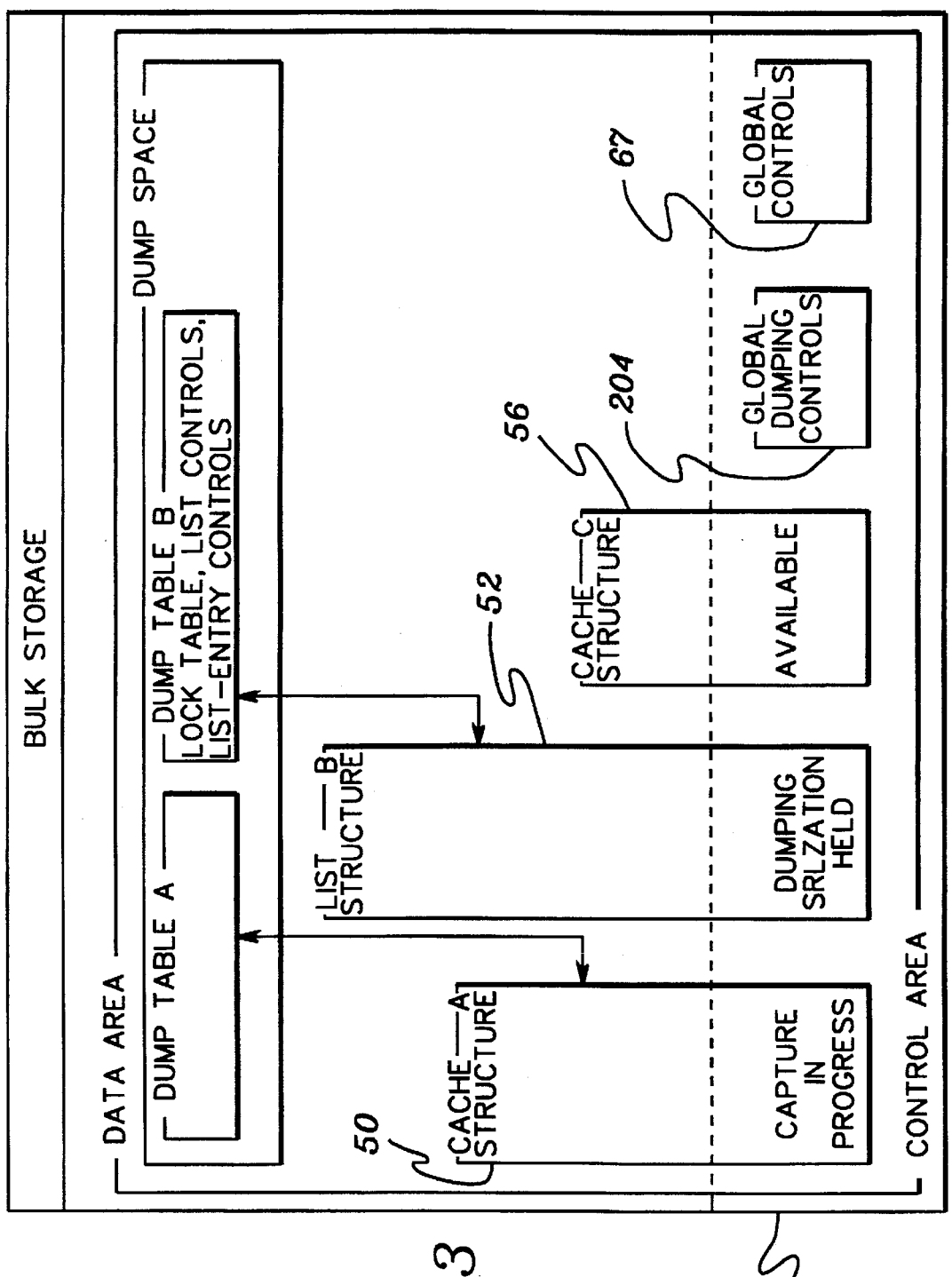
FIG. 33 depicts one example of a coupling facility structure in which dumping serialization is held, in accordance with the principles of the present invention.

The controls which describe and govern the use of the associated dump table reside in the structure control block of the structure being dumped. These controls consist of dumping information provided by the program to describe the dump table, the dumping authority used to uniquely identify the dump table, the dumping serialization value and the dump table size. These controls may be retrieved by the program through use of the read-dumping-controls command, described above. The dump table associated with a structure provides a staging area into which snapshots of the structure controls, and optionally adjunct data areas, are placed by the capture-dump-data command, described below. Examples of the types of controls captured are illustrated in FIG. 33. Here, the lock table, list controls and list entry controls of list structure B are captured in the corresponding dump table. Once initiated, the identified structure objects are captured under repeated program initiated capture commands; each invocation capturing a portion of the identified set of objects. Information is captured and placed into the dump table in the order in which it was requested on the associate-dump-table command.

FIG. 33 illustrates the general contents and format of the associated dump table as a result of the capture process, which is described in detail below. Data capture occurs under serialization (i.e., dumping serialization held) of the structure in order to block mainline requests against the structure which may manipulate the data being dumped. However, once staged to the dump table, serialization is released, thereby making the structure available to mainline command execution. After dumping serialization is released, no subsequent capture-dump-data command will execute against the dump table.

As depicted in FIG. 30, after completion of the associate-dump-table command, a capture-dump-data command is processed, STEP 306 "CAPTURE DUMP DATA (CDD)." As described in detail with reference to FIGS. 34a–34e, execution of the capture-dump-data command is subject to a SES model dependent timeout which when exceeded results in an internal checkpoint of the capture process and causes command completion. The program may continue the capturing process by executing the capture-dump-data command repetitively until the capture is completed. The model dependent time limit for a single command execution is set by a coupling facility (e.g., SES facility) timing component. This ensures the dumping support function will respond to a potentially long running capture request within a reasonable amount of time. The capture process is terminated in one of three ways. Usually the capture is completed when there is no more data to be captured or the dump table has been filled. However, the capture process may also be terminated when dumping serialization is released. Note that dumping serialization is released either as a result of a replace-dumping-controls command, described below, or implicitly as a result of the release-dump-table command, also described below.

When the capture process is completed because all of the requested data has been captured or the available space in the dump table has been exhausted, the state of the dumping controls change from capture-in-progress to dumping-serialization-held (FIG. 33). In this state, a capture-dump-data command issued against the structure will be rejected. In addition, since dumping serialization is still held, mainline commands issued against the structure will also be rejected.

Referring to FIGS. 34a–34e, the capture dump data command is described in detail. Initially, the dumping-authority control is tested, INQUIRY 308 "IS DUMPING-AUTHORITY CONTROL EQUAL 0 OR NOT EQUAL TO CDAU OPERAND?" When the dumping-authority control is zero or does not match the value of the CDAU operand, the command is completed and the value of the dumping authority is placed in the DAU response operand. The DAU operand and an exception response are returned, STEP 310 "RETURN EXCEPTION RESPONSE CODE AND DAU OPERAND."

However, when the value of the dumping-authority control is equal to the value of the CDAU operand and not equal to zero, the dumping-serialization control is tested, INQUIRY 312 "IS DUMPING-SERIALIZATION CONTROL NOT EQUAL TO THE CDS OPERAND AND NOT ZERO?" If the dumping serialization control does not match the value of the CDS request operand and it is not zero, the command is completed and the value of the dumping-serialization control is placed in the DS response operand. The DS operand and exception response are returned, STEP 314 "RETURN EXCEPTION RESPONSE CODE AND DS OPERAND."

When the dumping-authority and dumping-serialization tests are successful, a test of the dump initialization complete indicator is performed, INQUIRY 316 "HAS DUMP INITIALIZATION COMPLETED?" Should the initialization-complete indicator be zero specifying that initialization is in progress, the command is completed and an exception response is returned, STEP 322 "RETURN EXCEPTION RESPONSE CODE." On the other hand, if dump initialization is complete, the release-in-progress indicator is tested, INQUIRY 320 "IS THE RELEASE-IN-PROGRESS INDICATOR SET?" When the release-in-progress indicator is one, the dump table is being released. Therefore, the command is completed, and an exception response is returned, STEP 322 "RETURN EXCEPTION RESPONSE CODE."

When the release-in-progress indicator is zero, the capture-completion code is tested, INQUIRY 324 "IS THE CAPTURE COMPLETION CODE EQUAL 0?" Should the capture completion code contain a non-zero value, the command is completed and the capture-completion code (CAPCC) and successful response are returned, STEP 326 "RETURN SUCCESSFUL RESPONSE CODE AND CAPCC OPERAND." When the capture completion code is zero, indicating capture in progress, a capturing operation is processed.

Capturing begins at the structure object located by loading the capturing restart token (CRT) from dumping status 157, STEP 328 "RESTORE THE CAPTURING RESTART TOKEN." When the capturing restart token is zero, INQUIRY 330 "IS THE CAPTURING RESTART TOKEN EQUAL 0?", the capturing operation is delayed until all commands executing against the structure have completed, STEP 332 "QUIESCE ACTIVE COMMANDS". After all of the commands have been quiesced, the initial phase of capturing begins. This consists of creating dump header 152 (FIG. 18), which, as described above, contains structure controls 154, dumping controls 156, dumping status 157, dump-tailoring options 158 and associated request block 160, STEP 334 "CREATE A DUMP HEADER."

Subsequent to creating a dump header or if the capturing restart token is not equal to zero, a determination is made as to whether a time-out condition has occurred, INQUIRY 336 "HAS A TIME OUT CONDITION OCCURRED?" If a model-dependent time-out has not occurred, then a determination is made as to whether the dump table is full, INQUIRY 338 "IS DUMP TABLE FULL?" If the dump table is not full, then a decision is made as to whether an object header has been created for the object identified by the capturing restart token, INQUIRY 340 "HAS AN OBJECT HEADER BEEN CREATED FOR THE OBJECT IDENTIFIED BY THE CAPTURING RESTART TOKEN?"

If an object header has not previously been created, then one is created, STEP 342 "CREATE AN OBJECT HEADER FOR THE OBJECT IDENTIFIED BY THE CAPTURING RESTART TOKEN." The capturing of an object starts with the creation of the object header. The object header, described in detail above with reference to FIG. 21, contains fields that describe the attributes of the dumping object and contains the object controls. The size of the object header is, for example, 4 k bytes and is padded with zeros following the last control field. After the object header is created, flow passes to INQUIRY 336 and processing continues, as described herein.

Returning to INQUIRY 340, when the object header has been created for the object identified by the capturing restart token, a determination is made as to whether all the DIBs have been created for the current object, INQUIRY 344 "HAVE ALL DIB(S) BEEN CREATED FOR THE CURRENT OBJECT?" If all of the DIBs have not been created, then a DIB for the next element in the structure object is created, STEP 346 "CREATE A DIB FOR THE NEXT ELEMENT IN THE STRUCTURE OBJECT." In particular, when the DEI control is zero, the capturing process for the object continues with the capturing of the list of dumping-information blocks (DIB). A DIB is created for each element in the structure object. The format of the dumping information block is determined by the dumping-object type. The elements are captured in object order. When the element contains adjunct data and the AII control is one, adjunct data is included in the DIB.

Figure 34A:
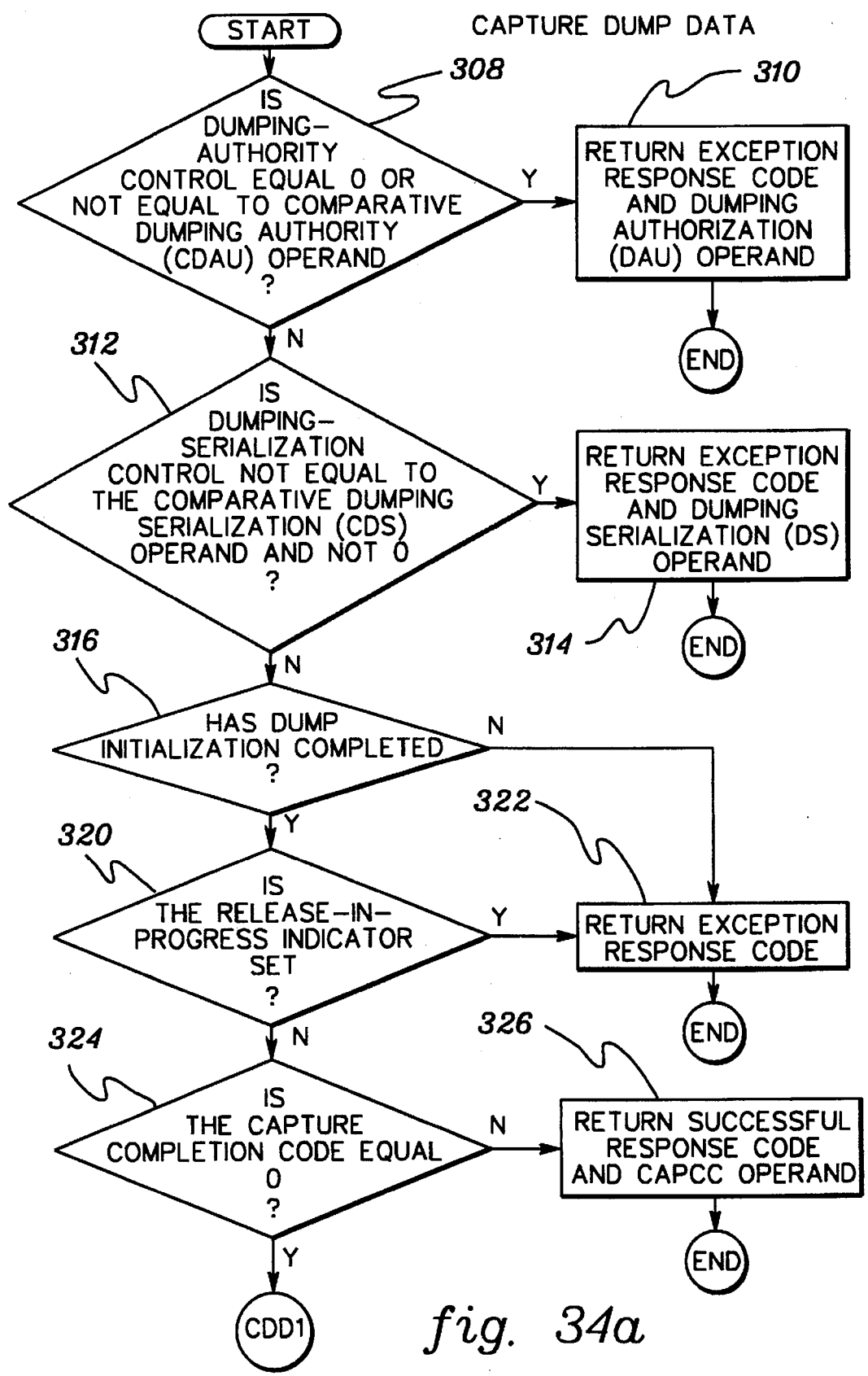
FIGS. 34a–34e illustrate one embodiment of the logic associated with a capture dump data command, in accordance with the principles of the present invention.
Figure 34B:
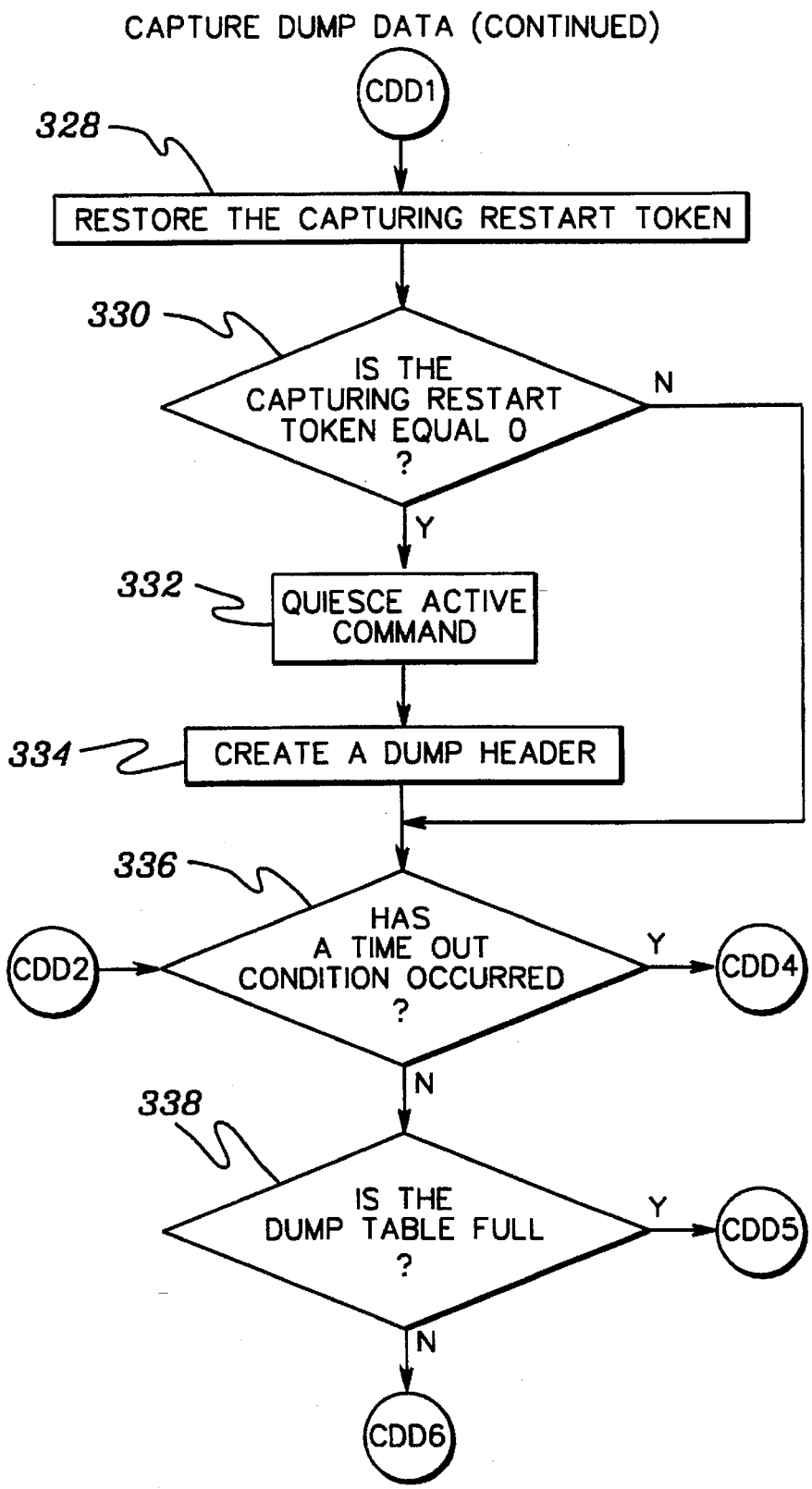
Figure 34C:
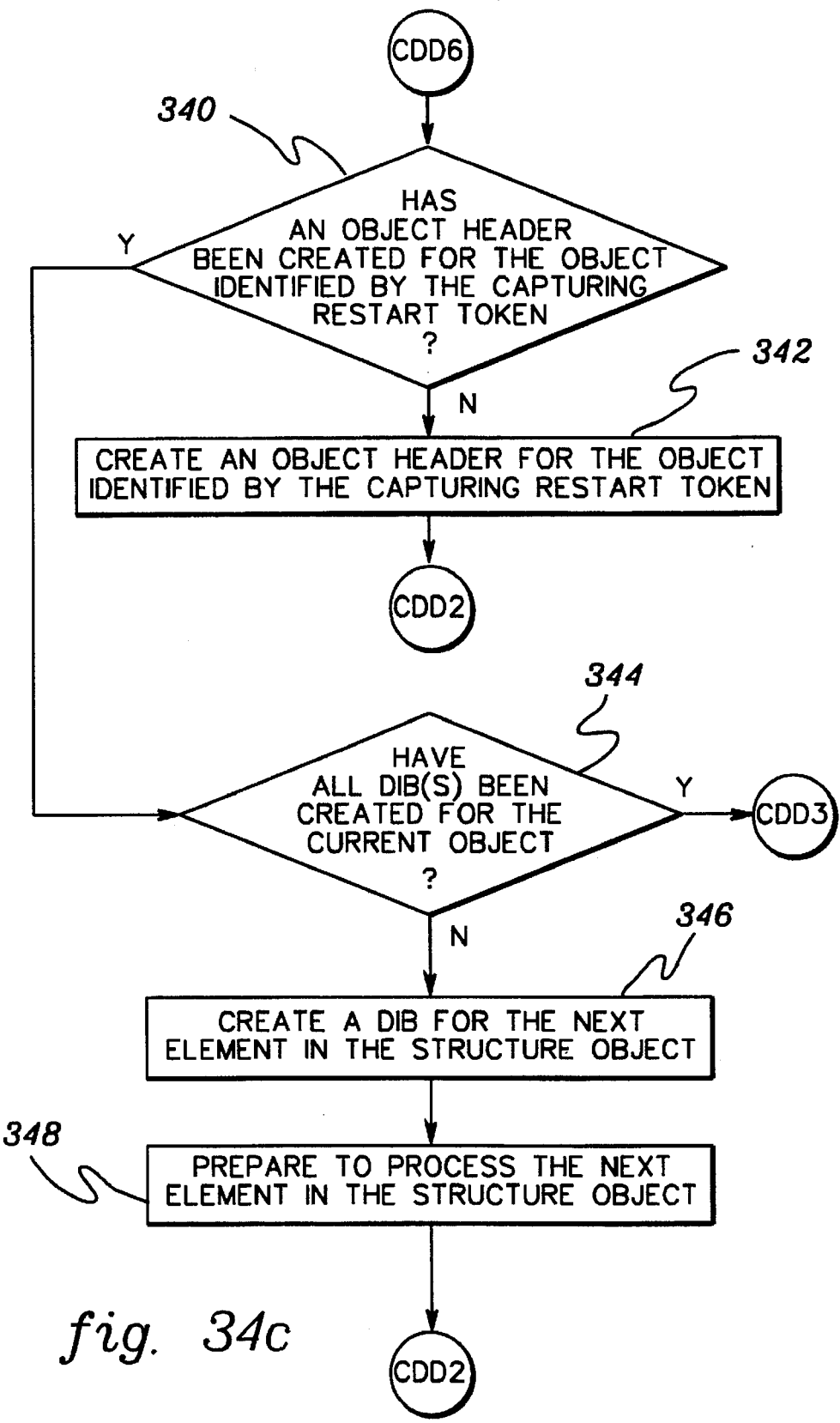

Subsequent to creating the DIB, the next element in the structure object is located in preparation of processing the next element, STEP 348 "PREPARE TO PROCESS THE NEXT ELEMENT IN THE STRUCTURE OBJECT" and flow passes to INQUIRY 336 (FIG. 34b).

Figure 34D:
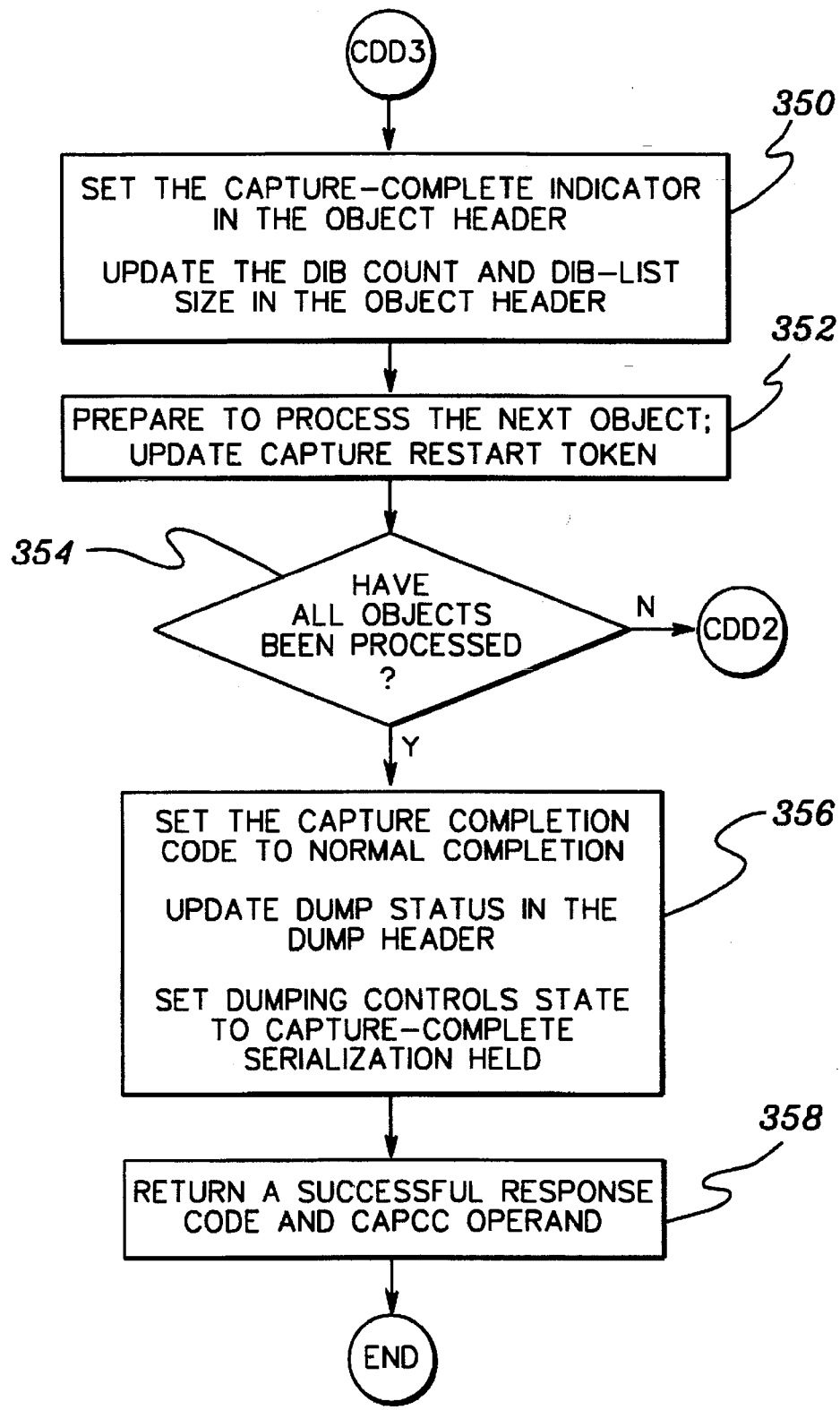

Returning to FIG. 34c and, in particular, INQUIRY 344, when all elements in the object have been added to the DIB list, the capture-complete indicator in the object header is set to one and the DIB count and DIB-list size are updated in the object header, STEP 350 (FIG. 34d). Thereafter, the next object is processed and the capture restart token is updated, STEP 352 "PREPARE TO PROCESS THE NEXT OBJECT; UPDATE CAPTURE RESTART TOKEN."

Subsequently, a determination is made as to whether all the objects have been processed, INQUIRY 354 "HAVE ALL OBJECTS BEEN PROCESSED?" This is determined by checking the capture-complete indicators for every valid object specified in the associated request block. When the indicators are all set to one, the capture process has reached normal completion. The capture-completion code is set to normal completion and the dump status is updated in the dump header. The state of the dumping controls is capture-complete serialization held. The capture-completion code and successful response are returned, STEPS 356, 358.

If all the objects have not been processed, INQUIRY 354, flow passes to INQUIRY 336 and processing continues as described herein.

Figure 34E:
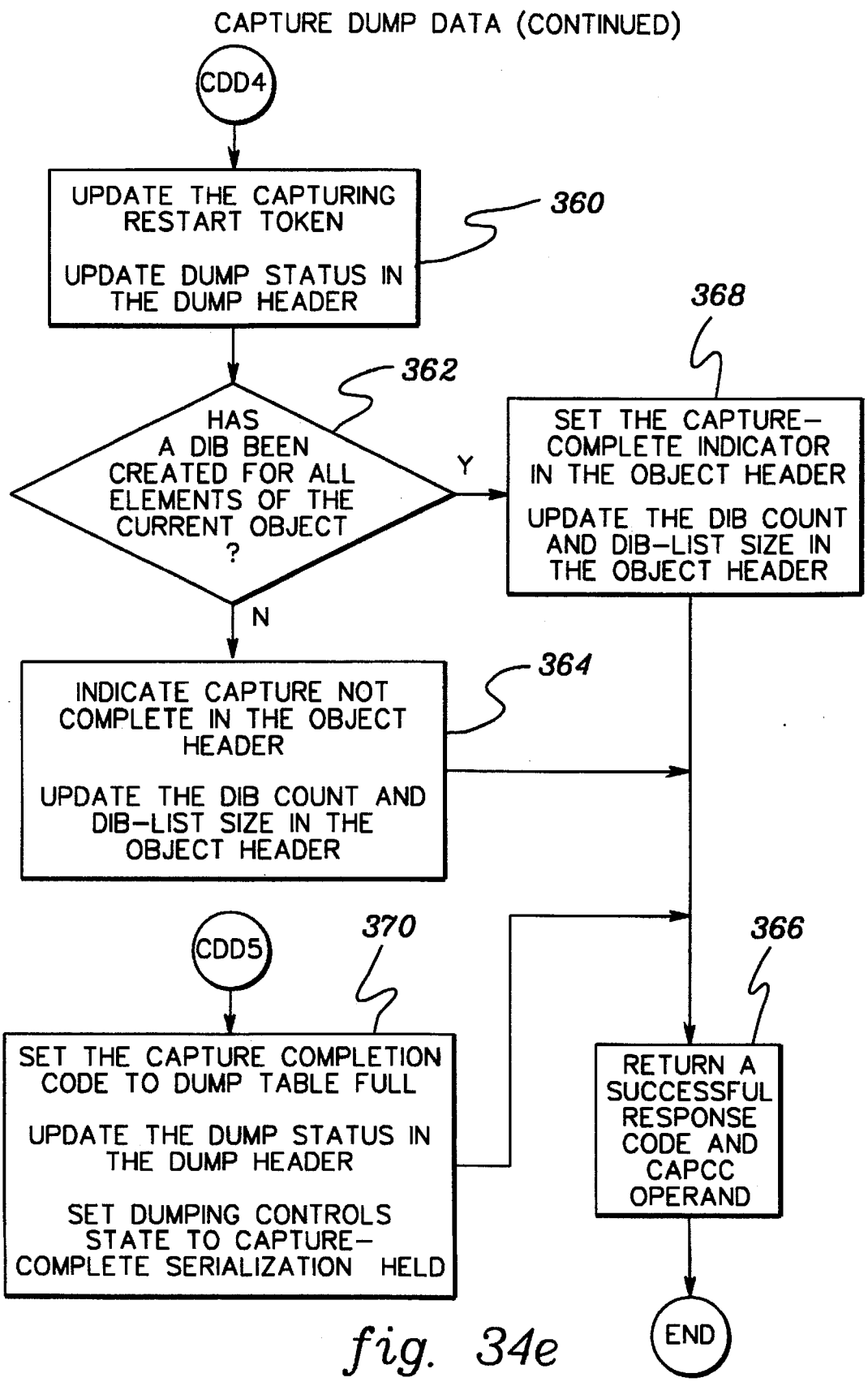

Returning to INQUIRY 336 (FIG. 34b), when a model-dependent time out period has elapsed, the capturing restart token is updated to specify the next element in an object to be captured and the dumping status is updated in the dumping header, STEP 360 (FIG. 34e). If processing of a DIB list terminates prior to completing the capture of every element in the object, INQUIRY 362 "HAS A DIB BEEN CREATED FOR ALL ELEMENTS OF THE CURRENT OBJECT?", the capture-complete indicator in the object header is set to zero and the DIB count and DIB-list size are updated in the object header, STEP 364. The state of the dumping controls remains capture in progress. The capture-completion code and successful response are returned, STEP 366 "RETURN A SUCCESSFUL RESPONSE CODE AND CAPCC OPERAND." Further, when a DIB has been created for all elements of the current object, the capture-complete indicator is set to one and the DIB count and DIB-list size are updated, STEP 368. Thereafter, flow passes to STEP 366 and processing continues, as described above.

Returning back to INQUIRY 338, when the last entry in the dump table is used and the capture process has not reached normal completion, the capture-completion code is set to dump table full, the dump status is updated in the dump header, and the command is completed. The state of the dumping controls is capture-complete serialization held, STEP 370. The capture-completion code and successful response are returned, STEP 366.

When a lock table is captured, dumping-information blocks are included in the dump table for each non-zero lock-table entry. Zero-valued lock-table entries are not included in the dump table. Changes in the dumping status must be made visible in the dump header.

Returning to FIG. 30, subsequent to executing the capture dump data command, another test is performed to determine if a timeout has occurred, INQUIRY 377 "TIMEOUT?" If a timeout has occurred, then flow returns to STEP 306 "CAPTURE DUMP DATA." On the other hand, if no timeout has occurred, then a determination is made as to whether serialization is to be released, INQUIRY 379 "RELEASE SERIALIZATION?"

Figure 35:
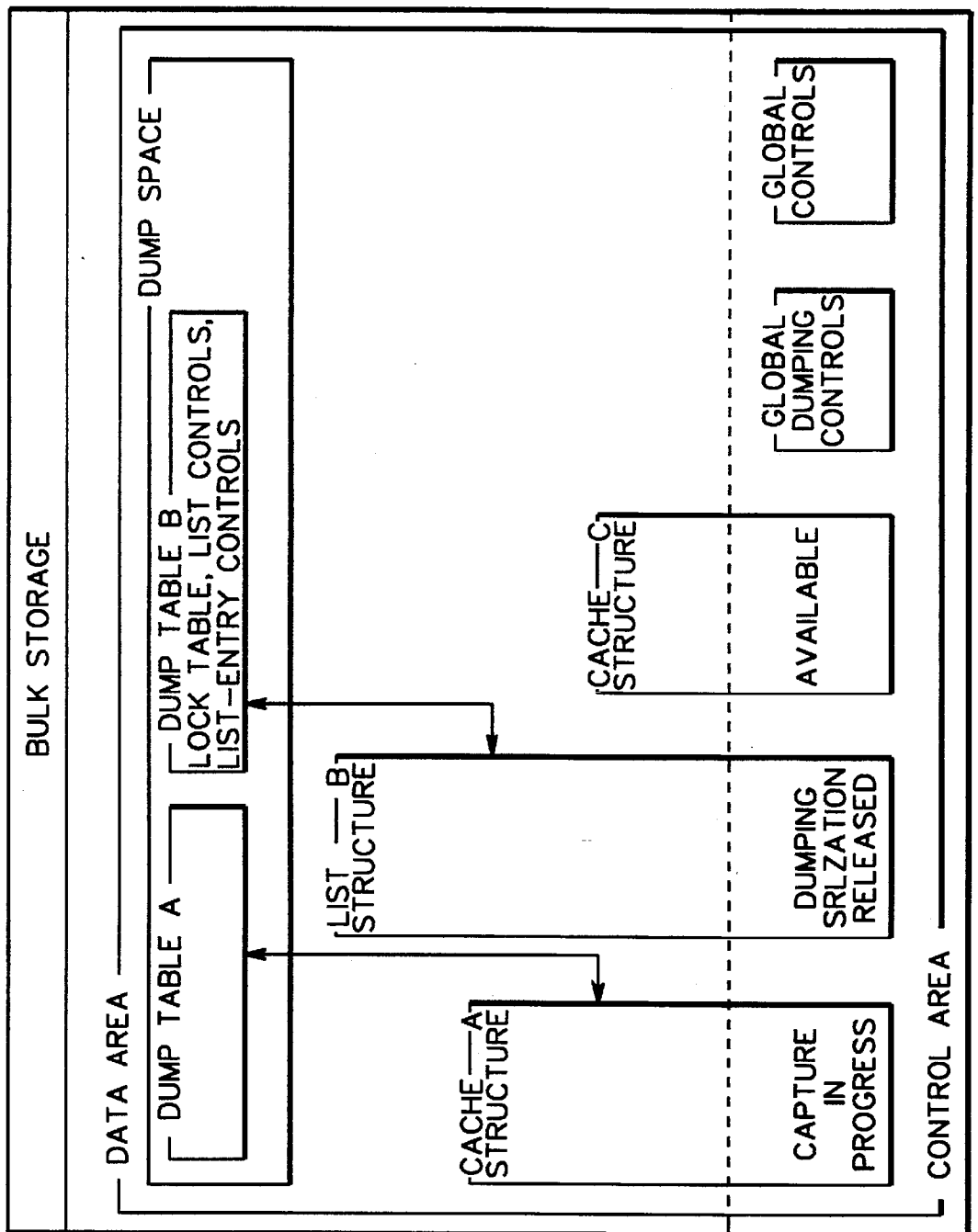
FIG. 35 depicts one example of a coupling facility structure in which dumping serialization is released, in accordance with the principles of the present invention.

If serialization is to be released, the replace dumping-controls command is used to release the dumping serialization of a structure. This process, as illustrated in FIG. 35, changes the state of a structure from capture-in-progress or dumping-serialization-held to dumping-serialization-released. The serialization is released, but the structure related dumping controls remain in use. Once dumping serialization is released, mainline commands may be processed against the structure. However, the structure may not be de-allocated. (The exception to this is that the structure may be de-allocated when structure damage has been indicated.) Since dumping controls are in use, no other dumping operation may be initiated (via associate-dump-table command) against the structure. The captured information in the dump table may be retrieved, through use of the read-captured-block command, as described below.

Figure 36A:
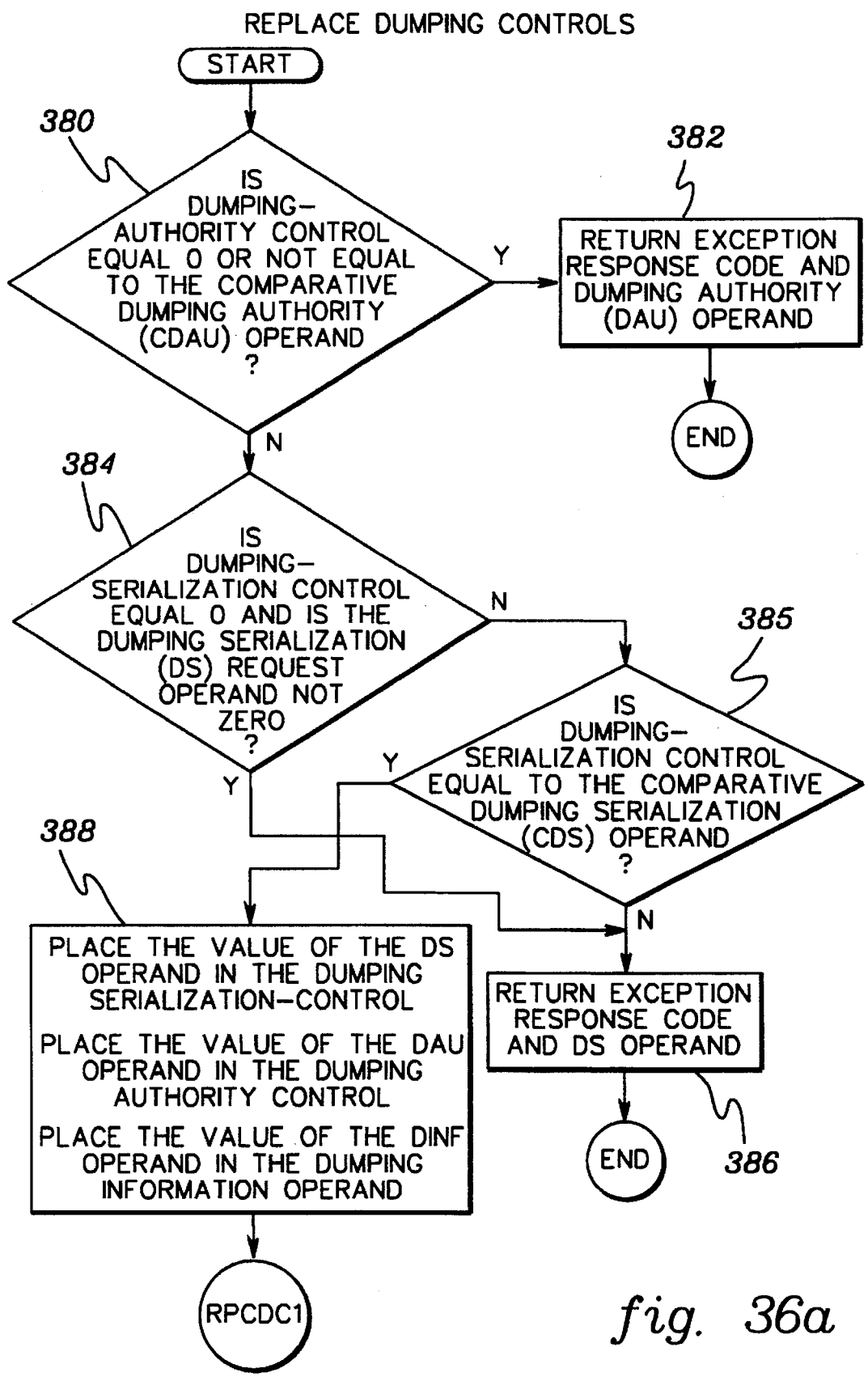
FIGS. 36a–36b illustrates one embodiment of the logic associated with replace dumping controls, in accordance with the principles of the present invention.
Figure 36B:
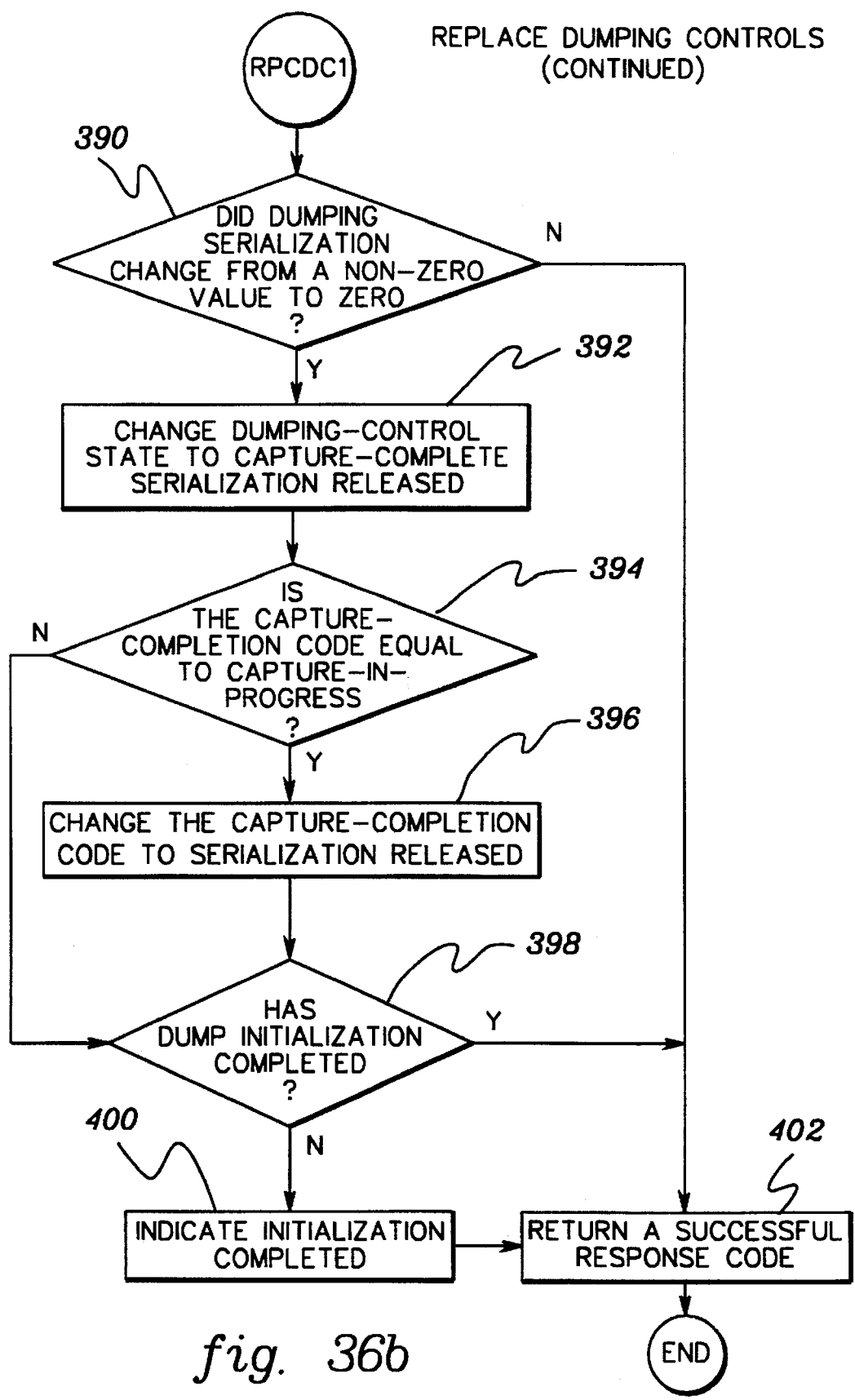

The manner in which dumping serialization is replaced, STEP 389 "REPLACE DUMPING CONTROLS" is described in detail with reference to FIGS. 36a–36b. Initially, the dumping-authority control is tested, INQUIRY 380 "IS DUMPING-AUTHORITY CONTROL EQUAL 0 OR NOT EQUAL TO THE CDAU OPERAND?" Should the dumping-authority control be zero or if the dumping-authority control does not match the value of the CDAU operand, the command is completed and the value of the dumping authority is placed in the DAU response operand. The DAU operand and an exception response are returned, STEP 382 "RETURN EXCEPTION RESPONSE CODE AND DAU OPERAND."

When the value of the dumping-authority control is equal to the value of the CDAU operand and is not equal to zero, the dumping-serialization control is tested, INQUIRY 384 "IS DUMPING SERIALIZATION CONTROL EQUAL 0 AND IS THE DS REQUEST OPERAND NOT ZERO?" If the dumping serialization control is zero or the DS request operand is zero, the CDS operand is tested to determine if the dumping serialization control is equal to the CDS operand, INQUIRY 385 "IS DUMPING SERIALIZATION CONTROL EQUAL TO CDS OPERAND?" If the dumping serialization control does not match the value of the CDS operand or the dump serialization control is equal zero and the DS request operand is not equal to zero, the dumping-serialization control is placed in the DS response operand and the DS operand and an exception response are returned, STEP 386 "RETURN EXCEPTION RESPONSE CODE AND DS OPERAND."

Otherwise, the value of the DS operand is placed in the dumping-serialization control, the value of the DAU operand is placed in the dumping-authority control, the value of the DINF operand is placed in the dumping-information control and the dumping-control state is updated, STEP 388.

When the dumping-serialization control is changed from a non-zero value to zero, INQUIRY 390 "DID DUMPING SERIALIZATION CHANGE FROM A NON-ZERO VALUE TO ZERO?", the dumping-control state changes to capture complete serialization released, STEP 392 "CHANGE DUMPING-CONTROL STATE TO CAPTURE-COMPLETE SERIALIZATION RELEASED." Thereafter, a determination is made as to whether the capture completion code is equal to capture in progress, INQUIRY 394. If the capture-completion code contains a value equal to capture in progress, its value is changed to serialization released, STEP 396 "CHANGE THE CAPTURE-COMPLETION CODE TO SERIALIZATION RELEASED."

Subsequent to changing the capture-completion code or if the capture completion code is not equal to capture in progress, a determination is made as to whether dump initialization is complete, INQUIRY 398 "HAS DUMP INITIALIZATION COMPLETED?" If dump initialization has not completed, the initialization-complete indicator (ICI) is set to one, STEP 400 "INDICATE INITIALIZATION COMPLETE." After the ICI is set or if the answer to INQUIRY 398 is affirmative, a successful response code is returned, STEP 402 "RETURN A SUCCESSFUL RESPONSE CODE."

Returning to INQUIRY 390, when the dumping-serialization control has not changed from a non-zero value to zero, the dumping-control state and the capture-completion code remain unchanged and a successful response code is returned, STEP 402. Changes in the dumping status are made visible in the dump header.

Returning to FIG. 30, subsequent to replacing dumping controls or if serialization is not to be released, the captured block is read via a read captured block command, STEP 404 "READ CAPTURED BLOCK." The read-captured-block command returns the contents of the dump table to the program. Each execution of the read-captured-block command returns a 4 k dump table entry addressed by a program specified dump table entry number. (In another embodiment, each execution of the read-captured-block command returns one or more dump table entries.) Programming is responsible for manipulating the dump table entry number and passing it as input to the subsequent read-captured-block command to retrieve the next 4 k block from the dump table. A dump table entry number of zero indicates the first 4 k block in the dump table should be returned. The read-captured-block command is explained in detail with reference to FIG. 37.

Figure 37:
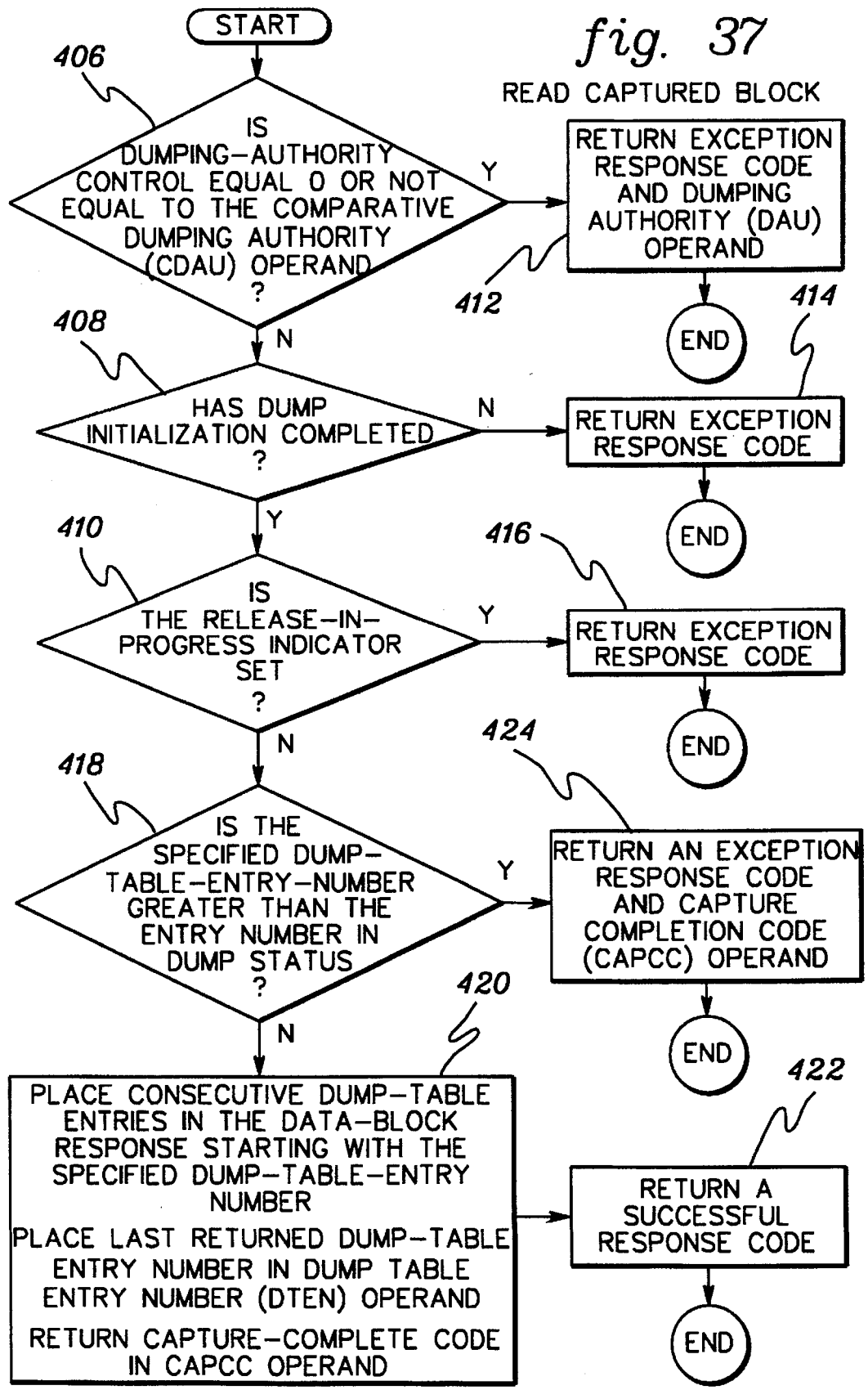
FIG. 37 depicts one embodiment of the logic associated with the read captured block command, in accordance with the principles of the present invention.

Referring to FIG. 37, the dumping-authority control, the initialization-complete indicator, and the release-in-progress indicator are tested, INQUIRIES 406, 408 and 410. When the dumping-authority control is zero or does not match the value of the CDAU operand, the command is completed and the value of the dumping authority is placed in the DAU response operand. An exception response and the DAU operand are returned, STEP 412 "RETURN EXCEPTION RESPONSE CODE AND DAU OPERAND."

When the value of the dumping authority control is non-zero and is equal to the value of the CDAU operand, and the initialization-complete indicator is zero, indicating dump initialization is incomplete, the command is completed and an exception response is returned, STEP 414 "RETURN EXCEPTION RESPONSE CODE."

However, when the value of the dumping authority control is non-zero and is equal to the value of the CDAU operand, dump initialization has completed and the release-in-progress indicator is one, the dump table is being released. Thus, the command is completed and an exception response is returned, STEP 416 "RETURN EXCEPTION RESPONSE CODE."

When the value of the dumping-authority is non-zero and is equal to the value of the CDAU operand, initialization is complete, and the release-in-progress indicator is not set, a test is made to determine if the specified dump-table-entry-number is greater than the entry number in dump status, INQUIRY 418. If the specified dump-table-entry number is less than or equal to the value of the last dump-table-entry number in the dumping status, consecutive dump-table entries starting with the specified dump-table entry are placed in the data-block response operand, the entry number of the last dump-table entry is placed in the DTEN response operand, the capture-completion code is placed in the CAPCC response operand, STEP 420, and a successful response is returned, STEP 422 "RETURN A SUCCESSFUL RESPONSE CODE."

However, when the dump-table-entry number specified by the DTEN request operand is larger than the last dump-table-entry number, the capture completion code is placed in the CAPCC response code, and an exception response is set, STEP 424 "RETURN AN EXCEPTION RESPONSE CODE AND CAPCC OPERAND." When this exception response is presented to the program and the DTEN operand is zero, no data has been captured. This may result if a read-captured-block command is processed before any capture-dump-data command is processed.

Returning once again to FIG. 30, after the captured block is read, a determination is made as to whether the captured block contains directory DIBs for which data is to be read, INQUIRY 426 "IS THIS A DIRECTORY DIB FOR WHICH DATA IS TO BE READ?" If this is a directory DIB for which data is to be read, then dump object data is read via a read-dump object data command, STEP 428 "READ DUMP OBJECT DATA."

Figure 38A:
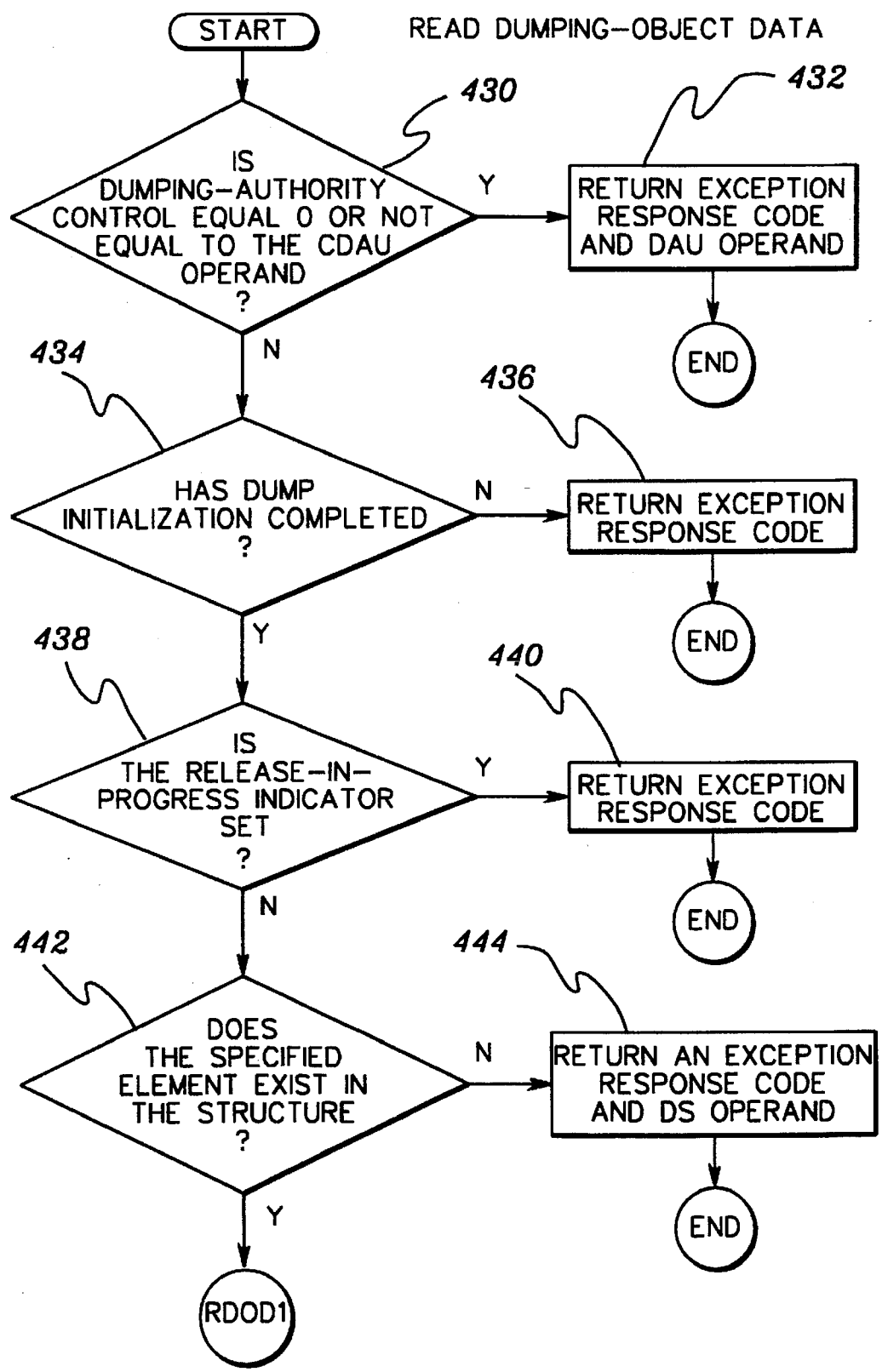
FIGS. 38a–38b depict one embodiment of the logic associated with a read dumping-object data the present invention.
Figure 38B:
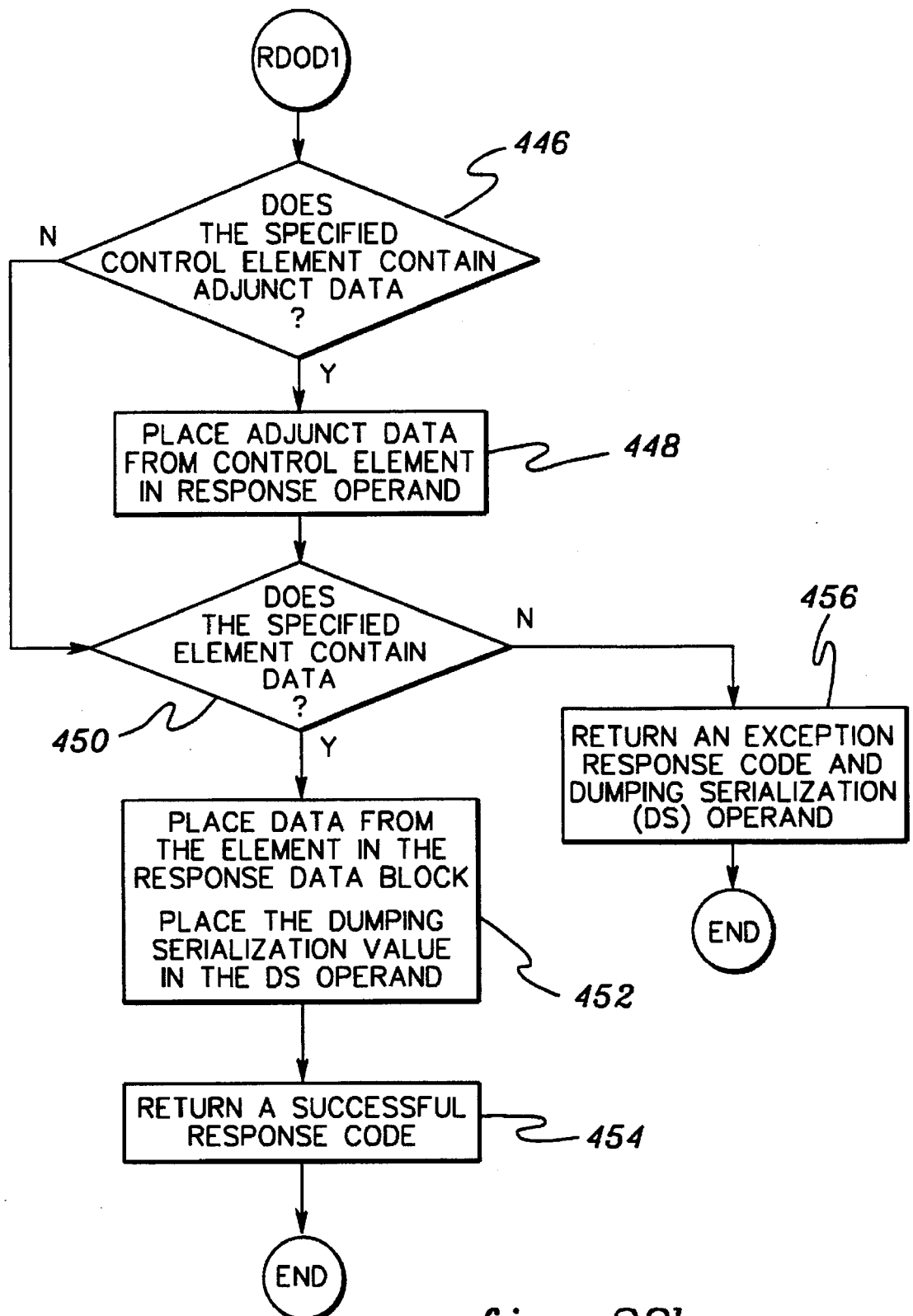

The read-dump object data command is used to retrieve named data entries and optionally adjunct entries from the structure. The command does not access data in the dump table. This command may be executed either under dumping serialization or after dumping serialization is released, but must be executed against a structure with an in-use associated dump table. In other words, the state of the structure related dumping controls must be capture-in-progress, dumping-serialization-held or dumping-serialization-released. Unlike mainline commands against the structure, the read-dumping-object-data command does not alter any structure related controls, such as storage class queues or the contents of instrumentation counters. The read-dump-object data command is described in detail with reference to FIGS. 38a-38b.

Initially, the dumping-authority control is tested, INQUIRY 430 "IS DUMPING-AUTHORITY CONTROL EQUAL 0 OR NOT EQUAL TO THE CDAU OPERAND?" When the dumping-authority control is zero or does not match the value of the CDAU request operand, the command is completed and the value of the dumping authority is placed in the DAU response operand. The DAU operand and an exception response are returned to the program, STEP 432 "RETURN EXCEPTION RESPONSE CODE AND DAU OPERAND."

When the value of the dumping-authority control is non-zero and is equal to the value of the CDAU operand, the initialization-complete indicator is tested, INQUIRY 434 "HAS DUMP INITIALIZATION COMPLETED?" Should the initialization-complete indicator be zero, the command is completed and an exception response is returned, STEP 436 "RETURN EXCEPTION RESPONSE CODE."

However, if the dump initialization indicator is non-zero, indicating that dump initialization is complete, a determination is made as to whether the release-in-progress indicator is set, INQUIRY 438 "IS THE RELEASE-IN-PROGRESS INDICATOR SET?" When the release-in-progress indicator is one, the dump table is being released. Thus, the command is completed and an exception response is returned, STEP 440 "RETURN EXCEPTION RESPONSE CODE."

If the release-in-progress indicator is not set, then an inquiry is made as to whether the specified element exists in the structure, INQUIRY 442 "DOES THE SPECIFIED ELEMENT EXIST IN THE STRUCTURE?" If the specified element does not exist in the structure, the dumping serialization is placed in the DS response operand and an exception response code and DS operand are returned, STEP 444 "RETURN AN EXCEPTION RESPONSE CODE AND DS OPERAND."

On the other hand, when the element exists, a determination is made as to whether the specified control element contains adjunct data, INQUIRY 446 "DOES THE SPECIFIED CONTROL ELEMENT CONTAIN ADJUNCT DATA?" If the control element identified by the element name has an adjunct area, the adjunct-area object is placed in the response operand and the response count is set to indicate the presence of adjunct-area data, STEP 448 "PLACE ADJUNCT DATA FROM CONTROL ELEMENT IN RESPONSE OPERAND." Otherwise, the response count is set to indicate the absence of adjunct-area data.

If the specified control element does not contain adjunct data or subsequent to placing the adjunct data in the response operand, a test is made to determine whether the specified element contains data, INQUIRY 450 "DOES THE SPECIFIED ELEMENT CONTAIN DATA?" When the object element identified by the element name contains data, the data is placed in the data block and the dumping serialization is placed in the DS response operand, STEP 452. The data block, the DS response operand and a successful response code are returned, STEP 454 "RETURN A SUCCESSFUL RESPONSE CODE."

When the object element identified by the element name does not contain data, the DS response operand and an exception response are returned, STEP 456 "RETURN AN EXCEPTION RESPONSE CODE AND DS OPERAND."

The read dump-object-data command may be issued after the dumping serialization has been freed. However, if a consistent view of the data is required, the dumping serialization must be maintained across the retrieval of the data.

Returning to FIG. 30, subsequent to reading the dump object data or if this is not a directory DIB for which data is to be read, the DIB and data previously read are written to a dump data set, STEP 460 "WRITE DIB AND DATA TO DUMP DATA SET."

After the DIB and data are written to the dump data set, an inquiry is made to determine whether all DIBs in the captured block have been processed, INQUIRY 461 "HAVE ALL DIBs IN CAPTURED BLOCK BEEN PROCESSED?" If not, flow passes to INQUIRY 426 and processing continues, as described above. If all the DIBs have been processed, then a determination is made as to whether all of the captured blocks have been read, INQUIRY 462 "HAVE ALL CAPTURED BLOCKS BEEN READ?" If all of the captured blocks have not been read, then flow passes to STEP 404 "READ CAPTURED BLOCK." Otherwise, if all of the captured blocks have been read, then a determination is made as to whether serialization is still held, INQUIRY 464 "IS SERIALIZATION STILL HELD?" If serialization is held, then dumping serialization is replaced in the manner described above, STEP 466 "REPLACE DUMPING CONTROLS."

If serialization is not held or after dumping serialization is replaced, the dump table is released, in accordance with the principles of the present invention, STEP 468 "RELEASE DUMP TABLE." When the current state of a structure is capture-in-progress, dumping-serialization-held or dumping-serialization-released, the program may request that the dump table be disassociated from the structure and returned to the pool of globally managed dumping storage. This is accomplished through the release-dump-table command. If dumping serialization is held, it is released. The structure related dumping controls are then reset to the available state. The release dump table command is described in detail with reference to FIG. 39.

Figure 39:
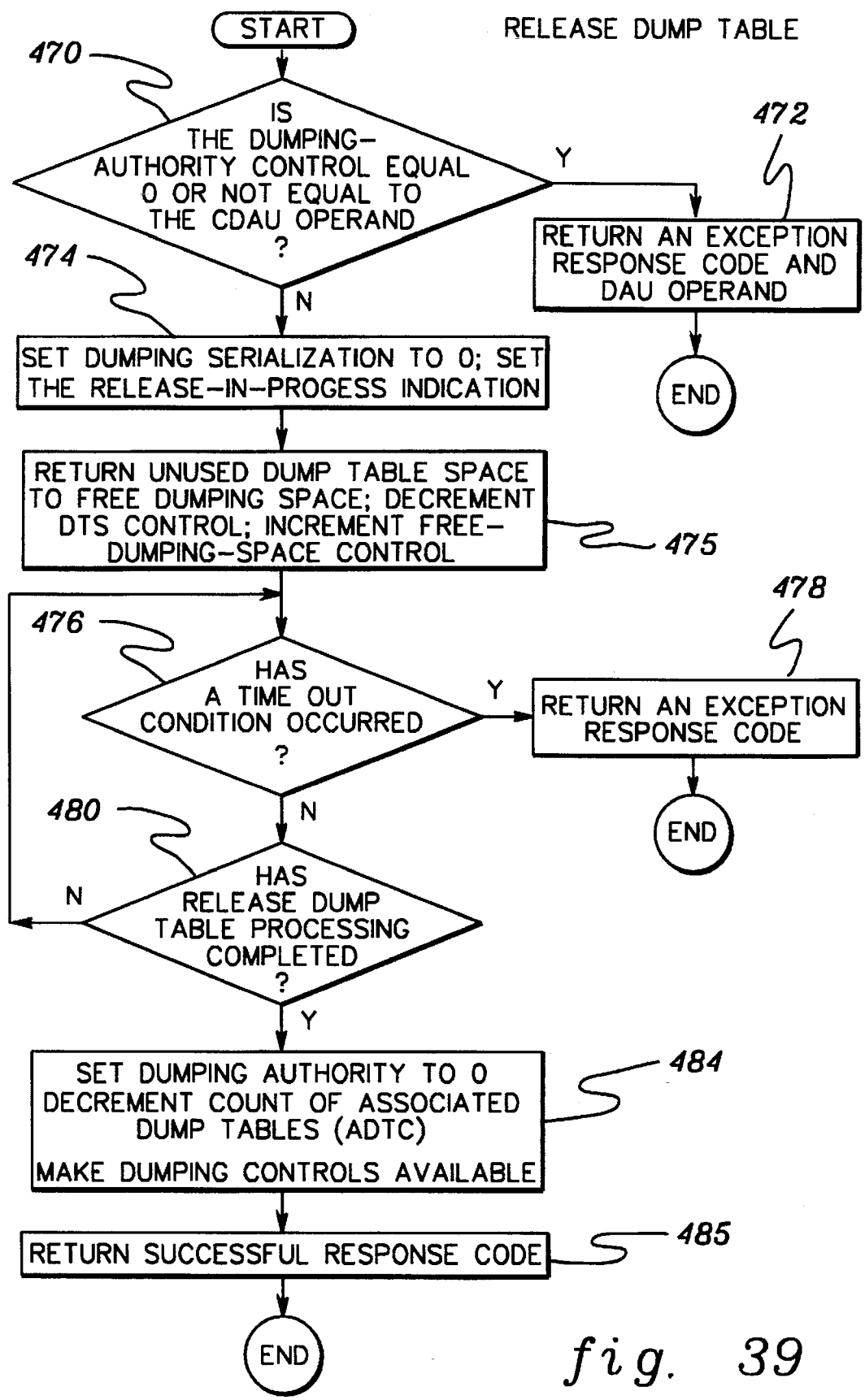
FIG. 39 depicts one embodiment of the logic associated with a release dump table command, in accordance with the principles of the present invention.

Referring to FIG. 39, the dumping-authority control is tested, INQUIRY 470 "IS THE DUMPING-AUTHORITY CONTROL EQUAL 0 OR NOT EQUAL TO THE CDAU OPERAND?" When the dumping-authority control is zero or does not match the value of the CDAU operand, the command is completed and the value of the dumping authority is placed in the DAU response operand. The DAU operand and an exception response are returned, STEP 472 "RETURN AN EXCEPTION RESPONSE CODE AND DAU OPERAND."

When the value of the dumping-authority control is not zero and is equal to the value of the CDAU operand, the dumping serialization is set to zero and the release-in-progress indicator is set to one, STEP 474 "SET DUMPING SERIALIZATION TO 0; SET THE RELEASE-IN-PROGRESS INDICATOR." The release-dump-table command continues the release of the dump table when the release-in-progress indicator is one. Unused dump table space is returned to free dumping space, the dump table size is decremented and free dumping space control is incremented, STEP 475.

When a model-dependent time out period has elapsed before the release process is completed, INQUIRY 476 "HAS A TIME OUT CONDITION OCCURRED?", the release-in-progress indicator is set, the free-dumping-space control and the dump table size are updated by the amount of dump table storage released, and an exception response is returned, STEP 478 "RETURN AN EXCEPTION RESPONSE CODE." If a time out condition has not occurred, then a determination is made as to whether release dump table processing is complete, INQUIRY 480 "HAS RELEASE DUMP TABLE PROCESSING COMPLETED?"

Should the release dump table processing be incomplete, flow passes to INQUIRY 476. However, when processing is complete and a dump table is released, the dumping authority is set to zero; the count of associated dump tables (ADTC) is decremented; the dumping controls are made available, STEP 484; and a successful response is returned, STEP 485.

Referring once again to FIG. 30, after the release dump table command processing is complete, flow returns to INQUIRY 252 "(SDUMP) DUMP REQUEST?"

Described in detail above is a dumping service facility for capturing information of a coupling facility structure. In accordance with the principles of the present invention, the following data can be dumped for each structure:

(a) Structure control data.

(b) List control data for each requested list (for a coupling facility list structure), storage class control data for each requested storage class (for a coupling facility cache structure) and castout class control data for each requested castout class (for a coupling facility cache structure).

(c) List entry controls for all entries in the requested lists (for a coupling facility list structure) and directory information for all entries in the requested castout classes and storage classes (for a coupling facility cache structure). This information may be excluded by specifying a DEI value.

(d) The list registry information for a coupling facility list structure. The caller may also request additional information in the dump that is necessary to diagnose a problem.

(e) For all structures, the adjunct data and the entry data for each entry in a castout class or storage class (for a coupling facility cache structure) or list (for a coupling facility list structure), and the user attach controls. If entry data is requested, the program will retrieve the entry data from the coupling facility and will write it to the dump data set while writing the captured data to the dump data set.

(f) For a coupling facility list structure, the lock table entries.

(g) For a coupling facility cache structure, the caller may request by the dump local cache identifier a specific user for each directory entry whose LCEN should be captured.

To obtain an atomic view of the control information of the coupling facility structure, the structure is serialized which prevents access to that structure by all commands except dumping commands. Subsequent to serializing the structure, the control information of the structure is captured into a structure dump. It is possible to perform the capture (e.g., for one dump table) by multiple processes concurrently to improve performance and availability. Structure serialization is released at the earliest possible time and the captured information from the structure dump table is retrieved and then written to a dump data set. When one process releases serialization, the capture process is complete and the state of the capture process is visible to all systems. In addition to the above, during the capture process when entries are added to the dump table, other entries may be read concurrently.

A coherent view of the set of control elements associated with an allocated structure is required for the accurate determination of programming errors. However, the amount of data that needs to be captured may exceed the capabilities of the data-transfer mechanisms associated with a single coupling facility (SES) command. Dumping mechanisms are provided that allow the contents of a structure to be serialized while a dumping operation is performed. Additional mechanisms are provided to capture the information in a dump table under the dumping serialization and to retrieve the dumped information without unduly delaying the resumption of mainline operations to the structure.

The dumping mechanisms use the SES storage to stage the movement of the captured data from the SES structure to main storage in the attached CPC. The dumping storage is reserved by the program from the available free space and may contain dumping information from several SES structures concurrently.

After the captured data is retrieved, the program may release the dump table. The storage is returned to the pool of global dumping storage and the dumping controls in the structure are initialized, freeing the controls for use in a subsequent dumping operation.

Data associated with the structure may also be retrieved for inclusion in the dump. The data is not captured in the dump table; rather it is returned directly via a command that reads the data without updating any structure control elements. The DIB contains information for locating data associated with the control element. The dumping process may choose either to retrieve the data under the explicit dumping serialization, after the serialization has been released, or it may choose to capture only a portion of the associated data.

In accordance with the principles of the present invention, a configuration is described which enables a network of CPCs to issue requests to and receive responses from a coupling facility. The coupling facility described is, for instance, a structured External Storage processor (SES). One or more programmed applications on one or more processors share access to a portion of storage within the SES device. A portion of storage within the SES device is seen by programming as a structure with data items being accessed through control information maintained at the SES. This control information is used by the SES to enable programs to access the shared data.

Programming can request the SES to perform operations which are designed to capture control information into a dump area associated with the SES structure. The mechanisms described herein in accordance with the principles of the present invention, provide the means by which programming can associate a dump area with a structure and allow commands to record control information from the structure into the dump area.

The support is intended to enable diagnosis of problems caused by programming errors either directly or indirectly involving SES exploitation. The intent is not to provide the mechanisms for diagnosing SES micro-code or hardware errors. Therefore, the design objective for the SES dump support is to provide for diagnostic retrieval of all SES structure objects, which are architecturally observable by programs accessing that SES structure. Internal micro-code storage or controls are not captured as part of the dumping process. These serviceability requirements have perhaps never been so critically important nor so challenging to satisfy as they are for the SES facility. The capabilities provided by SES allow programs executing across multiple CPCs to share customer data and, just as significantly, to share programming control constructs for messaging, queueing, cache coherency, etc. The fault tolerance and non-volatility characteristics of SES allow these programs to store this critical data in SES without requiring that data to be replicated locally on the sharing systems. For a significant portion of such data, that data is only resident in SES. Further, programming errors affecting the access and manipulation of customer data and program control information in SES can result in errors or sympathy sickness being observed across all systems sharing that SES facility.

Therefore, the ability to successfully diagnose program problems involving SES exploitation is important to the success of SES in customer production environments. Problem diagnosis and resolution for such problems must not require multiple problem recreations in order to gather sufficient diagnostic information except in extreme situations. Further, the diagnostic data capture process must not by its very nature, introduce significant sympathy sickness into the customer data-sharing production environment.

The requirement to avoid sympathy sickness during SES, diagnostic data capture must be met, while at the same time, satisfying the equally stringent requirement for first failure data capture. This means that the data retrieved from SES must provide a coherent and atomic snapshot of SES structure and element controls, and optionally of structure data as well.

The amount of data required to be captured for a problem involving SES usage can exceed the capabilities of a single command issued to a given SES structure. At the same time, mainline command accesses to a structure being dumped cannot be allowed to execute during the dump capture process or structure controls and internal queues could be distorted in the dump, giving the appearance of data overlays or looped queues. This requires definition of a form of serialization that is held beyond the bounds of a single dumping command and is released when the capture process is completed.

The disruption caused by such a serialization technique must be kept to an absolute minimum. The volume of data within a SES structure that might be required to provide sufficient diagnostic data could take a significant period of time to retrieve, if data transfers from SES over links to a CPC issuing the dump request was the mechanism for the data capture process. An approach involving the staged buffering of captured SES structure and element controls to an internal storage area is therefore desired, so that serialization on the structure being dumped can be released in a timely manner.

However, resolution of a small percentage of critical problems might require a serialized view of the data contents of a SES structure. In these cases, the objective of atomicity for diagnostic data capture is more critical than the multi-system effects of sympathy sickness during the capture process. In these situations, the ability to obtain such a serialized view is required, even though the data capture and retrieval process cannot be made transparent to the sharing systems and exploiting programs. The ability to retrieve data directly from SES structure to storage resident on the requesting CPC, while serialization is held on the structure to block mainline access, is provided by the SES dumping support. In an effort to minimize the disruption caused by this processing, the SES dumping support has the objective of supporting a high degree of parallelism in the program-directed data retrieval process. This parallelism extends to the retrieval of structure controls in the internal SES capture area as well and is provided independently of whether dumping serialization on the target SES structure is held or not. An architected format for the SES dump content is supported so that diagnostic programs can interpret the contents of all captured data. Where the SES architecture enforces an explicit ordering of elements within a SES structure, as is the case for elements queued on a SES List or Cache Castout Class, such ordering is preserved and made observable in the capture area for a SES structure. Where ordering is not explicitly enforced in the SES architecture, no such ordering is attempted or implied in the SES dumping support either.

The SES dumping support avoids any disruption to architected or internal SES structure controls due to the execution of dumping commands directed against a SES structure. For example, the least recently used ordering of elements on a SES Cache storage class should not be altered as a result of dumping command references to those elements. In addition, the SES facility dumping support provides the ability to observe the progress of the SES dumping process across the capture and retrieval of diagnostic data. Given that the dumping process is under program direction, dump status and control information is accessible to programs for the purpose of real-time status monitoring of that dumping process. Knowledge with respect to which structures in SES have dumping resource assigned, completion of data capture and reasons for premature termination of dump capture processing is observable.

The allocation of SES facility resources for the purposes of diagnostic data capture is provided under customer installation control. SES storage is a valuable resource and decisions regarding the tradeoffs between first failure data capture storage requirements and the customer cost for providing the necessary resources for first failure data capture is under customer control. In order to understand the effects and effectiveness of a given dump resource allocation specification, the utilization of dumping resources over time is maintained in SES and made available upon program request. Additionally, based on analysis of dump resource utilization over time, it is possible to dynamically alter the amount of SES storage resource to be applied for diagnostic data capture, without requiring a re-IML of the SES facility to effect such change.

A key construct for first failure data capture is to provide for the specification of dump tailoring options to ensure that sufficient diagnostic information is gathered for an error to enable debugging of the problem. Conversely, the amount of dumping resource storage assigned (and indirectly, the amount of time to take the dump) reflects the amount of resource actually required to resolve the problem. Here the granularity of dump tailoring options is important. The SES facility dumping support provides granular, and at the same time, comprehensive dump tailoring options for SES structure objects to minimize SES resource requirements, while satisfying the first failure data capture needs.

In order to ensure that maximum efficiency is obtained in the utilization of allocated SES dumping resource, the responsibility for determining the storage requirements for a given dump request is not placed on the customer nor on the program initiating the dump. Instead, the size of a dump table assigned out of the total allocated SES dumping resource is dynamically determined and matched to the needs of that dump request based on the specific dump objects to be captured. This determination can be made by the SES dumping support based on interrogation of the requested dump tailoring options and an understanding of the amount of storage associated with the set of dump objects encompassed by those tailoring options.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

We claim:

1. A method for providing a storage dump in a shared data facility coupled to at least one central processing complex, said shared data facility having processing and storage capabilities, said method comprising:

dynamically assigning a dump space within said shared data facility for receiving dumping information to be captured, said dynamically assigning comprising automatically modifying, by said shared data facility, a total amount of said dump space based upon one or more predefined conditions, wherein non-dumping functions of said shared data facility remain operational during said automatically modifying; and storing said dumping information in said dynamically assigned dump space, said dumping information for use in at least one of system recovery, problem determination and system monitoring.

2. The method of claim 1, wherein said dumping information is represented by at least one structure and wherein said method further comprises creating at least one dump table within said dump space, each of said at least one dump table corresponding to one of said at least one structure.

3. A system for providing a storage dump in a shared data facility coupled to at least one central processing complex, said shared data facility having processing and storage capabilities, said system comprising:

means for dynamically assigning a dump space within said shared data facility for receiving dumping information to be captured, said means for dynamically assigning comprising means for automatically modifying, by said shared data facility, a total amount of said dump space based upon one or more predefined conditions, wherein non-dumping functions of said shared data facility remain operational during said automatically modifying; and means for storing said dumping information in said dynamically assigned dump space, said dumping information for use in at least one of system recovery, problem determination and system monitoring.

4. The system of claim 3, wherein said dumping information is represented by at least one structure and wherein said system further comprises:

at least one dump table located within said dump space; and means for associating each of said at least one dump table with one of said at least one structure.

* * * * *

UNITED STATES PATENT AND TRADEMARK OFFICE
CERTIFICATE OF CORRECTION

PATENT NO. : 5,664,155
DATED : September 02, 1997
INVENTOR(S) : Elko et al.

It is certified that error appears in the above-identified patent and that said Letters Patent is hereby corrected as shown below:

Col. 1, line 24, after "1992" insert --, U.S. Pat. No. 5,357,608,--.

Col. 6, line 37, after "data" insert --command, in accordance with the principles of--.

Signed and Sealed this

Twenty-third Day of December, 1997

Attest:

BRUCE LEHMAN

*Attesting Officer*    *Commissioner of Patents and Trademarks*